(12) United States Patent
Mercado et al.

(10) Patent No.: US 11,761,209 B2
(45) Date of Patent: Sep. 19, 2023

(54) COATINGS FOR ROOFING MATERIALS AND RELATED METHODS

(71) Applicant: BMIC LLC, Dallas, TX (US)

(72) Inventors: Ramil Marcelo L. Mercado, Waxahachie, TX (US); Jarod L. Krajca, Ennis, TX (US); Carl Stipe, Grapevine, TX (US); Denis M. Tibah, Waxahachie, TX (US); Kevin Carr, Dallas, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/860,942

(22) Filed: Jul. 8, 2022

(65) Prior Publication Data

US 2023/0024411 A1 Jan. 26, 2023

Related U.S. Application Data

(60) Provisional application No. 63/321,875, filed on Mar. 21, 2022, provisional application No. 63/315,135, filed on Mar. 1, 2022, provisional application No. 63/220,163, filed on Jul. 9, 2021.

(51) Int. Cl.
| | | |
|---|---|---|
| *E04D 1/00* | (2006.01) | |
| *E04D 1/22* | (2006.01) | |
| *C09D 191/00* | (2006.01) | |
| *B32B 3/14* | (2006.01) | |
| *B32B 5/02* | (2006.01) | |

(52) U.S. Cl.
CPC .................. *E04D 1/22* (2013.01); *B32B 3/14* (2013.01); *B32B 5/02* (2013.01); *C09D 191/00* (2013.01); *B32B 2255/02* (2013.01); *B32B 2255/26* (2013.01); *B32B 2419/06* (2013.01)

(58) Field of Classification Search
CPC ....... E04D 1/22; E04D 2001/005; E04D 1/08; E04D 1/12; E04D 1/20; B32B 3/14; B32B 3/00; B32B 5/02; B32B 2255/00; B32B 2255/02; B32B 2255/26; B32B 2419/00; B32B 2419/06; C09D 191/00
See application file for complete search history.

(56) References Cited

U.S. PATENT DOCUMENTS

| | | |
|---|---|---|
| 8,572,921 B2 | 11/2013 | Ward et al. |
| 8,629,199 B2 | 1/2014 | Guiselin et al. |
| 8,713,882 B2 | 5/2014 | Kalkanoglu et al. |

(Continued)

OTHER PUBLICATIONS

Tang et al., "Investigation of rheological properties of light colored synthetic asphalt binders containing different polymer modifiers", Construction and Building Materials, 161 (2018) 175-185.

*Primary Examiner* — Chi Q Nguyen
(74) *Attorney, Agent, or Firm* — GREENBERG TRAURIG, LLP

(57) ABSTRACT

A roofing material may include a substrate and a coating on the substrate. The coating may include a polymer blend and at least one filler. The polymer blend may include at least one hydrocarbon oil, at least one resin, at least one polymer, or any combination thereof. The at least one hydrocarbon oil, the at least one resin, the at least one polymer, or any combination thereof may be present in an amount or in amounts sufficient to result in the polymer blend or the coating having a select softening point, a select viscosity, or any combination thereof.

16 Claims, 7 Drawing Sheets

(56) References Cited

U.S. PATENT DOCUMENTS

| | | |
|---|---|---|
| 9,181,456 B2 | 11/2015 | Hong et al. |
| 10,696,868 B2 | 6/2020 | Quinn et al. |
| 11,493,428 B2 * | 11/2022 | Grisham ............ B01L 3/502776 |
| 2003/0175449 A1 | 9/2003 | Edson |
| 2005/0204675 A1 * | 9/2005 | Snyder .................... B32B 11/12 |
| | | 52/553 |
| 2007/0044397 A1 * | 3/2007 | Wiercinski ................ E04D 5/10 |
| | | 52/177 |
| 2007/0261337 A1 * | 11/2007 | Whitaker ............ C04B 20/1018 |
| | | 52/300 |
| 2007/0266562 A1 | 11/2007 | Friedman et al. |
| 2008/0248241 A1 * | 10/2008 | Kalkanoglu ............ B32B 27/12 |
| | | 156/60 |
| 2010/0203290 A1 * | 8/2010 | Whitaker .............. E04D 13/002 |
| | | 428/144 |
| 2012/0315816 A1 * | 12/2012 | Fowler .................... B32B 5/022 |
| | | 264/129 |
| 2019/0184678 A1 * | 6/2019 | LaTorre .................. B32B 19/04 |
| 2019/0186144 A1 * | 6/2019 | LaTorre .................... E04D 1/26 |
| 2019/0242057 A1 * | 8/2019 | Humphreys ............. D04H 3/14 |
| 2020/0149280 A1 | 5/2020 | Hong et al. |
| 2020/0181020 A1 * | 6/2020 | Faeth ........................ E04D 1/22 |
| 2020/0224419 A1 | 7/2020 | Boss et al. |
| 2022/0049124 A1 * | 2/2022 | Mercado ............... C09D 191/00 |
| 2022/0275646 A1 * | 9/2022 | Jiang ........................ B32B 7/12 |

* cited by examiner

402

400

COATINGS FOR ROOFING MATERIALS AND RELATED METHODS

CROSS-REFERENCE TO RELATED APPLICATIONS

This application claims priority to U.S. Provisional Patent Application No. 63/220,163, filed Jul. 9, 2021, and entitled "COATINGS FOR ROOFING MATERIALS AND RELATED METHODS"; U.S. Provisional Patent Application No. 63/315,135, filed Mar. 1, 2022, and entitled "RE-REFINED ENGINE OIL BOTTOMS (REOB)-BASED MATERIALS FOR ROOFING APPLICATIONS"; U.S. Provisional Patent Application No. 63/321,875, filed Mar. 21, 2022, and entitled "RE-REFINED ENGINE OIL BOTTOMS (REOB)-BASED MATERIALS FOR ROOFING APPLICATIONS"; the disclosures of which applications are hereby incorporated herein by reference in their entireties.

FIELD

This disclosure generally relates to coatings for roofing materials, roofing materials comprising the coatings, and related methods.

BACKGROUND

Roofing materials may be coated or impregnated with asphalt-based compositions. The quality of asphalt, however, continues to diminish and become more variable. This has led to an increase in the cost to manufacture roofing materials containing asphalt.

SUMMARY

Some embodiments of the present disclosure relate roofing shingles.

In some embodiments, the roofing shingle may comprise, consist of, or consist essentially of a substrate and a coating. In some embodiments, the substrate may comprise a mat. In some embodiments, the coating may be on the substrate. In some embodiments, the coating may comprise, consist of, or consist essentially of 10% to 90% by weight of a polymer blend based on a total weight of the coating, and 10% to 90% by weight of at least one filler based on the total weight of the coating. In some embodiments, the polymer blend may comprise, consist of, or consist essentially of at least one hydrocarbon oil, at least one resin, and at least one thermoplastic polymer. In some embodiments, the at least one hydrocarbon oil, the at least one resin, and the at least one thermoplastic polymer may be present in amounts sufficient to result in the polymer blend having at least one of a softening point of at least 200° F. as measured according to ASTM D3461 and a viscosity of 7000 centipoise (cP) or less as measured according to ASTM D4402 using a #31 spindle at 400° F.

In some embodiments, the polymer blend is present in an amount of 20% to 50% by weight based on the total weight of the coating.

In some embodiments, the at least one filler is present in an amount of 50% to 80% by weight based on the total weight of the coating.

In some embodiments, the at least one hydrocarbon oil is present in an amount of 30% to 60% by weight based on a total weight of the polymer blend.

In some embodiments, the at least one resin is present in an amount of 30% to 60% by weight based on the total weight of the polymer blend.

In some embodiments, the at least one thermoplastic polymer is present in an amount of 5% to 20% by weight based on the total weight of the polymer blend.

In some embodiments, the at least one hydrocarbon oil comprises at least one paraffinic hydrocarbon oil, at least one aromatic hydrocarbon oil, at least one re-refined engine oil bottoms (REOBs), or any combination thereof.

In some embodiments, the at least one paraffinic hydrocarbon oil comprises at least 50% by weight of at least one paraffin based on a total weight of the paraffinic hydrocarbon oil.

In some embodiments, the at least one aromatic hydrocarbon oil comprises at least 50% by weight of at least one aromatic based on a total weight of the aromatic hydrocarbon oil.

In some embodiments, the REOBs is compositionally different from asphalt.

In some embodiments, the at least one resin comprises a rosin acid, a rosin ester, a modified rosin acid, a modified rosin ester, or any combination thereof.

In some embodiments, the at least one thermoplastic polymer comprises a polyolefin, a vinyl polymer, or any combination thereof.

In some embodiments, the at least one resin has a softening point of less than 125° C. as measured according to ASTM D6090 or ASTM E28-99, and the at least one thermoplastic polymer has a molecular weight of at least 165 kDa.

In some embodiments, the at least one resin has a softening point of 100° C. to 125° C. as measured according to ASTM D6090 or ASTM E28-99, and the at least one thermoplastic polymer has a molecular weight of 300 kDa to 400 kDa.

In some embodiments, the at least one resin has a softening point of at least 125° C. as measured according to ASTM D6090 or ASTM E28-99, and the at least one thermoplastic polymer has a molecular weight of at least 165 kDa.

In some embodiments, the at least one resin has a softening point of 125° C. to 140° C. as measured according to ASTM D6090 or ASTM E28-99, and the at least one thermoplastic polymer has a molecular weight of 300 kDa to 400 kDa.

In some embodiments, the at least one resin has a softening point of at least 125° C. as measured according to ASTM D6090 or ASTM E28-99, the at least one thermoplastic polymer is present in an amount of 2% to 12% by weight of the polymer blend, and the at least one thermoplastic polymer has a molecular weight of 200 kDa or less.

In some embodiments, a ratio of the at least one hydrocarbon oil to the at least one resin in the polymer blend is 1:1 to 1:10.

In some embodiments, the ratio of the at least one hydrocarbon oil to the at least one resin in the polymer blend is 1:1 to 10:1.

In some embodiments, a ratio of the at least one hydrocarbon oil to the at least one thermoplastic polymer is 1.01:1 to 10:1.

In some embodiments, the softening point of the polymer blend is at least 210° F. as measured according to ASTM D3461.

In some embodiments, the softening point of the polymer blend is 200° F. to 300° F. as measured according to ASTM D3461.

In some embodiments, the viscosity of the polymer blend is 2000 cP or less as measured according to ASTM D4402 using a #31 spindle at 400° F.

In some embodiments, the viscosity of the polymer blend is 200 cP to 2000 cP as measured according to ASTM D4402 using a #31 spindle at 400° F.

In some embodiments, the softening point of the coating is 200° F. to 300° F. as measured according to ASTM D3461.

In some embodiments, the viscosity of the coating is 1000 cP to 6500 cP as measured according to ASTM D4402 using a #31 spindle at 400° F.

In some embodiments, the coating comprises asphalt.

In some embodiments, the coating comprises 0.1% to 49% by weight of asphalt based on the total weight of the coating.

In some embodiments, the coating comprises 0% by weight of asphalt based on the total weight of the coating.

In some embodiments, the roofing shingle may comprise, consist of, or consist essentially of a substrate and a coating. In some embodiments, the substrate may comprise a mat. In some embodiments, the coating may be on the substrate. In some embodiments, the coating may comprise, consist of, or consist essentially of a polymer blend and at least one filler. In some embodiments, the polymer blend may comprise, consist of, or consist essentially of at least 30% by weight of at least one hydrocarbon oil based on a total weight of the polymer blend, at least 30% by weight of at least one resin based on the total weight of the polymer blend, and at least 5% by weight of at least one thermoplastic polymer based on the total weight of the polymer blend. In some embodiments, the at least one resin, the at least one polymer, or any combination thereof may be present in the polymer blend in an amount sufficient to result in the coating having at least one of a softening point of 210° F. to 270° F. as measured according to ASTM D3461, or a viscosity of 6500 cP or less.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
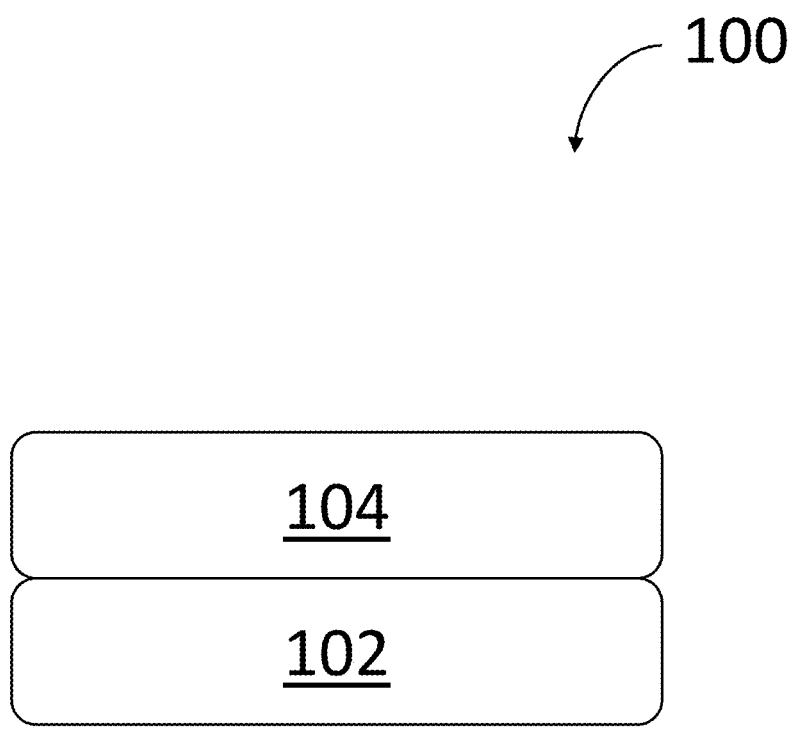
FIG. 1 is a schematic diagram of a roofing material, according to some embodiments of the present disclosure.

Some embodiments of the present disclosure relate to coatings for roofing materials and related methods.

In some embodiments, the coatings may comprise, consist of, or consist essentially of non-asphaltic coatings for roofing materials (e.g., a coating comprising 0% by weight of asphalt based on a total weight of the coating), substantially non-asphaltic coatings for roofing materials (e.g., a coating comprising less than 0.1% by weight of asphalt (e.g., 0.001% to 0.099% by weight of asphalt) based on the total weight of the coating), asphaltic coatings for roofing materials (e.g., a coating comprising 0.1% to 49% by weight of asphalt based on the total weight of the coating), or any combination thereof.

As used herein, the term "roofing material" may refer to any material of a roof and may include, for example and without limitation, shingles, waterproofing membranes, underlayments, tiles, or any combination thereof. In some embodiments, the roofing material may comprise, consist of, or consist essentially of a roofing shingle. For example, in some embodiments, the roofing shingle may comprise, consist of, or consist essentially of an asphaltic roofing shingle (e.g., a roofing shingle comprising 0.1% to 49% by weight of asphalt based on a total weight of the roofing shingle), a non-asphaltic roofing shingle (e.g., a roofing shingle comprising 0% by weight of asphalt based on the total weight of the roofing shingle), a substantially non-asphaltic roofing shingle (e.g., a roofing shingle comprising less than 0.1% by weight of asphalt (e.g., 0.001% to 0.099% by weight of asphalt) based on the total weight of the roofing shingle), or any combination thereof. Further examples of roofing materials include, without limitation, at least one of rolled roofing, flexible rolled roofing, or roofing granules.

In some embodiments, the roofing material may comprise, consist of, or consist essentially of a substrate, a coating, or any combination thereof. In some embodiments, the substrate has a surface. In some embodiments, the substrate has a top surface. In some embodiments, the substrate has a bottom surface. In some embodiments, the substrate has a top surface and a bottom surface. In some embodiments, the coating is disposed on the substrate. In some embodiments, the coating is disposed on the surface of the substrate. In some embodiments, the coating is disposed on the top surface of the substrate. In some embodiments, the coating is disposed on the bottom surface of the substrate. In some embodiments, the coating is disposed on the top surface and the bottom surface of the substrate.

In some embodiments, the substrate may comprise, consist of, or consist essentially of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the substrate comprises asphalt. For example, in some embodiments, the substrate may comprise 0.1% to 49% by weight of asphalt based on a total weight of the substrate. In some embodiments, the substrate comprises no asphalt. For example, in some embodiments, the substrate does not comprise asphalt. In some embodiments, the substrate is substantially non-asphaltic. For example, in some embodiments, the substrate may comprise less than 0.1% by weight of asphalt (e.g., 0.001% to 0.099% by weight of asphalt) based on the total weight of the substrate.

In some embodiments, the coating may comprise, consist of, or consist essentially of a polymer blend, at least one filler, or any combination thereof. In some embodiments, the coating may be prepared from a coating material. In some embodiments, the coating material may comprise, consist of, or consist essentially of the polymer blend, the at least one filler, or any combination thereof. In some embodiments, a coating comprising at least one filler is referred to as a filled coating. In some embodiments, a coating material comprising at least one filler is referred to as a filled coating material.

In some embodiments, the polymer blend may comprise, consist of, or consist essentially of at least one hydrocarbon oil, at least one resin, at least one polymer, or any combination thereof.

In some embodiments, the at least one hydrocarbon oil may comprise, consist of, or consist essentially of an oil comprising, consisting of, or consisting essentially of at least one hydrocarbon. In some embodiments, the at least one hydrocarbon oil may comprise, consist of, or consist essentially of at least one paraffinic hydrocarbon oil. In some embodiments, the at least one hydrocarbon oil may comprise, consist of, or consist essentially of at least one aromatic hydrocarbon oil. In some embodiments, the at least one hydrocarbon oil may comprise, consist of, or consist essentially of at least one re-fined engine oil bottoms (REOBs). In some embodiments, the at least one hydrocarbon oil may comprise, consist of, or consist essentially of at least one paraffinic hydrocarbon oil, at least one aromatic hydrocarbon oil, at least one re-fined engine oil bottoms (REOBs), or any combination thereof.

In some embodiments, the at least one paraffinic hydrocarbon oil may comprise, consist of, or consist essentially of a hydrocarbon oil comprising, consisting of, or consisting essentially of at least one paraffin (e.g., at least one saturate). In some embodiments, the at least one paraffinic hydrocarbon oil may comprise, consist of, or consist essentially of 0% to 100% by weight of the at least one paraffin based on a total weight of the paraffinic hydrocarbon oil. In some embodiments, the at least one paraffinic hydrocarbon oil may comprise, consist of, or consist essentially of at least 50% by weight of the at least one paraffin based on the total weight of the paraffinic hydrocarbon oil. In some embodiments, the at least one paraffinic hydrocarbon oil may comprise, consist of, or consist essentially of an amount greater than 50% by weight of the at least one paraffin based on the total weight of the paraffinic hydrocarbon oil. In some embodiments, the at least one paraffinic hydrocarbon oil may comprise, consist of, or consist essentially of 50% to 100% by weight of the at least one paraffin based on the total weight of the paraffinic hydrocarbon oil.

In some embodiments, the at least one aromatic hydrocarbon oil may comprise, consist of, or consist essentially of a hydrocarbon oil comprising, consisting of, or consisting essentially of at least one aromatic. In some embodiments, the at least one aromatic hydrocarbon oil may comprise, consist of, or consist essentially of 0% to 100% by weight of the at least one aromatic based on a total weight of the aromatic hydrocarbon oil. In some embodiments, the at least one aromatic hydrocarbon oil may comprise, consist of, or consist essentially of at least 50% by weight of the at least one aromatic based on the total weight of the aromatic hydrocarbon oil. In some embodiments, the at least one aromatic hydrocarbon oil may comprise, consist of, or consist essentially of an amount greater than 50% by weight of the at least one aromatic based on the total weight of the aromatic hydrocarbon oil. In some embodiments, the at least one aromatic hydrocarbon oil may comprise, consist of, or consist essentially of 50% to 100% by weight of the at least one aromatic based on the total weight of the aromatic hydrocarbon oil.

In some embodiments, the re-fined engine oil bottoms (REOBs) may comprise, consist of, or consist essentially of a residual distillation product. For example, in some embodiments, the re-refined engine oil bottoms may comprise, consist of, or consist essentially of a residual distillation product from a vacuum tower, such as for example a vacuum tower in a re-refinery of used lubricating oil. In some embodiments, the re-refined engine oil bottoms may specifically not include any cleaned-up waste engine oil, any residue from only an atmospheric tower of an oil re-refinery, or any combination thereof. In some embodiments, the re-refined engine oil bottoms may be compositionally different from asphalt (e.g., such as asphalt from a vacuum tower of a crude oil refinery, etc.) and therefore may not be or comprise asphalt. In some embodiments, for example, the re-refined engine oil bottoms may have at least one component, at least one property, or any combination thereof that is different from asphalt. In some embodiments, one or more of the following may replace the re-refined engine oil bottoms, or may be combined with the re-refined engine oil bottoms: heavy vacuum tower bottoms, re-refined heavy vacuum tower bottoms, re-refined engine oil, re-refined motor oil, waste engine oil, flux, asphalt flux, asphalt blowdown, engine oil residue, re-refined heavy vacuum distillation bottoms, re-refined heavy vacuum distillation oil, re-refined vacuum tower bottoms, vacuum tower bottom, vacuum tower asphalt binder, waste engine oil residue, and waste oil distillation bottoms.

Some non-limiting examples of the at least one hydrocarbon oil may include, without limitation, one or more of the following: Kendex® 0897, Kendex® 0898, Kendex® 0834, Kendex® 0060HT, Kendex® 0150H, Kendex® 0150, Kendex® 0847, Kendex® 0070, Kendex® 0100, Kendex® 0200, Kendex® 0250, Kendex® 0300, Kendex® 0325 D, Kendex® 0500, Kendex® 0600, Kendex® 0842, Kendex® 0846, Kendex® 0866, Kendex® MNE, Kendex® CAT, which are available from American Refining Group, Inc., Bradford, Pa.; Nynas Oil (Nyflex-223), which is available from Nynas AB, Stockholm, Sweden; Hyprene Process Oils, which are available from Ergon, Inc., Jackson, Miss.; Hydrolene H600T, which is available from Holly Frontier, Plymouth Meeting, Pa.; Exxon Evlast C 30, Exxon Evlast D 50, and Exxon UmPAO 65, which are available from ExxonMobil, Irving, Tex.; and ethylene bis-stearamide (CAS #110-30-5), which is available from several suppliers, including, for example and without limitation, Acme-Hardesty, Blue Bell, Pa., among others; re-refined engine oil bottoms products or vacuum tower asphalt extender products available from several suppliers, including, for example and without limitation, Safety-Kleen, Richardson, Tex.; Vertex Energy, Houston, Tex.; Universal Environmental Services (UES), Peachtree City, Ga.; and Universal Avista.

In some embodiments, the at least one resin may comprise, consist of, or consist essentially of a rosin acid, a rosin ester, a modified rosin acid, a modified rosin ester, or any combination thereof.

Some non-limiting examples of the at least one resin may include, without limitation, one or more of the following: SYLVACOTE™ 4981, SYLVACOTE™ 4984, SYLVACOTE™ 4985, SYLVACOTE™ 4995, SYLVACOTE™ 7003, SYLVACOTE™ 7097, which are available from Kraton, Houston, Tex.; WestRex® 5010; WestRex® 5040; WestRez® 5090; WestRex® 5092; WestRex® 5300; WestRex® 5101; WestRex® 5105; WestRex® 5110; WestRex® 5120; WestRex® 5140; WestRex® 5185; WestRex® 5295; WestRex® 5205; WestRex® 5206; WestRex® 5215; WestRex® 5230, which are available from Ingevity, North Charleston, S. Carolina.; Dertoline DEG 2, which is a diethylene glycol-esterified rosin, Dertoline G2L, which is a deodorized and stabilized glycerin-esterified rosin, Dertoline MG 105, which is a glycerol ester of maleic rosin, Dertoline P 105, which is a stabilized pentaerythritol-esterified rosin, Dertoline PLS, which is a deodorized and highly stabilized pentaerythritol-esterified rosin, Dertopoline G, which is a glycerin-esterified polymerized rosin, Dertopoline P 125, which is a pentaerythritol-esterified polymerized rosin, Granolite P 118, which is a pentaerythritol-esterified rosin, and Polygral, which is a polymerized gem rosin, all of which are available from DRT, Dax, France.

In some embodiments, the at least one polymer may comprise, consist of, or consist essentially of at least one thermoplastic polymer, at least one recycled polymer, or any combination thereof. In some embodiments, the at least one thermoplastic polymer may comprise, consist of, or consist essentially of a polyolefin, a vinyl polymer, or any combination thereof. In some embodiments, the polyolefin may comprise, consist of, or consist essentially of polyethylene, polypropylene, or any combination thereof, such as, for example and without limitation, a copolymer of ethylene and propylene. In some embodiments, the polyolefin may comprise, consist of, or consist essentially of a copolymer of ethylene and an alpha-olefin, such as, for example and without limitation, ethylene and 1-octene, ethylene and 1-hexene, and ethylene and 1-butene. In some embodiments, the vinyl polymer may comprise, consist of, or consist essentially of a polyvinyl ester. In some embodiments, the vinyl polymer may comprise, consist of, or consist essentially of polyvinyl butyral (PVB). In some embodiments, the thermoplastic polymer may comprise, consist of, or consist essentially of a thermoplastic elastomer.

Some non-limiting examples of the at least one polymer (e.g., such as, one or more of thermoplastic polymers, polyolefins, vinyl polymers, polyvinyl esters, thermoplastic elastomers, recycled polymers, etc.) may include, without limitation, one or more of the following: polyethylenes (PE) (e.g., including, without limitation, one or more of raw low density polyethylene, recycled low density polyethylene (LDPE), linear low density polyethylene (LLDPE), and high density polyethylene (HDPE)), polypropylene (PP) (e.g., including, without limitation, one or more of isotactic polypropylene (IPP), atactic polypropylene/isotactic propylene (APP/IPP)), polystyrene, polyurethane (PU/TPU), polyurea, terpolymers (e.g., including, without limitation, a functionalized polymer with a reactive oxygen group), amorphous polyalpha olefins (APAO), amorphous polyolefins (APO), (e.g., including, without limitation, one or more of propylene homopolymers, copolymers of propylene and ethylene, copolymers of ethylene alpha-olefin, such as ethylene and 1-octene, ethylene and 1-hexene, and ethylene and 1-butene), polyolefin elastomers (POE), styrene/styrenic block copolymers (e.g., including, without limitation, one or more of styrenic block copolymers with a hydrogenated midblock of styrene-ethylene/butylene-styrene (SEBS), styrene-ethylene/propylene-styrene (SEPS), styrene-isoprene-styrene block copolymers (SIS), and styrene-butadiene-styrene block copolymers (SBS)), ethylene vinyl acetate (EVA), polyisobutylene, polybutadiene, oxidized polyethylene, epoxy thermoplastics, raw polyvinyl butyral (PVB), recycled polyvinyl butyral (rPVB), polyvinyl acetate (PVAC), poly(vinyl butyrate), poly(vinyl propionate), poly(vinyl formate), and copolymers of PVAC (e.g., including, without limitation, copolymers of PVAC and EVA). Some non-limiting examples of the at least one polymer (e.g., including, without limitation, thermoplastic polymers, polyolefins, vinyl polymers, polyvinyl esters, and thermoplastic elastomers) may include, without limitation, one or more of the following: Vistamaxx® 6102 and Vistamaxx® 8880, which are polypropylenes (e.g., isotactic polypropylene (IPP)) and which are available from ExxonMobil, Irving, Tex.; Elvaloy®, which is a terpolymer and which is available from Dow/DuPont, Wilmington, Del.; Fusabond®, which is a chemically modified ethylene acrylate copolymer, a modified polyethylene, or any combination thereof and which is available from Dow/DuPont, Wilmington, Del.; RT2304, which is an amorphous polyalpha olefin (APAO) and which is available from Rextac APAO Polymers LLC, Odessa, Tex.; Eastoflex® P1023, which is an amorphous polyolefin (APO) comprising a propylene homopolymer and which is available from Eastman Chemical Company, Kingsport, Tenn.; Eastoflex® E1060, which is an amorphous polyolefin (APO) comprising a copolymer of propylene and ethylene and which is available from Eastman Chemical Company, Kingsport, Tenn.; Eastoflex® M1025, which is an amorphous polyolefin (APO) that comprises a blend of propylene homopolymer and copolymers of propylene and ethylene and which is available from Eastman Chemical Company, Kingsport, Tenn.; Engage® 7487, which is a polyolefin elastomer (POE) and which is available from Dow Inc., Midland, Mich.; SEBS 1657, which is a linear triblock copolymer based on styrene and ethylene/butylene, namely, styrene-ethylene/butylene-styrene (SEBS) and which is available Kraton™ Corporation, Houston, Tex.; D0243, D0246, D1101, D1102, D1116, D1118, D1152, D1155, D1157, D1184, D1189, D1191, and D1194, which are styrene butadiene styrene block copolymers comprising blocks of styrene and butadiene and which is available Kraton™ Corporation, Houston, Tex.; PI131350, which is a polyisobutylene and which is available from TPC Group, Houston, Tex.; ethylene bis stearamide (EBS), which is available from ACME-Hardesty Company, Blue Bell, Pa.; IPP, which is available from Bay Polymer Corp., Fremont, Calif.; and recycled low density polyethylene, which is available from Avangard Innovative, Houston, Tex.

In some embodiments, the at least one hydrocarbon oil, the at least one resin, and the at least one polymer may be selected sufficient to result in a material (e.g., a material, such as for example, a polymer blend, a coating or a coating material, or a roofing material) having at least one select property (e.g., at least one property desirable or suitable for roofing materials or roofing material applications, such as, for example and without limitation, a viscosity, a softening point, a penetration, or any combination thereof), which may include any one or more of the properties of the present disclosure. In some embodiments, the selection, the combination, or the selection and the combination of the at least one hydrocarbon oil, the at least one resin, and the at least one polymer to result in the material having the at least one select property may be based on one or more of the following: an amount of the at least one hydrocarbon oil present in the polymer blend, a viscosity of the at least one hydrocarbon oil, a softening point of the at least one hydrocarbon oil, an amount of the at least one resin present in the polymer blend, a viscosity of the at least one resin, a softening point of the at least one resin, an amount of the at least one polymer present in the polymer blend, a molecular weight of the at least one polymer, a viscosity of the at least one polymer, a softening point of the at least one polymer, a ratio of the at least one hydrocarbon oil to the at least one resin in the polymer blend, a ratio of the at least one hydrocarbon oil to the at least one polymer, an amount of the polymer blend present in the coating, and an amount of the polymer blend present in the coating material. In some embodiments, for example, the selection, the combination, or the selection and the combination of the at least one hydrocarbon oil, the at least one resin, and the at least one polymer may be selected from or based on one or more of the properties mentioned above, and discussed below and elsewhere throughout the present disclosure.

In some embodiments, the coating or the coating material may comprise at least 10% by weight of the at least one hydrocarbon oil based on the total weight of the polymer blend. In some embodiments, the coating or the coating material may comprise at least 15% by weight of the at least one hydrocarbon oil based on the total weight of the polymer blend. In some embodiments, the coating or the coating material may comprise at least 20% by weight of the at least one hydrocarbon oil based on the total weight of the polymer blend. In some embodiments, the coating or the coating material may comprise at least 25% by weight of the at least one hydrocarbon oil based on the total weight of the polymer blend. In some embodiments, the coating or the coating material may comprise at least 30% by weight of the at least one hydrocarbon oil based on the total weight of the polymer blend. In some embodiments, the coating or the coating material may comprise at least 35% by weight of the at least one hydrocarbon oil based on the total weight of the polymer blend. In some embodiments, the coating or the coating material may comprise at least 40% by weight of the at least one hydrocarbon oil based on the total weight of the polymer blend. In some embodiments, the coating or the coating material may comprise at least 45% by weight of the at least one hydrocarbon oil based on the total weight of the polymer blend. In some embodiments, the coating or the coating material may comprise at least 50% by weight of the at least one hydrocarbon oil based on the total weight of the polymer blend. In some embodiments, the coating or the coating material may comprise at least 55% by weight of the at least one hydrocarbon oil based on the total weight of the polymer blend. In some embodiments, the coating or the coating material may comprise at least 60% by weight of the at least one hydrocarbon oil based on the total weight of the polymer blend. In some embodiments, the coating or the coating material may comprise at least 65% by weight of the at least one hydrocarbon oil based on the total weight of the polymer blend. In some embodiments, the coating or the coating material may comprise at least 70% by weight of the at least one hydrocarbon oil based on the total weight of the polymer blend. In some embodiments, the coating or the coating material may comprise at least 75% by weight of the at least one hydrocarbon oil based on the total weight of the polymer blend. In some embodiments, the coating or the coating material may comprise at least 80% by weight of the at least one hydrocarbon oil based on the total weight of the polymer blend.

In some embodiments, the at least one hydrocarbon oil is present in an amount of less than 15% by weight based on the total weight of the polymer blend. In some embodiments, the at least one hydrocarbon oil is present in an amount of less than 20% by weight based on the total weight of the polymer blend. In some embodiments, the at least one hydrocarbon oil is present in an amount of less than 25% by weight based on the total weight of the polymer blend. In some embodiments, the at least one hydrocarbon oil is present in an amount of less than 30% by weight based on the total weight of the polymer blend. In some embodiments, the at least one hydrocarbon oil is present in an amount of less than 35% by weight based on the total weight of the polymer blend. In some embodiments, the at least one hydrocarbon oil is present in an amount of less than 40% by weight based on the total weight of the polymer blend. In some embodiments, the at least one hydrocarbon oil is present in an amount of less than 45% by weight based on the total weight of the polymer blend. In some embodiments, the at least one hydrocarbon oil is present in an amount of less than 50% by weight based on the total weight of the polymer blend. In some embodiments, the at least one hydrocarbon oil is present in an amount of less than 55% by weight based on the total weight of the polymer blend. In some embodiments, the at least one hydrocarbon oil is present in an amount of less than 60% by weight based on the total weight of the polymer blend. In some embodiments, the at least one hydrocarbon oil is present in an amount of less than 65% by weight based on the total weight of the polymer blend. In some embodiments, the at least one hydrocarbon oil is present in an amount of less than 70% by weight based on the total weight of the polymer blend. In some embodiments, the at least one hydrocarbon oil is present in an amount of less than 75% by weight based on the total weight of the polymer blend. In some embodiments, the at least one hydrocarbon oil is present in an amount of less than 80% by weight based on the total weight of the polymer blend. In some embodiments, the at least one hydrocarbon oil is present in an amount of less than 85% by weight based on the total weight of the polymer blend. In some embodiments, the at least one hydrocarbon oil may be present in an amount of less than 90% by weight based on the total weight of the polymer blend.

In some embodiments, the at least one hydrocarbon oil is present in an amount of 10% to 90% by weight based on the total weight of the polymer blend. In some embodiments, the at least one hydrocarbon oil is present in an amount of 15% to 85% by weight based on the total weight of the polymer blend. In some embodiments, the at least one hydrocarbon oil is present in an amount of 20% to 80% by weight based on the total weight of the polymer blend. In some embodiments, the at least one hydrocarbon oil is present in an amount of 25% to 75% by weight based on the total weight of the polymer blend. In some embodiments, the at least one hydrocarbon oil is present in an amount of 30% to 60% by weight based on the total weight of the polymer blend. In some embodiments, the at least one hydrocarbon oil is present in an amount of 35% to 60% by weight based on the total weight of the polymer blend. In some embodiments, the at least one hydrocarbon oil is present in an amount of 40% to 60% by weight based on the total weight of the polymer blend. In some embodiments, the at least one hydrocarbon oil is present in an amount of 45% to 60% by weight based on the total weight of the polymer blend. In some embodiments, the at least one hydrocarbon oil is present in an amount of 50% to 60% by weight based on the total weight of the polymer blend. In some embodiments, the at least one hydrocarbon oil is present in an amount of 55% to 60% by weight based on the total weight of the polymer blend. In some embodiments, the at least one hydrocarbon oil is present in an amount of 30% to 55% by weight based on the total weight of the polymer blend. In some embodiments, the at least one hydrocarbon oil is present in an amount of 30 to 50% by weight based on the total weight of the polymer blend. In some embodiments, the at least one hydrocarbon oil is present in an amount of 30% to 45% by weight based on the total weight of the polymer blend. In some embodiments, the at least one hydrocarbon oil is present in an amount of 30% to 40% by weight based on the total weight of the polymer blend. In some embodiments, the at least one hydrocarbon oil is present in an amount of 30% to 35% by weight based on the total weight of the polymer blend.

In some embodiments, the coating or the coating material may comprise at least 10% by weight of the at least one resin based on the total weight of the polymer blend. In some embodiments, the coating or the coating material may comprise at least 15% by weight of the at least one resin based on the total weight of the polymer blend. In some embodiments, the coating or the coating material may comprise at least 20% by weight of the at least one resin based on the total weight of the polymer blend. In some embodiments, the coating or the coating material may comprise at least 25% by weight of the at least one resin based on the total weight of the polymer blend. In some embodiments, the coating or the coating material may comprise at least 30% by weight of the at least one resin based on the total weight of the polymer blend. In some embodiments, the coating or the coating material may comprise at least 35% by weight of the at least one resin based on the total weight of the polymer blend. In some embodiments, the coating or the coating material may comprise at least 40% by weight of the at least one resin based on the total weight of the polymer blend. In some embodiments, the coating or the coating material may comprise at least 45% by weight of the at least one resin based on the total weight of the polymer blend. In some embodiments, the coating or the coating material may comprise at least 50% by weight of the at least one resin based on the total weight of the polymer blend. In some embodiments, the coating or the coating material may comprise at least 55% by weight of the at least one resin based on the total weight of the polymer blend. In some embodiments, the coating or the coating material may comprise at least 60% by weight of the at least one resin based on the total weight of the polymer blend. In some embodiments, the coating or the coating material may comprise at least 65% by weight of the at least one resin based on the total weight of the polymer blend. In some embodiments, the coating or the coating material may comprise at least 70% by weight of the at least one resin based on the total weight of the polymer blend. In some embodiments, the coating or the coating material may comprise at least 75% by weight of the at least one resin based on the total weight of the polymer blend. In some embodiments, the coating or the coating material may comprise at least 80% by weight of the at least one resin based on the total weight of the polymer blend.

In some embodiments, the at least one resin is present in an amount of less than 15% by weight based on the total weight of the polymer blend. In some embodiments, the at least one resin is present in an amount of less than 20% by weight based on the total weight of the polymer blend. In some embodiments, the at least one resin is present in an amount of less than 25% by weight based on the total weight of the polymer blend. In some embodiments, the at least one resin is present in an amount of less than 30% by weight based on the total weight of the polymer blend. In some embodiments, the at least one resin is present in an amount of less than 35% by weight based on the total weight of the polymer blend. In some embodiments, the at least one resin is present in an amount of less than 40% by weight based on the total weight of the polymer blend. In some embodiments, the at least one resin is present in an amount of less than 45% by weight based on the total weight of the polymer blend. In some embodiments, the at least one resin is present in an amount of less than 50% by weight based on the total weight of the polymer blend. In some embodiments, the at least one resin is present in an amount of less than 55% by weight based on the total weight of the polymer blend. In some embodiments, the at least one resin is present in an amount of less than 60% by weight based on the total weight of the polymer blend. In some embodiments, the at least one resin is present in an amount of less than 65% by weight based on the total weight of the polymer blend. In some embodiments, the at least one resin is present in an amount of less than 70% by weight based on the total weight of the polymer blend. In some embodiments, the at least one resin is present in an amount of less than 75% by weight based on the total weight of the polymer blend. In some embodiments, the at least one resin is present in an amount of less than 80% by weight based on the total weight of the polymer blend. In some embodiments, the at least one resin is present in an amount of less than 85% by weight based on the total weight of the polymer blend. In some embodiments, the at least one resin may be present in an amount of less than 90% by weight based on the total weight of the polymer blend.

In some embodiments, the at least one resin is present in an amount of 10% to 90% by weight based on the total weight of the polymer blend. In some embodiments, the at least one resin is present in an amount of 15% to 85% by weight based on the total weight of the polymer blend. In some embodiments, the at least one resin is present in an amount of 20% to 80% by weight based on the total weight of the polymer blend. In some embodiments, the at least one resin is present in an amount of 25% to 75% by weight based on the total weight of the polymer blend. In some embodiments, the at least one resin is present in an amount of 30% to 60% by weight based on the total weight of the polymer blend. In some embodiments, the at least one resin is present in an amount of 35% to 60% by weight based on the total weight of the polymer blend. In some embodiments, the at least one resin is present in an amount of 40% to 60% by weight based on the total weight of the polymer blend. In some embodiments, the at least one resin is present in an amount of 45% to 60% by weight based on the total weight of the polymer blend. In some embodiments, the at least one resin is present in an amount of 50% to 60% by weight based on the total weight of the polymer blend. In some embodiments, the at least one resin is present in an amount of 55% to 60% by weight based on the total weight of the polymer blend. In some embodiments, the at least one resin is present in an amount of 30% to 55% by weight based on the total weight of the polymer blend. In some embodiments, the at least one resin is present in an amount of 30 to 50% by weight based on the total weight of the polymer blend. In some embodiments, the at least one resin is present in an amount of 30% to 45% by weight based on the total weight of the polymer blend. In some embodiments, the at least one resin is present in an amount of 30% to 40% by weight based on the total weight of the polymer blend. In some embodiments, the at least one resin is present in an amount of 30% to 35% by weight based on the total weight of the polymer blend.

As used herein, the term "softening point" may refer to a temperature at which a material softens beyond a predetermined reference softness.

In some embodiments, the at least one resin may have a softening point of less than 200° C. In some embodiments, the at least one resin may have a softening point of less than 195° C. In some embodiments, the at least one resin may have a softening point of less than 190° C. In some embodiments, the at least one resin may have a softening point of less than 185° C. In some embodiments, the at least one resin may have a softening point of less than 180° C. In some embodiments, the at least one resin may have a softening point of less than 175° C. In some embodiments, the at least one resin may have a softening point of less than 170° C. In some embodiments, the at least one resin may have a softening point of less than 165° C. In some embodiments, the at least one resin may have a softening point of less than 160° C. In some embodiments, the at least one resin may have a softening point of less than 155° C. In some embodiments, the at least one resin may have a softening point of less than 150° C. In some embodiments, the at least one resin may have a softening point of less than 145° C. In some embodiments, the at least one resin may have a softening point of less than 140° C. In some embodiments, the at least one resin may have a softening point of less than 135° C. In some embodiments, the at least one resin may have a softening point of less than 130° C. In some embodiments, the at least one resin may have a softening point of less than 125° C. In some embodiments, the at least one resin may have a softening point of less than 120° C. In some embodiments, the at least one resin may have a softening point of less than 115° C. In some embodiments, the at least one resin may have a softening point of less than 110° C. In some embodiments, the at least one resin may have a softening point of less than 105° C. In some embodiments, the at least one resin may have a softening point of less than 100° C. In some embodiments, the at least one resin may have a softening point of less than 95° C. In some embodiments, the at least one resin may have a softening point of less than 90° C. In some embodiments, the softening point is measured according to ASTM D6090. In some embodiments, the softening point is measured according to ASTM E28-99. In some embodiments, the softening point may be measured according to ASTM D3461.

In some embodiments, the at least one resin may have a softening point of at least 70° C. In some embodiments, the at least one resin may have a softening point of at least 75° C. In some embodiments, the at least one resin may have a softening point of at least 80° C. In some embodiments, the at least one resin may have a softening point of at least 85° C. In some embodiments, the at least one resin may have a softening point of at least 90° C. In some embodiments, the at least one resin may have a softening point of at least 95° C. In some embodiments, the at least one resin may have a softening point of at least 100° C. In some embodiments, the at least one resin may have a softening point of at least 105° C. In some embodiments, the at least one resin may have a softening point of at least 110° C. In some embodiments, the at least one resin may have a softening point of at least 115° C. In some embodiments, the at least one resin may have a softening point of at least 120° C. In some embodiments, the at least one resin may have a softening point of at least 125° C. In some embodiments, the at least one resin may have a softening point of at least 130° C. In some embodiments, the at least one resin may have a softening point of at least 135° C. In some embodiments, the at least one resin may have a softening point of at least 140° C. In some embodiments, the at least one resin may have a softening point of at least 145° C. In some embodiments, the at least one resin may have a softening point of at least 150° C. In some embodiments, the at least one resin may have a softening point of at least 155° C. In some embodiments, the at least one resin may have a softening point of at least 160° C. In some embodiments, the at least one resin may have a softening point of at least 165° C. In some embodiments, the at least one resin may have a softening point of at least 170° C. In some embodiments, the at least one resin may have a softening point of at least 175° C. In some embodiments, the at least one resin may have a softening point of at least 180° C. In some embodiments, the softening point is measured according to ASTM D6090. In some embodiments, the softening point is measured according to ASTM E28-99. In some embodiments, the softening point may be measured according to ASTM D3461.

In some embodiments, the at least one resin may have a softening point of 50° C. to 400° C. In some embodiments, the at least one resin may have a softening point of 70° C. to 200° C. In some embodiments, the at least one resin may have a softening point of 70° C. to 195° C. In some embodiments, the at least one resin may have a softening point of 70° C. to 190° C. In some embodiments, the at least one resin may have a softening point of 70° C. to 185° C. In some embodiments, the at least one resin may have a softening point of 70° C. to 180° C. In some embodiments, the at least one resin may have a softening point of 70° C. to 175° C. In some embodiments, the at least one resin may have a softening point of 70° C. to 170° C. In some embodiments, the at least one resin may have a softening point of 70° C. to 165° C. In some embodiments, the at least one resin may have a softening point of 70° C. to 160° C. In some embodiments, the at least one resin may have a softening point of 70° C. to 155° C. In some embodiments, the at least one resin may have a softening point of 70° C. to 150° C. In some embodiments, the at least one resin may have a softening point of 70° C. to 145° C. In some embodiments, the at least one resin may have a softening point of 70° C. to 140° C. In some embodiments, the at least one resin may have a softening point of 70° C. to 135° C. In some embodiments, the at least one resin may have a softening point of 70° C. to 130° C. In some embodiments, the at least one resin may have a softening point of 70° C. to 125° C. In some embodiments, the at least one resin may have a softening point of 70° C. to 120° C. In some embodiments, the at least one resin may have a softening point of 70° C. to 115° C. In some embodiments, the at least one resin may have a softening point of 70° C. to 110° C. In some embodiments, the at least one resin may have a softening point of 70° C. to 105° C. In some embodiments, the at least one resin may have a softening point of 70° C. to 100° C. In some embodiments, the at least one resin may have a softening point of 70° C. to 95° C. In some embodiments, the softening point is measured according to ASTM D6090. In some embodiments, the softening point is measured according to ASTM E28-99. In some embodiments, the softening point may be measured according to ASTM D3461.

In some embodiments, the at least one resin may have a softening point of 75° C. to 200° C. In some embodiments, the at least one resin may have a softening point of 80° C. to 200° C. In some embodiments, the at least one resin may have a softening point of 85° C. to 200° C. In some embodiments, the at least one resin may have a softening point of 90° C. to 200° C. In some embodiments, the at least one resin may have a softening point of 95° C. to 200° C. In some embodiments, the at least one resin may have a softening point of 100° C. to 200° C. In some embodiments, the at least one resin may have a softening point of 105° C. to 200° C. In some embodiments, the at least one resin may have a softening point of 110° C. to 200° C. In some embodiments, the at least one resin may have a softening point of 115° C. to 200° C. In some embodiments, the at least one resin may have a softening point of 120° C. to 200° C. In some embodiments, the at least one resin may have a softening point of 125° C. to 200° C. In some embodiments, the at least one resin may have a softening point of 130° C. to 200° C. In some embodiments, the at least one resin may have a softening point of 135° C. to 200° C. In some embodiments, the at least one resin may have a softening point of 140° C. to 200° C. In some embodiments, the at least one resin may have a softening point of 145° C. to 200° C. In some embodiments, the at least one resin may have a softening point of 150° C. to 200° C. In some embodiments, the at least one resin may have a softening point of 155° C.

to 200° C. In some embodiments, the at least one resin may have a softening point of 160° C. to 200° C. In some embodiments, the at least one resin may have a softening point of 165° C. to 200° C. In some embodiments, the at least one resin may have a softening point of 170° C. to 200° C. In some embodiments, the at least one resin may have a softening point of 175° C. to 200° C. In some embodiments, the at least one resin may have a softening point of 180° C. to 200° C. In some embodiments, the at least one resin may have a softening point of 185° C. to 200° C. In some embodiments, the softening point is measured according to ASTM D6090. In some embodiments, the softening point is measured according to ASTM E28-99. In some embodiments, the softening point may be measured according to ASTM D3461.

In some embodiments, the at least one resin may have a softening point of 50° C. to 400° C. In some embodiments, the at least one resin may have a softening point of 90° C. to 160° C. In some embodiments, the at least one resin may have a softening point of 90° C. to 155° C. In some embodiments, the at least one resin may have a softening point of 90° C. to 150° C. In some embodiments, the at least one resin may have a softening point of 90° C. to 145° C. In some embodiments, the at least one resin may have a softening point of 90° C. to 140° C. In some embodiments, the at least one resin may have a softening point of 90° C. to 135° C. In some embodiments, the at least one resin may have a softening point of 90° C. to 130° C. In some embodiments, the at least one resin may have a softening point of 90° C. to 125° C. In some embodiments, the at least one resin may have a softening point of 90° C. to 120° C. In some embodiments, the at least one resin may have a softening point of 90° C. to 115° C. In some embodiments, the at least one resin may have a softening point of 90° C. to 110° C. In some embodiments, the at least one resin may have a softening point of 90° C. to 105° C. In some embodiments, the at least one resin may have a softening point of 95° C. to 150° C. In some embodiments, the at least one resin may have a softening point of 100° C. to 125° C. In some embodiments, the at least one resin may have a softening point of 100° C. to 130° C. In some embodiments, the at least one resin may have a softening point of 100° C. to 135° C. In some embodiments, the at least one resin may have a softening point of 100° C. to 140° C. In some embodiments, the at least one resin may have a softening point of 100° C. to 145° C. In some embodiments, the at least one resin may have a softening point of 100° C. to 150° C. In some embodiments, the at least one resin may have a softening point of 105° C. to 150° C. In some embodiments, the at least one resin may have a softening point of 110° C. to 150° C. In some embodiments, the at least one resin may have a softening point of 115° C. to 150° C. In some embodiments, the at least one resin may have a softening point of 120° C. to 150° C. In some embodiments, the at least one resin may have a softening point of 125° C. to 150° C. In some embodiments, the at least one resin may have a softening point of 125° C. to 140° C. In some embodiments, the at least one resin may have a softening point of 130° C. to 150° C. In some embodiments, the at least one resin may have a softening point of 135° C. to 150° C. In some embodiments, the at least one resin may have a softening point of 140° C. to 150° C. In some embodiments, the at least one resin may have a softening point of 95° C. to 155° C. In some embodiments, the at least one resin may have a softening point of 105° C. to 145° C. In some embodiments, the at least one resin may have a softening point of 110° C. to 140° C. In some embodiments, the at least one resin may have a softening point of 115° C. to 135° C. In some embodiments, the at least one resin may have a softening point of 120° C. to 130° C. In some embodiments, the softening point is measured according to ASTM D6090. In some embodiments, the softening point is measured according to ASTM E28-99. In some embodiments, the softening point may be measured according to ASTM D3461.

In some embodiments, the coating may comprise at least 0.01% by weight of the at least one polymer based on the total weight of the polymer blend. In some embodiments, the coating may comprise at least 0.5% by weight of the at least one polymer based on the total weight of the polymer blend. In some embodiments, the coating may comprise at least 1% by weight of the at least one polymer based on the total weight of the polymer blend. In some embodiments, the coating may comprise at least 2% by weight of the at least one polymer based on the total weight of the polymer blend. In some embodiments, the coating may comprise at least 2.5% by weight of the at least one polymer based on the total weight of the polymer blend. In some embodiments, the coating may comprise at least 3% by weight of the at least one polymer based on the total weight of the polymer blend. In some embodiments, the coating may comprise at least 3.5% by weight of the at least one polymer based on the total weight of the polymer blend. In some embodiments, the coating may comprise at least 4% by weight of the at least one polymer based on the total weight of the polymer blend. In some embodiments, the coating may comprise at least 4.5% by weight of the at least one polymer based on the total weight of the polymer blend. In some embodiments, the coating may comprise at least 5% by weight of the at least one polymer based on the total weight of the polymer blend. In some embodiments, the coating may comprise at least 5.5% by weight of the at least one polymer based on the total weight of the polymer blend. In some embodiments, the coating may comprise at least 6% by weight of the at least one polymer based on the total weight of the polymer blend. In some embodiments, the coating may comprise at least 6.5% by weight of the at least one polymer based on the total weight of the polymer blend. In some embodiments, the coating may comprise at least 7% by weight of the at least one polymer based on the total weight of the polymer blend. In some embodiments, the coating may comprise at least 7.5% by weight of the at least one polymer based on the total weight of the polymer blend. In some embodiments, the coating may comprise at least 8% by weight of the at least one polymer based on the total weight of the polymer blend. In some embodiments, the coating may comprise at least 8.5% by weight of the at least one polymer based on the total weight of the polymer blend. In some embodiments, the coating may comprise at least 9% by weight of the at least one polymer based on the total weight of the polymer blend. In some embodiments, the coating may comprise at least 9.5% by weight of the at least one polymer based on the total weight of the polymer blend. In some embodiments, the coating may comprise at least 10.5% by weight of the at least one polymer based on the total weight of the polymer blend. In some embodiments, the coating may comprise at least 11% by weight of the at least one polymer based on the total weight of the polymer blend. In some embodiments, the coating may comprise at least 11.5% by weight of the at least one polymer based on the total weight of the polymer blend. In some embodiments, the coating may comprise at least 12% by weight of the at least one polymer based on the total weight of the polymer blend. In some embodiments, the coating may comprise at least 12.5% by weight of the at least one polymer based on the total weight of the polymer blend.

In some embodiments, the coating may comprise at least 13% by weight of the at least one polymer based on the total weight of the polymer blend. In some embodiments, the coating may comprise at least 13.5% by weight of the at least one polymer based on the total weight of the polymer blend. In some embodiments, the coating may comprise at least 14% by weight of the at least one polymer based on the total weight of the polymer blend. In some embodiments, the coating may comprise at least 14.5% by weight of the at least one polymer based on the total weight of the polymer blend. In some embodiments, the coating may comprise at least 15% by weight of the at least one polymer based on the total weight of the polymer blend. In some embodiments, the coating may comprise at least 15.5% by weight of the at least one polymer based on the total weight of the polymer blend. In some embodiments, the coating may comprise at least 16% by weight of the at least one polymer based on the total weight of the polymer blend. In some embodiments, the coating may comprise at least 16.5% by weight of the at least one polymer based on the total weight of the polymer blend. In some embodiments, the coating may comprise at least 17% by weight of the at least one polymer based on the total weight of the polymer blend. In some embodiments, the coating may comprise at least 17.5% by weight of the at least one polymer based on the total weight of the polymer blend. In some embodiments, the coating may comprise at least 18% by weight of the at least one polymer based on the total weight of the polymer blend. In some embodiments, the coating may comprise at least 18.5% by weight of the at least one polymer based on the total weight of the polymer blend. In some embodiments, the coating may comprise at least 19% by weight of the at least one polymer based on the total weight of the polymer blend. In some embodiments, the coating may comprise at least 19.5% by weight of the at least one polymer based on the total weight of the polymer blend. In some embodiments, the coating may comprise at least 20% by weight of the at least one polymer based on the total weight of the polymer blend. In some embodiments, the coating may comprise at least 30% by weight of the at least one polymer based on the total weight of the polymer blend. In some embodiments, the coating may comprise at least 40% by weight of the at least one polymer based on the total weight of the polymer blend. In some embodiments, the coating may comprise at least 50% by weight of the at least one polymer based on the total weight of the polymer blend.

In some embodiments, the at least one polymer may be present in an amount of 0.01% to 50% by weight based on the total weight of the polymer blend. In some embodiments, the at least one polymer may be present in an amount of 5% to 50% by weight based on the total weight of the polymer blend. In some embodiments, the at least one polymer may be present in an amount of 5% to 45% by weight based on the total weight of the polymer blend. In some embodiments, the at least one polymer may be present in an amount of 5% to 40% by weight based on the total weight of the polymer blend. In some embodiments, the at least one polymer may be present in an amount of 5% to 35% by weight based on the total weight of the polymer blend. In some embodiments, the at least one polymer may be present in an amount of 5% to 30% by weight based on the total weight of the polymer blend. In some embodiments, the at least one polymer may be present in an amount of 5% to 25% by weight based on the total weight of the polymer blend. In some embodiments, the at least one polymer may be present in an amount of 5% to 20% by weight based on the total weight of the polymer blend. In some embodiments, the at least one polymer may be present in an amount of 5% to 15% by weight based on the total weight of the polymer blend. In some embodiments, the at least one polymer may be present in an amount of 5% to 10% by weight based on the total weight of the polymer blend. In some embodiments, the at least one polymer may be present in an amount of 10% to 50% by weight based on the total weight of the polymer blend. In some embodiments, the at least one polymer may be present in an amount of 15% to 50% by weight based on the total weight of the polymer blend. In some embodiments, the at least one polymer may be present in an amount of 20% to 50% by weight based on the total weight of the polymer blend. In some embodiments, the at least one polymer may be present in an amount of 25% to 50% by weight based on the total weight of the polymer blend. In some embodiments, the at least one polymer may be present in an amount of 30% to 50% by weight based on the total weight of the polymer blend. In some embodiments, the at least one polymer may be present in an amount of 35% to 50% by weight based on the total weight of the polymer blend. In some embodiments, the at least one polymer may be present in an amount of 40% to 50% by weight based on the total weight of the polymer blend. In some embodiments, the at least one polymer may be present in an amount of 45% to 50% by weight based on the total weight of the polymer blend. In some embodiments, the at least one polymer may be present in an amount of 0.1% to 20% by weight based on the total weight of the polymer blend. In some embodiments, the at least one polymer may be present in an amount of 0.01% to 15% by weight based on the total weight of the polymer blend. In some embodiments, the at least one polymer may be present in an amount of 0.1% to 14% by weight based on the total weight of the polymer blend. In some embodiments, the at least one polymer may be present in an amount of 0.5% to 13% by weight based on the total weight of the polymer blend. In some embodiments, the at least one polymer may be present in an amount of 1% to 12% by weight based on the total weight of the polymer blend. In some embodiments, the at least one polymer may be present in an amount of 2% to 12% by weight based on the total weight of the polymer blend. In some embodiments, the at least one polymer may be present in an amount of 3% to 12% by weight based on the total weight of the polymer blend. In some embodiments, the at least one polymer may be present in an amount of 4% to 12% by weight based on the total weight of the polymer blend. In some embodiments, the at least one polymer may be present in an amount of 5% to 12% by weight based on the total weight of the polymer blend. In some embodiments, the at least one polymer may be present in an amount of 6% to 12% by weight based on the total weight of the polymer blend. In some embodiments, the at least one polymer may be present in an amount of 7% to 12% by weight based on the total weight of the polymer blend. In some embodiments, the at least one polymer may be present in an amount of 8% to 12% by weight based on the total weight of the polymer blend. In some embodiments, the at least one polymer may be present in an amount of 3% to 11% by weight based on the total weight of the polymer blend. In some embodiments, the at least one polymer may be present in an amount of 4% to 10% by weight based on the total weight of the polymer blend. In some embodiments, the at least one polymer may be present in an amount of 5% to 9% by weight based on the total weight of the polymer blend. In some embodiments, the at least one polymer may be present in an amount of 6% to 8% by weight based on the total weight of the polymer blend.

In some embodiments, the at least one polymer may have a molecular weight of at least 50 kDa. In some embodiments, the at least one polymer may have a molecular weight of at least 60 kDa. In some embodiments, the at least one polymer may have a molecular weight of at least 70 kDa. In some embodiments, the at least one polymer may have a molecular weight of at least 80 kDa. In some embodiments, the at least one polymer may have a molecular weight of at least 90 kDa. In some embodiments, the at least one polymer may have a molecular weight of at least 100 kDa. In some embodiments, the at least one polymer may have a molecular weight of at least 110 kDa. In some embodiments, the at least one polymer may have a molecular weight of at least 120 kDa. In some embodiments, the at least one polymer may have a molecular weight of at least 130 kDa. In some embodiments, the at least one polymer may have a molecular weight of at least 140 kDa. In some embodiments, the at least one polymer may have a molecular weight of at least 150 kDa. In some embodiments, the at least one polymer may have a molecular weight of at least 155 kDa. In some embodiments, the at least one polymer may have a molecular weight of at least 160 kDa. In some embodiments, the at least one polymer may have a molecular weight of at least 165 kDa. In some embodiments, the at least one polymer may have a molecular weight of at least 170 kDa. In some embodiments, the at least one polymer may have a molecular weight of at least 175 kDa. In some embodiments, the at least one polymer may have a molecular weight of at least 180 kDa. In some embodiments, the at least one polymer may have a molecular weight of at least 185 kDa. In some embodiments, the at least one polymer may have a molecular weight of at least 190 kDa. In some embodiments, the at least one polymer may have a molecular weight of at least 195 kDa. In some embodiments, the at least one polymer may have a molecular weight of at least 200 kDa. In some embodiments, the at least one polymer may have a molecular weight of at least 210 kDa. In some embodiments, the at least one polymer may have a molecular weight of at least 220 kDa. In some embodiments, the at least one polymer may have a molecular weight of at least 230 kDa. In some embodiments, the at least one polymer may have a molecular weight of at least 240 kDa. In some embodiments, the at least one polymer may have a molecular weight of at least 250 kDa. In some embodiments, the at least one polymer may have a molecular weight of at least 260 kDa. In some embodiments, the at least one polymer may have a molecular weight of at least 270 kDa. In some embodiments, the at least one polymer may have a molecular weight of at least 280 kDa. In some embodiments, the at least one polymer may have a molecular weight of at least 290 kDa. In some embodiments, the at least one polymer may have a molecular weight of at least 300 kDa. In some embodiments, the at least one polymer may have a molecular weight of at least 310 kDa. In some embodiments, the at least one polymer may have a molecular weight of at least 320 kDa. In some embodiments, the at least one polymer may have a molecular weight of at least 330 kDa. In some embodiments, the at least one polymer may have a molecular weight of at least 340 kDa. In some embodiments, the at least one polymer may have a molecular weight of at least 350 kDa. In some embodiments, the at least one polymer may have a molecular weight of at least 360 kDa. In some embodiments, the at least one polymer may have a molecular weight of at least 370 kDa. In some embodiments, the at least one polymer may have a molecular weight of at least 380 kDa. In some embodiments, the at least one polymer may have a molecular weight of at least 390 kDa. In some embodiments, the at least one polymer may have a molecular weight of at least 400 kDa. In some embodiments, the at least one polymer may have a molecular weight of at least 420 kDa. In some embodiments, the at least one polymer may have a molecular weight of at least 425 kDa. In some embodiments, the at least one polymer may have a molecular weight of at least 440 kDa. In some embodiments, the at least one polymer may have a molecular weight of at least 445 kDa. In some embodiments, the at least one polymer may have a molecular weight of at least 450 kDa. In some embodiments, the at least one polymer may have a molecular weight of at least 460 kDa. In some embodiments, the at least one polymer may have a molecular weight of at least 475 kDa. In some embodiments, the at least one polymer may have a molecular weight of at least 480 kDa. In some embodiments, the at least one polymer may have a molecular weight of at least 500 kDa. In some embodiments, the molecular weight of the at least one polymer may be measured by gel permeation chromatography (GPC).

In some embodiments, the at least one polymer may have a molecular weight of less than 60 kDa. In some embodiments, the at least one polymer may have a molecular weight of less than 70 kDa. In some embodiments, the at least one polymer may have a molecular weight of less than 80 kDa. In some embodiments, the at least one polymer may have a molecular weight of less than 90 kDa. In some embodiments, the at least one polymer may have a molecular weight of less than 100 kDa. In some embodiments, the at least one polymer may have a molecular weight of less than 110 kDa. In some embodiments, the at least one polymer may have a molecular weight of less than 120 kDa. In some embodiments, the at least one polymer may have a molecular weight of less than 130 kDa. In some embodiments, the at least one polymer may have a molecular weight of less than 140 kDa. In some embodiments, the at least one polymer may have a molecular weight of less than 150 kDa. In some embodiments, the at least one polymer may have a molecular weight of less than 155 kDa. In some embodiments, the at least one polymer may have a molecular weight of less than 160 kDa. In some embodiments, the at least one polymer may have a molecular weight of less than 165 kDa. In some embodiments, the at least one polymer may have a molecular weight of less than 170 kDa. In some embodiments, the at least one polymer may have a molecular weight of less than 175 kDa. In some embodiments, the at least one polymer may have a molecular weight of less than 180 kDa. In some embodiments, the at least one polymer may have a molecular weight of less than 185 kDa. In some embodiments, the at least one polymer may have a molecular weight of less than 190 kDa. In some embodiments, the at least one polymer may have a molecular weight of less than 195 kDa. In some embodiments, the at least one polymer may have a molecular weight of less than 200 kDa. In some embodiments, the at least one polymer may have a molecular weight of less than 210 kDa. In some embodiments, the at least one polymer may have a molecular weight of less than 220 kDa. In some embodiments, the at least one polymer may have a molecular weight of less than 230 kDa. In some embodiments, the at least one polymer may have a molecular weight of less than 240 kDa. In some embodiments, the at least one polymer may have a molecular weight of less than 250 kDa. In some embodiments, the at least one polymer may have a molecular weight of less than 260 kDa. In some embodiments, the at least one polymer may have a molecular weight of less than 270 kDa. In some embodiments, the at least one polymer may have a molecular weight of less than 280 kDa. In some embodiments, the at least one polymer may have a molecular weight of less than 290 kDa. In some embodiments, the at least one polymer may have a molecular weight of less than 300 kDa. In some embodiments, the at least one polymer may have a molecular weight of less than 310 kDa. In some embodiments, the at least one polymer may have a molecular weight of less than 320 kDa. In some embodiments, the at least one polymer may have a molecular weight of less than 330 kDa. In some embodiments, the at least one polymer may have a molecular weight of less than 340 kDa. In some embodiments, the at least one polymer may have a molecular weight of less than 350 kDa. In some embodiments, the at least one polymer may have a molecular weight of less than 360 kDa. In some embodiments, the at least one polymer may have a molecular weight of less than 370 kDa. In some embodiments, the at least one polymer may have a molecular weight of less than 380 kDa. In some embodiments, the at least one polymer may have a molecular weight of less than 390 kDa. In some embodiments, the at least one polymer may have a molecular weight of less than 400 kDa. In some embodiments, the at least one polymer may have a molecular weight of less than 420 kDa. In some embodiments, the at least one polymer may have a molecular weight of less than 425 kDa. In some embodiments, the at least one polymer may have a molecular weight of less than 440 kDa. In some embodiments, the at least one polymer may have a molecular weight of less than 445 kDa. In some embodiments, the at least one polymer may have a molecular weight of less than 450 kDa. In some embodiments, the at least one polymer may have a molecular weight of less than 460 kDa. In some embodiments, the at least one polymer may have a molecular weight of less than 475 kDa. In some embodiments, the at least one polymer may have a molecular weight of less than 480 kDa. In some embodiments, the at least one polymer may have a molecular weight of less than 500 kDa. In some embodiments, the molecular weight of the at least one polymer may be measured by gel permeation chromatography (GPC).

In some embodiments, the at least one polymer may have a molecular weight of 60 kDa to 500 kDa. In some embodiments, the at least one polymer may have a molecular weight of 80 kDa to 480 kDa. In some embodiments, the at least one polymer may have a molecular weight of 100 kDa to 460 kDa. In some embodiments, the at least one polymer may have a molecular weight of 120 kDa to 440 kDa. In some embodiments, the at least one polymer may have a molecular weight of 140 kDa to 420 kDa. In some embodiments, the at least one polymer may have a molecular weight of 150 kDa to 400 kDa. In some embodiments, the at least one polymer may have a molecular weight of 175 kDa to 400 kDa. In some embodiments, the at least one polymer may have a molecular weight of 200 kDa to 400 kDa. In some embodiments, the at least one polymer may have a molecular weight of 225 kDa to 400 kDa. In some embodiments, the at least one polymer may have a molecular weight of 250 kDa to 400 kDa. In some embodiments, the at least one polymer may have a molecular weight of 275 kDa to 400 kDa. In some embodiments, the at least one polymer may have a molecular weight of 300 kDa to 400 kDa. In some embodiments, the at least one polymer may have a molecular weight of 325 kDa to 400 kDa. In some embodiments, the at least one polymer may have a molecular weight of 350 kDa to 400 kDa. In some embodiments, the at least one polymer may have a molecular weight of 200 kDa to 375 kDa. In some embodiments, the at least one polymer may have a molecular weight of 200 kDa to 350 kDa. In some embodiments, the at least one polymer may have a molecular weight of 200 kDa to 325 kDa. In some embodiments, the at least one polymer may have a molecular weight of 200 kDa to 300 kDa. In some embodiments, the at least one polymer may have a molecular weight of 200 kDa to 275 kDa. In some embodiments, the at least one polymer may have a molecular weight of 200 kDa to 250 kDa. In some embodiments, the at least one polymer may have a molecular weight of 150 kDa to 375 kDa. In some embodiments, the at least one polymer may have a molecular weight of 150 kDa to 350 kDa. In some embodiments, the at least one polymer may have a molecular weight of 150 kDa to 325 kDa. In some embodiments, the at least one polymer may have a molecular weight of 150 kDa to 300 kDa. In some embodiments, the at least one polymer may have a molecular weight of 150 kDa to 275 kDa. In some embodiments, the at least one polymer may have a molecular weight of 150 kDa to 250 kDa. In some embodiments, the at least one polymer may have a molecular weight of 150 kDa to 225 kDa. In some embodiments, the at least one polymer may have a molecular weight of 150 kDa to 200 kDa. In some embodiments, the at least one polymer may have a molecular weight of 165 kDa to 500 kDa. In some embodiments, the at least one polymer may have a molecular weight of 165 kDa to 400 kDa. In some embodiments, the at least one polymer may have a molecular weight of 165 kDa to 300 kDa. In some embodiments, the molecular weight of the at least one polymer may be measured by gel permeation chromatography (GPC).

In some embodiments, the at least one resin has a softening point of less than 125° C., and the at least one polymer has a molecular weight of at least 165 kDa. In some embodiments, the at least one resin has a softening point of less than 120° C., and the at least one polymer has a molecular weight of at least 165 kDa. In some embodiments, the at least one resin has a softening point of less than 115° C., and the at least one polymer has a molecular weight of at least 165 kDa. In some embodiments, the at least one resin has a softening point of less than 110° C., and the at least one polymer has a molecular weight of at least 165 kDa. In some embodiments, the at least one resin has a softening point of less than 105° C., and the at least one polymer has a molecular weight of at least 165 kDa. In some embodiments, the at least one resin has a softening point of less than 125° C., and the at least one polymer has a molecular weight of at least 200 kDa. In some embodiments, the at least one resin has a softening point of less than 125° C., and the at least one polymer has a molecular weight of at least 250 kDa. In some embodiments, the at least one resin has a softening point of less than 125° C., and the at least one polymer has a molecular weight of at least 300 kDa. In some embodiments, the at least one resin has a softening point of less than 125° C., and the at least one polymer has a molecular weight of at least 350 kDa. In some embodiments, the at least one resin has a softening point of less than 125° C., and the at least one polymer has a molecular weight of at least 375 kDa. In some embodiments, the at least one resin has a softening point of less than 125° C., and the at least one polymer has a molecular weight of at least 400 kDa. In some embodiments, the softening point may be measured according to ASTM D6090. In some embodiments, the softening point may be measured according to ASTM E28-99. In some embodiments, the softening point may be measured according to ASTM D3461.

In some embodiments, the at least one resin has a softening point of 100° C. to 125° C., and at least one polymer has a molecular weight of 300 kDa to 400 kDa. In some embodiments, the at least one resin has a softening point of 100° C. to 105° C., and at least one polymer has a molecular weight of 300 kDa to 400 kDa. In some embodiments, the at least one resin has a softening point of 100° C. to 110° C., and at least one polymer has a molecular weight of 300 kDa to 400 kDa. In some embodiments, the at least one resin has a softening point of 120° C. to 125° C., and at least one polymer has a molecular weight of 300 kDa to 400 kDa. In some embodiments, the at least one resin has a softening point of 100° C. to 125° C., and at least one polymer has a molecular weight of 325 kDa to 400 kDa. In some embodiments, the at least one resin has a softening point of 100° C. to 125° C., and at least one polymer has a molecular weight of 350 kDa to 400 kDa. In some embodiments, the at least one resin has a softening point of 100° C. to 125° C., and at least one polymer has a molecular weight of 300 kDa to 375 kDa. In some embodiments, the at least one resin has a softening point of 100° C. to 125° C., and at least one polymer has a molecular weight of 300 kDa to 350 kDa. In some embodiments, the softening point may be measured according to ASTM D6090. In some embodiments, the softening point may be measured according to ASTM E28-99. In some embodiments, the softening point may be measured according to ASTM D3461.

In some embodiments, the at least one resin has a softening point of at least 125° C., and the at least one polymer has a molecular weight of at least 165 kDa. In some embodiments, the at least one resin has a softening point of at least 130° C., and the at least one polymer has a molecular weight of at least 165 kDa. In some embodiments, the at least one resin has a softening point of at least 135° C., and the at least one polymer has a molecular weight of at least 165 kDa. In some embodiments, the at least one resin has a softening point of at least 140° C., and the at least one polymer has a molecular weight of at least 165 kDa. In some embodiments, the at least one resin has a softening point of at least 125° C., and the at least one polymer has a molecular weight of at least 165 kDa. In some embodiments, the at least one resin has a softening point of at least 125° C., and the at least one polymer has a molecular weight of at least 200 kDa. In some embodiments, the at least one resin has a softening point of at least 125° C., and the at least one polymer has a molecular weight of at least 250 kDa. In some embodiments, the at least one resin has a softening point of at least 125° C., and the at least one polymer has a molecular weight of at least 300 kDa. In some embodiments, the at least one resin has a softening point of at least 125° C., and the at least one polymer has a molecular weight of at least 350 kDa. In some embodiments, the at least one resin has a softening point of at least 125° C., and the at least one polymer has a molecular weight of at least 400 kDa. In some embodiments, the softening point may be measured according to ASTM D6090. In some embodiments, the softening point may be measured according to ASTM E28-99. In some embodiments, the softening point may be measured according to ASTM D3461.

In some embodiments, the at least one resin has a softening point of 125° C. to 140° C., and the at least one polymer has a molecular weight of 300 kDa to 400 kDa. In some embodiments, the at least one resin has a softening point of 125° C. to 135° C., and the at least one polymer has a molecular weight of 300 kDa to 400 kDa. In some embodiments, the at least one resin has a softening point of 125° C. to 130° C., and the at least one polymer has a molecular weight of 300 kDa to 400 kDa. In some embodiments, the at least one resin has a softening point of 125° C. to 140° C., and the at least one polymer has a molecular weight of 325 kDa to 400 kDa. In some embodiments, the at least one resin has a softening point of 125° C. to 140° C., and the at least one polymer has a molecular weight of 350 kDa to 400 kDa. In some embodiments, the at least one resin has a softening point of 125° C. to 140° C., and the at least one polymer has a molecular weight of 375 kDa to 400 kDa. In some embodiments, the at least one resin has a softening point of 125° C. to 140° C., and the at least one polymer has a molecular weight of 300 kDa to 375 kDa. In some embodiments, the at least one resin has a softening point of 125° C. to 140° C., and the at least one polymer has a molecular weight of 300 kDa to 350 kDa. In some embodiments, the at least one resin has a softening point of 125° C. to 140° C., and the at least one polymer has a molecular weight of 300 kDa to 325 kDa. In some embodiments, the softening point may be measured according to ASTM D6090. In some embodiments, the softening point may be measured according to ASTM E28-99. In some embodiments, the softening point may be measured according to ASTM D3461.

In some embodiments, the at least one resin has a softening point of at least 125° C., the at least one polymer is present in an amount of 2% to 12% by weight of the polymer blend, and the at least one polymer has a molecular weight of 200 kDa or less. In some embodiments, the at least one resin has a softening point of at least 130° C., the at least one polymer is present in an amount of 2% to 12% by weight of the polymer blend, and the at least one polymer has a molecular weight of 200 kDa or less. In some embodiments, the at least one resin has a softening point of at least 135° C., the at least one polymer is present in an amount of 2% to 12% by weight of the polymer blend, and the at least one polymer has a molecular weight of 200 kDa or less. In some embodiments, the at least one resin has a softening point of at least 140° C., the at least one polymer is present in an amount of 2% to 12% by weight of the polymer blend, and the at least one polymer has a molecular weight of 200 kDa or less. In some embodiments, the softening point may be measured according to ASTM D6090. In some embodiments, the softening point may be measured according to ASTM E28-99. In some embodiments, the softening point may be measured according to ASTM D3461.

In some embodiments, the at least one resin has a softening point of 125° C. to 140° C., the at least one polymer is present in an amount of 2% to 12% by weight of the polymer blend, and the at least one polymer has a molecular weight of 10 kDa to 200 kDa. In some embodiments, the at least one resin has a softening point of 125° C. to 140° C., the at least one polymer is present in an amount of 2% to 12% by weight of the polymer blend, and the at least one polymer has a molecular weight of 100 kDa to 200 kDa. In some embodiments, the at least one resin has a softening point of 125° C. to 140° C., the at least one polymer is present in an amount of 2% to 12% by weight of the polymer blend, and the at least one polymer has a molecular weight of 120 kDa to 200 kDa. In some embodiments, the at least one resin has a softening point of 125° C. to 140° C., the at least one polymer is present in an amount of 2% to 12% by weight of the polymer blend, and the at least one polymer has a molecular weight of 130 kDa to 200 kDa. In some embodiments, the at least one resin has a softening point of 125° C. to 140° C., the at least one polymer is present in an amount of 2% to 12% by weight of the polymer blend, and the at least one polymer has a molecular weight of 140 kDa to 200 kDa. In some embodiments, the at least one resin has a softening point of 125° C. to 140° C., the at least one polymer is present in an amount of 2% to 12% by weight of the polymer blend, and the at least one polymer has a molecular weight of 150 kDa to 200 kDa. In some embodiments, the at least one resin has a softening point of 125° C. to 140° C., the at least one polymer is present in an amount of 2% to 12% by weight of the polymer blend, and the at least one polymer has a molecular weight of 160 kDa to 200 kDa. In some embodiments, the softening point may be measured according to ASTM D6090. In some embodiments, the softening point may be measured according to ASTM E28-99. In some embodiments, the softening point may be measured according to ASTM D3461.

In some embodiments, the ratio of the at least one hydrocarbon oil to the at least one resin is 1:1 to 10:1. In some embodiments, the ratio of the at least one hydrocarbon oil to the at least one resin is 1.01:1 to 10:1. In some embodiments, the ratio of the at least one hydrocarbon oil to the at least one resin is 1.5:1 to 10:1. In some embodiments, the ratio of the at least one hydrocarbon oil to the at least one resin is 2:1 to 10:1. In some embodiments, the ratio of the at least one hydrocarbon oil to the at least one resin is 3:1 to 10:1. In some embodiments, the ratio of the at least one hydrocarbon oil to the at least one resin is 4:1 to 10:1. In some embodiments, the ratio of the at least one hydrocarbon oil to the at least one resin is 5:1 to 10:1. In some embodiments, the ratio of the at least one hydrocarbon oil to the at least one resin is 6:1 to 10:1. In some embodiments, the ratio of the at least one hydrocarbon oil to the at least one resin is 7:1 to 10:1. In some embodiments, the ratio of the at least one hydrocarbon oil to the at least one resin is 8:1 to 10:1. In some embodiments, the ratio of the at least one hydrocarbon oil to the at least one resin is 9:1 to 10:1. In some embodiments, the ratio of the at least one hydrocarbon oil to the at least one resin is a weight ratio.

In some embodiments, the ratio of the at least one hydrocarbon oil to the at least one polymer is 1:1 to 10:1. In some embodiments, the ratio of the at least one hydrocarbon oil to the at least one polymer is 1.01:1 to 10:1. In some embodiments, the ratio of the at least one hydrocarbon oil to the at least one polymer is 1.5:1 to 10:1. In some embodiments, the ratio of the at least one hydrocarbon oil to the at least one polymer is 2:1 to 10:1. In some embodiments, the ratio of the at least one hydrocarbon oil to the at least one polymer is 3:1 to 10:1. In some embodiments, the ratio of the at least one hydrocarbon oil to the at least one polymer is 4:1 to 10:1. In some embodiments, the ratio of the at least one hydrocarbon oil to the at least one polymer is 5:1 to 10:1. In some embodiments, the ratio of the at least one hydrocarbon oil to the at least one polymer is 6:1 to 10:1. In some embodiments, the ratio of the at least one hydrocarbon oil to the at least one polymer is 7:1 to 10:1. In some embodiments, the ratio of the at least one hydrocarbon oil to the at least one polymer is 8:1 to 10:1. In some embodiments, the ratio of the at least one hydrocarbon oil to the at least one polymer is 9:1 to 10:1. In some embodiments, the ratio of the at least one hydrocarbon oil to the at least one polymer is a weight ratio.

In some embodiments, the ratio of the at least one hydrocarbon oil to the at least one polymer is 1:1 to 1:10. In some embodiments, the ratio of the at least one hydrocarbon oil to the at least one polymer is 1:2 to 1:10. In some embodiments, the ratio of the at least one hydrocarbon oil to the at least one polymer is 1:3 to 1:10. In some embodiments, the ratio of the at least one hydrocarbon oil to the at least one polymer is 1:4 to 1:10. In some embodiments, the ratio of the at least one hydrocarbon oil to the at least one polymer is 1:5 to 1:10. In some embodiments, the ratio of the at least one hydrocarbon oil to the at least one polymer is 1:6 to 1:10. In some embodiments, the ratio of the at least one hydrocarbon oil to the at least one polymer is 1:7 to 1:10. In some embodiments, the ratio of the at least one hydrocarbon oil to the at least one polymer is 1:8 to 1:10. In some embodiments, the ratio of the at least one hydrocarbon oil to the at least one polymer is 1:9 to 1:10. In some embodiments, the ratio of the at least one hydrocarbon oil to the at least one polymer is a weight ratio.

In some embodiments, the polymer blend may be present in an amount of 10% to 90% by weight based on a total weight of the coating or the coating material. In some embodiments, the polymer blend may be present in an amount of 15% to 90% by weight based on the total weight of the coating or the coating material. In some embodiments, the polymer blend may be present in an amount of 20% to 90% by weight based on the total weight of the coating or the coating material. In some embodiments, the polymer blend may be present in an amount of 25% to 90% by weight based on the total weight of the coating or the coating material. In some embodiments, the polymer blend may be present in an amount of 30% to 90% by weight based on the total weight of the coating or the coating material. In some embodiments, the polymer blend may be present in an amount of 35% to 90% by weight based on the total weight of the coating or the coating material. In some embodiments, the polymer blend may be present in an amount of 40% to 90% by weight based on the total weight of the coating or the coating material. In some embodiments, the polymer blend may be present in an amount of 45% to 90% by weight based on the total weight of the coating or the coating material. In some embodiments, the polymer blend may be present in an amount of 50% to 90% by weight based on the total weight of the coating or the coating material. In some embodiments, the polymer blend may be present in an amount of 55% to 90% by weight based on the total weight of the coating or the coating material. In some embodiments, the polymer blend may be present in an amount of 60% to 90% by weight based on the total weight of the coating or the coating material. In some embodiments, the polymer blend may be present in an amount of 65% to 90% by weight based on the total weight of the coating or the coating material. In some embodiments, the polymer blend may be present in an amount of 70% to 90% by weight based on the total weight of the coating or the coating material. In some embodiments, the polymer blend may be present in an amount of 75% to 90% by weight based on the total weight of the coating or the coating material. In some embodiments, the polymer blend may be present in an amount of 80% to 90% by weight based on the total weight of the coating or the coating material.

In some embodiments, the polymer blend may be present in an amount of 10% to 85% by weight based on the total weight of the coating or the coating material. In some embodiments, the polymer blend may be present in an amount of 10% to 80% by weight based on the total weight of the coating or the coating material. In some embodiments, the polymer blend may be present in an amount of 10% to 75% by weight based on the total weight of the coating or the coating material. In some embodiments, the polymer blend may be present in an amount of 10% to 70% by weight based on the total weight of the coating or the coating material. In some embodiments, the polymer blend may be present in an amount of 10% to 65% by weight based on the total weight of the coating or the coating material. In some embodiments, the polymer blend may be present in an amount of 10% to 60% by weight based on the total weight of the coating or the coating material. In some embodiments, the polymer blend may be present in an amount of 10% to 55% by weight based on the total weight of the coating or the coating material. In some embodiments, the polymer blend may be present in an amount of 10% to 50% by weight based on the total weight of the coating or the coating material. In some embodiments, the polymer blend may be present in an amount of 10% to 45% by weight based on the total weight of the coating or the coating material. In some embodiments, the polymer blend may be present in an amount of 10% to 40% by weight based on the total weight of the coating or the coating material. In some embodiments, the polymer blend may be present in an amount of 10% to 35% by weight based on the total weight of the coating or the coating material. In some embodiments, the polymer blend may be present in an amount of 10% to 30% by weight based on the total weight of the coating or the coating material. In some embodiments, the polymer blend may be present in an amount of 10% to 25% by weight based on the total weight of the coating or the coating material. In some embodiments, the polymer blend may be present in an amount of 10% to 20% by weight based on the total weight of the coating or the coating material.

In some embodiments, the polymer blend may be present in an amount of 20% to 80% by weight based on the total weight of the coating or the coating material. In some embodiments, the polymer blend may be present in an amount of 20% to 70% by weight based on the total weight of the coating or the coating material. In some embodiments, the polymer blend may be present in an amount of 20% to 60% by weight based on the total weight of the coating or the coating material. In some embodiments, the polymer blend may be present in an amount of 20% to 50% by weight based on the total weight of the coating or the coating material. In some embodiments, the polymer blend may be present in an amount of 20% to 40% by weight based on the total weight of the coating or the coating material. In some embodiments, the polymer blend may be present in an amount of 25% to 50% by weight based on the total weight of the coating or the coating material. In some embodiments, the polymer blend may be present in an amount of 30% to 50% by weight based on the total weight of the coating or the coating material. In some embodiments, the polymer blend may be present in an amount of 35% to 50% by weight based on the total weight of the coating or the coating material. In some embodiments, the polymer blend may be present in an amount of 40% to 50% by weight based on the total weight of the coating or the coating material.

In some embodiments, a softening point of the polymer blend is at least 190° F. In some embodiments, the softening point of the polymer blend is at least 195° F. In some embodiments, the softening point of the polymer blend is at least 200° F. In some embodiments, the softening point of the polymer blend is at least 205° F. In some embodiments, the softening point of the polymer blend is at least 210° F. In some embodiments, the softening point of the polymer blend is at least 215° F. In some embodiments, the softening point of the polymer blend is at least 220° F. In some embodiments, the softening point of the polymer blend is at least 225° F. In some embodiments, the softening point of the polymer blend is at least 230° F. In some embodiments, the softening point of the polymer blend is at least 235° F. In some embodiments, the softening point of the polymer blend is at least 240° F. In some embodiments, the softening point of the polymer blend is at least 245° F. In some embodiments, the softening point of the polymer blend is at least 250° F. In some embodiments, the softening point of the polymer blend is at least 255° F. In some embodiments, the softening point of the polymer blend is at least 260° F. In some embodiments, the softening point of the polymer blend is at least 265° F. In some embodiments, the softening point of the polymer blend is at least 270° F. In some embodiments, the softening point of the polymer blend is at least 275° F. In some embodiments, the softening point of the polymer blend is at least 280° F. In some embodiments, the softening point may be measured according to ASTM D3461.

In some embodiments, the softening point of the polymer blend may be 200° F. to 300° F. In some embodiments, the softening point of the polymer blend may be 200° F. to 290° F. In some embodiments, the softening point of the polymer blend may be 200° F. to 280° F. In some embodiments, the softening point of the polymer blend may be 200° F. to 275° F. In some embodiments, the softening point of the polymer blend may be 200° F. to 270° F. In some embodiments, the softening point of the polymer blend may be 200° F. to 265° F. In some embodiments, the softening point of the polymer blend may be 200° F. to 260° F. In some embodiments, the softening point of the polymer blend may be 200° F. to 255° F. In some embodiments, the softening point of the polymer blend may be 200° F. to 250° F. In some embodiments, the softening point of the polymer blend may be 200° F. to 245° F. In some embodiments, the softening point of the polymer blend may be 200° F. to 240° F. In some embodiments, the softening point of the polymer blend may be 200° F. to 235° F. In some embodiments, the softening point of the polymer blend may be 200° F. to 230° F. In some embodiments, the softening point of the polymer blend may be 200° F. to 225° F. In some embodiments, the softening point of the polymer blend may be 200° F. to 220° F. In some embodiments, the softening point of the polymer blend may be 205° F. to 300° F. In some embodiments, the softening point of the polymer blend may be 210° F. to 300° F. In some embodiments, the softening point of the polymer blend may be 215° F. to 300° F. In some embodiments, the softening point of the polymer blend may be 220° F. to 300° F. In some embodiments, the softening point of the polymer blend may be 225° F. to 300° F. In some embodiments, the softening point of the polymer blend may be 230° F. to 300° F. In some embodiments, the softening point of the polymer blend may be 235° F. to 300° F. In some embodiments, the softening point of the polymer blend may be 240° F. to 300° F. In some embodiments, the softening point of the polymer blend may be 245° F. to 300° F. In some embodiments, the softening point of the polymer blend may be 250° F. to 300° F. In some embodiments, the softening point of the polymer blend may be 255° F. to 300° F. In some embodiments, the softening point of the polymer blend may be 260° F. to 300° F. In some embodiments, the softening point of the polymer blend may be 265° F. to 300° F. In some embodiments, the softening point of the polymer blend may be 270° F. to 300° F. In some embodiments, the softening point of the polymer blend may be 275° F. to 300° F. In some embodiments, the softening point of the polymer blend may be 280° F. to 300° F. In some embodiments, the softening point may be measured according to ASTM D3461.

In some embodiments, the viscosity of the polymer blend is 10000 cP or less. In some embodiments, the viscosity of the polymer blend is 9500 cP or less. In some embodiments, the viscosity of the polymer blend is 9000 cP or less. In some embodiments, the viscosity of the polymer blend is 8500 cP or less. In some embodiments, the viscosity of the polymer blend is 8000 cP or less. In some embodiments, the viscosity of the polymer blend is 7500 cP or less. In some embodiments, the viscosity of the polymer blend is 7000 cP or less. In some embodiments, the viscosity of the polymer blend is 6500 cP or less. In some embodiments, the viscosity of the polymer blend is 6000 cP or less. In some embodiments, the viscosity of the polymer blend is 5500 cP or less. In some embodiments, the viscosity of the polymer blend is 5000 cP or less. In some embodiments, the viscosity of the polymer blend is 4500 cP or less. In some embodiments, the viscosity of the polymer blend is 4000 cP or less. In some embodiments, the viscosity of the polymer blend is 3500 cP or less. In some embodiments, the viscosity of the polymer blend is 3000 cP or less. In some embodiments, the viscosity of the polymer blend is 2500 cP or less. In some embodiments, the viscosity of the polymer blend is 2000 cP or less. In some embodiments, the viscosity may be measured according to ASTM D4402 using a #31 spindle at 400° F.

In some embodiments, a viscosity of the polymer blend is at least 200 cP. In some embodiments, a viscosity of the polymer blend is at least 250 cP. In some embodiments, a viscosity of the polymer blend is at least 500 cP. In some embodiments, a viscosity of the polymer blend is at least 750 cP. In some embodiments, a viscosity of the polymer blend is at least 1000 cP. In some embodiments, a viscosity of the polymer blend is at least 1500 cP. In some embodiments, a viscosity of the polymer blend is at least 2000 cP. In some embodiments, a viscosity of the polymer blend is at least 2500 cP. In some embodiments, a viscosity of the polymer blend is at least 3000 cP. In some embodiments, a viscosity of the polymer blend is at least 3500 cP. In some embodiments, a viscosity of the polymer blend is at least 4000 cP. In some embodiments, a viscosity of the polymer blend is at least 4500 cP. In some embodiments, a viscosity of the polymer blend is at least 5000 cP. In some embodiments, a viscosity of the polymer blend is at least 5500 cP. In some embodiments, a viscosity of the polymer blend is at least 6000 cP. In some embodiments, a viscosity of the polymer blend is at least 6500 cP. In some embodiments, a viscosity of the polymer blend is at least 7000 cP. In some embodiments, a viscosity of the polymer blend is at least 7500 cP. In some embodiments, a viscosity of the polymer blend is at least 8000 cP. In some embodiments, a viscosity of the polymer blend is at least 8500 cP. In some embodiments, a viscosity of the polymer blend is at least 9000 cP. In some embodiments, a viscosity of the polymer blend is at least 9500 cP. In some embodiments, the viscosity may be measured according to ASTM D4402 using a #31 spindle at 400° F.

In some embodiments, the viscosity of the polymer blend may be from 100 cP to 10000 cP. In some embodiments, the viscosity of the polymer blend may be from 100 cP to 9500 cP. In some embodiments, the viscosity of the polymer blend may be from 100 cP to 9000 cP. In some embodiments, the viscosity of the polymer blend may be from 100 cP to 8500 cP. In some embodiments, the viscosity of the polymer blend may be from 100 cP to 8000 cP. In some embodiments, the viscosity of the polymer blend may be from 100 cP to 7500 cP. In some embodiments, the viscosity of the polymer blend may be from 100 cP to 7000 cP. In some embodiments, the viscosity of the polymer blend may be from 100 cP to 6500 cP. In some embodiments, the viscosity of the polymer blend may be from 100 cP to 6000 cP. In some embodiments, the viscosity of the polymer blend may be from 100 cP to 5500 cP. In some embodiments, the viscosity of the polymer blend may be from 100 cP to 5000 cP. In some embodiments, the viscosity of the polymer blend may be from 100 cP to 4500 cP. In some embodiments, the viscosity of the polymer blend may be from 100 cP to 4000 cP. In some embodiments, the viscosity of the polymer blend may be from 100 cP to 3500 cP. In some embodiments, the viscosity of the polymer blend may be from 100 cP to 3000 cP. In some embodiments, the viscosity of the polymer blend may be from 100 cP to 2500 cP. In some embodiments, the viscosity of the polymer blend may be from 100 cP to 2000 cP. In some embodiments, the viscosity of the polymer blend may be from 200 cP to 2000 cP. In some embodiments, the viscosity of the polymer blend may be from 100 cP to 1500 cP. In some embodiments, the viscosity of the polymer blend may be from 100 cP to 1000 cP. In some embodiments, the viscosity may be measured according to ASTM D4402 using a #31 spindle at 400° F.

In some embodiments, the viscosity of the polymer blend may be from 150 cP to 10000 cP. In some embodiments, the viscosity of the polymer blend may be from 200 cP to 10000 cP. In some embodiments, the viscosity of the polymer blend may be from 200 cP to 2000 cP. In some embodiments, the viscosity of the polymer blend may be from 250 cP to 10000 cP. In some embodiments, the viscosity of the polymer blend may be from 300 cP to 10000 cP. In some embodiments, the viscosity of the polymer blend may be from 350 cP to 10000 cP. In some embodiments, the viscosity of the polymer blend may be from 400 cP to 10000 cP. In some embodiments, the viscosity of the polymer blend may be from 450 cP to 10000 cP. In some embodiments, the viscosity of the polymer blend may be from 500 cP to 10000 cP. In some embodiments, the viscosity of the polymer blend may be from 550 cP to 10000 cP. In some embodiments, the viscosity of the polymer blend may be from 600 cP to 10000 cP. In some embodiments, the viscosity of the polymer blend may be from 650 cP to 10000 cP. In some embodiments, the viscosity of the polymer blend may be from 700 cP to 10000 cP. In some embodiments, the viscosity of the polymer blend may be from 750 cP to 10000 cP. In some embodiments, the viscosity of the polymer blend may be from 800 cP to 10000 cP. In some embodiments, the viscosity of the polymer blend may be from 850 cP to 10000 cP. In some embodiments, the viscosity of the polymer blend may be from 900 cP to 10000 cP. In some embodiments, the viscosity of the polymer blend may be from 950 cP to 10000 cP. In some embodiments, the viscosity of the polymer blend may be from 1000 cP to 10000 cP. In some embodiments, the viscosity of the polymer blend may be from 1500 cP to 10000 cP. In some embodiments, the viscosity of the polymer blend may be from 2000 cP to 10000 cP. In some embodiments, the viscosity of the polymer blend may be from 2500 cP to 10000 cP. In some embodiments, the viscosity of the polymer blend may be from 3000 cP to 10000 cP. In some embodiments, the viscosity of the polymer blend may be from 3500 cP to 10000 cP. In some embodiments, the viscosity of the polymer blend may be from 4000 cP to 10000 cP. In some embodiments, the viscosity of the polymer blend may be from 4500 cP to 10000 cP. In some embodiments, the viscosity of the polymer blend may be from 5000 cP to 10000 cP. In some embodiments, the viscosity of the polymer blend may be from 5500 cP to 10000 cP. In some embodiments, the viscosity of the polymer blend may be from 6000 cP to 10000 cP. In some embodiments, the viscosity of the polymer blend may be from 6500 cP to 10000 cP. In some embodiments, the viscosity of the polymer blend may be from 7000 cP to 10000 cP. In some embodiments, the viscosity of the polymer blend may be from 7500 cP to 10000 cP. In some embodiments, the viscosity of the polymer blend may be from 8000 cP to 10000 cP. In some embodiments, the viscosity may be measured according to ASTM D4402 using a #31 spindle at 400° F.

In some embodiments, the at least one filler may comprise, consist of, or consist essentially of at least one organic filler, at least one inorganic mineral filler, or any combinations thereof. In some embodiments, the at least one filler may include one or more of calcium carbonate, barium sulfate, calcium sulfate, talc, limestone, perlite, silica, fumed silica, precipitated silica, quartz, aluminum trihydrate, magnesium hydroxide, magnesium dihydroxide, aluminum hydroxide, cellulosic material, lignin, ammonium polyphosphate, colemanite (e.g., hydrated calcium borate), hydrated lime, titanium dioxide, snow white (i.e., calcium sulfate), fly ash, graphene nanoparticles, carbon black, recycled rubber tires, recycled shingles, recycled thermoplastic resins, basalt, roofing granules, graphite, and clay. In some embodiments, the at least one filler may include a high aspect ratio filler such as, e.g., graphene nanoparticles or carbon black. In some embodiments, the at least one filler may be a recycled material, such as one or more of post-consumer recycled asphalt shingles (PCRAS), ground tire rubber (GTR), recycled low density polyethylene (rLPDE), recycled polyvinylbutyral (rPVB), recycled polyethylene terephthalate (rPET), acrylonitrile rubber (NBR), acrylonitrile butadiene styrene rubber (ABS), and other recycled thermoplastic(s). A non-limiting example of GTR includes GTR, which is available from Lehigh Technologies, Tucker, Ga.

In some embodiments, the at least one filler may be present in an amount of 10% to 90% by weight based on the total weight of the coating or the coating material. In some embodiments, the at least one filler may be present in an amount of 15% to 90% by weight based on the total weight of the coating or the coating material. In some embodiments, the at least one filler may be present in an amount of 20% to 90% by weight based on the total weight of the coating or the coating material. In some embodiments, the at least one filler may be present in an amount of 25% to 90% by weight based on the total weight of the coating or the coating material. In some embodiments, the at least one filler may be present in an amount of 30% to 90% by weight based on the total weight of the coating or the coating material. In some embodiments, the at least one filler may be present in an amount of 35% to 90% by weight based on the total weight of the coating or the coating material. In some embodiments, the at least one filler may be present in an amount of 40% to 90% by weight based on the total weight of the coating or the coating material. In some embodiments, the at least one filler may be present in an amount of 45% to 90% by weight based on the total weight of the coating or the coating material. In some embodiments, the at least one filler may be present in an amount of 50% to 90% by weight based on the total weight of the coating or the coating material. In some embodiments, the at least one filler may be present in an amount of 55% to 90% by weight based on the total weight of the coating or the coating material. In some embodiments, the at least one filler may be present in an amount of 60% to 90% by weight based on the total weight of the coating or the coating material. In some embodiments, the at least one filler may be present in an amount of 65% to 90% by weight based on the total weight of the coating or the coating material. In some embodiments, the at least one filler may be present in an amount of 70% to 90% by weight based on the total weight of the coating or the coating material. In some embodiments, the at least one filler may be present in an amount of 75% to 90% by weight based on the total weight of the coating or the coating material. In some embodiments, the at least one filler may be present in an amount of 80% to 90% by weight based on the total weight of the coating or the coating material.

In some embodiments, the at least one filler may be present in an amount of 10% to 85% by weight based on the total weight of the coating or the coating material. In some embodiments, the at least one filler may be present in an amount of 10% to 80% by weight based on the total weight of the coating or the coating material. In some embodiments, the at least one filler may be present in an amount of 10% to 75% by weight based on the total weight of the coating or the coating material. In some embodiments, the at least one filler may be present in an amount of 10% to 70% by weight based on the total weight of the coating or the coating material. In some embodiments, the at least one filler may be present in an amount of 10% to 65% by weight based on the total weight of the coating or the coating material. In some embodiments, the at least one filler may be present in an amount of 10% to 60% by weight based on the total weight of the coating or the coating material. In some embodiments, the at least one filler may be present in an amount of 10% to 55% by weight based on the total weight of the coating or the coating material. In some embodiments, the at least one filler may be present in an amount of 10% to 50% by weight based on the total weight of the coating or the coating material. In some embodiments, the at least one filler may be present in an amount of 10% to 45% by weight based on the total weight of the coating or the coating material. In some embodiments, the at least one filler may be present in an amount of 10% to 40% by weight based on the total weight of the coating or the coating material. In some embodiments, the at least one filler may be present in an amount of 10% to 35% by weight based on the total weight of the coating or the coating material. In some embodiments, the at least one filler may be present in an amount of 10% to 30% by weight based on the total weight of the coating or the coating material. In some embodiments, the at least one filler may be present in an amount of 10% to 25% by weight based on the total weight of the coating or the coating material. In some embodiments, the at least one filler may be present in an amount of 10% to 20% by weight based on the total weight of the coating or the coating material.

In some embodiments, the at least one filler may be present in an amount of 10% to 70% by weight based on the total weight of the coating or the coating material. In some embodiments, the at least one filler may be present in an amount of 15% to 70% by weight based on the total weight of the coating or the coating material. In some embodiments, the at least one filler may be present in an amount of 20% to 70% by weight based on the total weight of the coating or the coating material. In some embodiments, the at least one filler may be present in an amount of 25% to 70% by weight based on the total weight of the coating or the coating material. In some embodiments, the at least one filler may be present in an amount of 30% to 70% by weight based on the total weight of the coating or the coating material. In some embodiments, the at least one filler may be present in an amount of 35% to 70% by weight based on the total weight of the coating or the coating material. In some embodiments, the at least one filler may be present in an amount of 40% to 70% by weight based on the total weight of the coating or the coating material. In some embodiments, the at least one filler may be present in an amount of 45% to 70% by weight based on the total weight of the coating or the coating material. In some embodiments, the at least one filler may be present in an amount of 50% to 70% by weight based on the total weight of the coating or the coating material. In some embodiments, the at least one filler may be present in an amount of 10% to 60% by weight based on the total weight of the coating or the coating material. In some embodiments, the at least one filler may be present in an amount of 15% to 60% by weight based on the total weight of the coating or the coating material. In some embodiments, the at least one filler may be present in an amount of 20% to 60% by weight based on the total weight of the coating or the coating material. In some embodiments, the at least one filler may be present in an amount of 25% to 60% by weight based on the total weight of the coating or the coating material. In some embodiments, the at least one filler may be present in an amount of 30% to 60% by weight based on the total weight of the coating or the coating material. In some embodiments, the at least one filler may be present in an amount of 35% to 60% by weight based on the total weight of the coating or the coating material. In some embodiments, the at least one filler may be present in an amount of 40% to 60% by weight based on the total weight of the coating or the coating material. In some embodiments, the at least one filler may be present in an amount of 45% to 60% by weight based on the total weight of the coating or the coating material. In some embodiments, the at least one filler may be present in an amount of 50% to 60% by weight based on the total weight of the coating or the coating material. In some embodiments, the at least one filler may be present in an amount of 50% to 65% by weight based on the total weight of the coating or the coating material. In some embodiments, the at least one filler may be present in an amount of 50% to 70% by weight based on the total weight of the coating or the coating material. In some embodiments, the at least one filler may be present in an amount of 50% to 75% by weight based on the total weight of the coating or the coating material. In some embodiments, the at least one filler may be present in an amount of 50% to 80% by weight based on the total weight of the coating or the coating material. In some embodiments, the at least one filler may be present in an amount of 55% to 80% by weight based on the total weight of the coating or the coating material. In some embodiments, the at least one filler may be present in an amount of 60% to 80% by weight based on the total weight of the coating or the coating material. In some embodiments, the at least one filler may be present in an amount of 65% to 80% by weight based on the total weight of the coating or the coating material. In some embodiments, the at least one filler may be present in an amount of 70% to 80% by weight based on the total weight of the coating or the coating material.

In some embodiments, the coating or the coating material may further comprise, further consist of, or further consist essentially of asphalt.

In some embodiments, the coating comprises 0.1% to 49% by weight of asphalt. In some embodiments, the coating comprises 0.5% to 49% by weight of asphalt. In some embodiments, the coating comprises 1% to 49% by weight of asphalt. In some embodiments, the coating comprises 2% to 49% by weight of asphalt. In some embodiments, the coating comprises 3% to 49% by weight of asphalt. In some embodiments, the coating comprises 4% to 49% by weight of asphalt. In some embodiments, the coating comprises 5% to 49% by weight of asphalt. In some embodiments, the coating comprises 10% to 49% by weight of asphalt. In some embodiments, the coating comprises 15% to 49% by weight of asphalt. In some embodiments, the coating comprises 20% to 49% by weight of asphalt. In some embodiments, the coating comprises 25% to 49% by weight of asphalt. In some embodiments, the coating comprises 30% to 49% by weight of asphalt. In some embodiments, the coating comprises 40% to 49% by weight of asphalt. In some embodiments, the coating comprises 0.1% to 40% by weight of asphalt. In some embodiments, the coating comprises 0.5% to 40% by weight of asphalt. In some embodiments, the coating comprises 1% to 40% by weight of asphalt. In some embodiments, the coating comprises 2% to 40% by weight of asphalt. In some embodiments, the coating comprises 3% to 40% by weight of asphalt. In some embodiments, the coating comprises 4% to 40% by weight of asphalt. In some embodiments, the coating comprises 5% to 40% by weight of asphalt. In some embodiments, the coating comprises 10% to 40% by weight of asphalt. In some embodiments, the coating comprises 15% to 40% by weight of asphalt. In some embodiments, the coating comprises 20% to 40% by weight of asphalt. In some embodiments, the coating comprises 25% to 40% by weight of asphalt. In some embodiments, the coating comprises 30% to 40% by weight of asphalt. In some embodiments, the coating comprises 0.1% to 30% by weight of asphalt. In some embodiments, the coating comprises 0.5% to 30% by weight of asphalt. In some embodiments, the coating comprises 1% to 30% by weight of asphalt. In some embodiments, the coating comprises 2% to 30% by weight of asphalt. In some embodiments, the coating comprises 3% to 30% by weight of asphalt. In some embodiments, the coating comprises 4% to 30% by weight of asphalt. In some embodiments, the coating comprises 5% to 30% by weight of asphalt. In some embodiments, the coating comprises 10% to 30% by weight of asphalt. In some embodiments, the coating comprises 15% to 30% by weight of asphalt. In some embodiments, the coating comprises 20% to 30% by weight of asphalt. In some embodiments, the coating comprises 25% to 30% by weight of asphalt. In some embodiments, the coating comprises 0.1% to 25% by weight of asphalt. In some embodiments, the coating comprises 0.5% to 25% by weight of asphalt. In some embodiments, the coating comprises 1% to 25% by weight of asphalt. In some embodiments, the coating comprises 2% to 25% by weight of asphalt. In some embodiments, the coating comprises 3% to 25% by weight of asphalt. In some embodiments, the coating comprises 4% to 25% by weight of asphalt. In some embodiments, the coating comprises 5% to 25% by weight of asphalt. In some embodiments, the coating comprises 10% to 25% by weight of asphalt. In some embodiments, the coating comprises 15% to 25% by weight of asphalt. In some embodiments, the coating comprises 20% to 25% by weight of asphalt. In some embodiments, the coating comprises 0.1% to 20% by weight of asphalt. In some embodiments, the coating comprises 0.5% to 20% by weight of asphalt. In some embodiments, the coating comprises 1% to 20% by weight of asphalt. In some embodiments, the coating comprises 2% to 20% by weight of asphalt. In some embodiments, the coating comprises 3% to 20% by weight of asphalt. In some embodiments, the coating comprises 4% to 20% by weight of asphalt. In some embodiments, the coating comprises 5% to 20% by weight of asphalt. In some embodiments, the coating comprises 10% to 20% by weight of asphalt. In some embodiments, the coating comprises 15% to 20% by weight of asphalt. In some embodiments, the coating comprises 0.1% to 15% by weight of asphalt. In some embodiments, the coating comprises 0.5% to 15% by weight of asphalt. In some embodiments, the coating comprises 1% to 15% by weight of asphalt. In some embodiments, the coating comprises 2% to 15% by weight of asphalt. In some embodiments, the coating comprises 3% to 15% by weight of asphalt. In some embodiments, the coating comprises 4% to 15% by weight of asphalt. In some embodiments, the coating comprises 5% to 15% by weight of asphalt. In some embodiments, the coating comprises 10% to 15% by weight of asphalt. In some embodiments, the coating comprises 0.1% to 10% by weight of asphalt. In some embodiments, the coating comprises 0.5% to 10% by weight of asphalt. In some embodiments, the coating comprises 1% to 10% by weight of asphalt. In some embodiments, the coating comprises 2% to 10% by weight of asphalt. In some embodiments, the coating comprises 3% to 10% by weight of asphalt. In some embodiments, the coating comprises 4% to 10% by weight of asphalt. In some embodiments, the coating comprises 5% to 10% by weight of asphalt. In some embodiments, the coating comprises 0.1% to 5% by weight of asphalt. In some embodiments, the coating comprises 0.5% to 5% by weight of asphalt. In some embodiments, the coating comprises 1% to 5% by weight of asphalt. In some embodiments, the coating comprises 2% to 5% by weight of asphalt. In some embodiments, the coating comprises 3% to 5% by weight of asphalt. In some embodiments, the coating comprises 4% to 5% by weight of asphalt. In some embodiments, the coating comprises 0.1% to 4% by weight of asphalt. In some embodiments, the coating comprises 0.5% to 4% by weight of asphalt. In some embodiments, the coating comprises 1% to 4% by weight of asphalt. In some embodiments, the coating comprises 2% to 4% by weight of asphalt. In some embodiments, the coating comprises 3% to 4% by weight of asphalt. In some embodiments, the coating comprises 0.1% to 3% by weight of asphalt. In some embodiments, the coating comprises 0.5% to 3% by weight of asphalt. In some embodiments, the coating comprises 1% to 3% by weight of asphalt. In some embodiments, the coating comprises 2% to 3% by weight of asphalt. In some embodiments, the coating comprises 0.1% to 2% by weight of asphalt. In some embodiments, the coating comprises 0.5% to 2% by weight of asphalt. In some embodiments, the coating comprises 1% to 2% by weight of asphalt. In some embodiments, the coating comprises 0.1% to 1% by weight of asphalt. In some embodiments, the coating comprises 0.5% to 1% by weight of asphalt. In some embodiments, the coating comprises 0.1% to 0.5% by weight of asphalt. In some embodiments, the coating is the coating material. In some embodiments, the coating may be substantially free of asphalt. For example, in some embodiments, the asphalt may be present in an amount of 0.1% to 5% by weight based on the total weight of the coating or the coating material. In some embodiments, the coating may be free of asphalt. For example, in some embodiments, the asphalt may be present in an amount of 0% by weight based on the total weight of the coating or the coating material.

In some embodiments, the coating or the coating material may further comprise, further consist of, or further consist essentially of an ultraviolet (UV) blocker, an UV absorber, an UV-resistant polymer (e.g., including, without limitation, one or more of poly(ethylene vinyl acetate) (EVA) and poly(styrene-ethylene/butylene-styrene) (SEBS), etc.), or any combination thereof. In some embodiments, the presence of the UV blocker, the UV absorber, the UV-resistant polymer, or any combination thereof may permit omission of a surface coating (e.g., including, without limitation, a surface coating film for UV protection, etc.).

In some embodiments, the coating or the coating material may further comprise, further consist of, or further consist essentially of a dye, a pigment, a fire retardant, a stabilizer (e.g., including, without limitation, a UV stabilizer), or any combination thereof. Non-limiting examples of pigments and dyes include, without limitation, one or more of colorants, IR reflective pigments, IR reflective dyes, phosphorescence pigments, phosphorescence dyes, fluorescence pigments, and fluorescence dyes. Non-limiting examples of pigments include, but are not limited to, one or more of color pigments and reflective pigments, such as, for example and without limitation, Colonial Red, which is a reflective pigment that is available from Americhem Inc., Cuyahoga Falls, Ohio. Non-limiting examples of UV stabilizers include, but are not limited to, one or more of UV absorbers, hinder amine light stabilizers, anti-oxidant pigments, anti-oxidant carriers (e.g., including, without limitation, one or more of PP, PE, and IPP). In some embodiments, the coating further includes a tackifier.

In some embodiments, the coating or the coating material may further comprise, further consist of, or further consist essentially of at least one recycled material. In some embodiments, the at least one recycled material may comprise, consist of, or consist essentially of one or more of recycled polyvinyl butyral (rPVB), post-consumer asphalt shingles (PCRAS), post-manufacture shingle waste, recycled asphaltic membranes, polytransoctenamer rubber (TOR), ground tire rubber (GTR), acrylonitrile rubber (NBR), acrylonitrile butadiene styrene rubber (ABS), wood plastic, polypropylene (PP), and atactic polypropylene (APP). A non-limiting example of GTR includes GTR, which is available from Lehigh Technologies, Tucker, Ga. Other wastes and/or recycled materials that may be incorporated into the coating include, for example and without limitation, one or more of petroleum coke, high temperature tolerant reinforced resins, poly(methyl methacrylate) (PMMA), polyvinyl chloride (PVC), fly ash, carbon black, titanium dioxide ($TiO_2$), low density polyethylene (LDPE), linear low density polyethylene (LLDPE), high density polyethylene (HDPE), polyethylene terephthalate (PET), recycled styrene butadiene styrene copolymers, recycled poly(styrene-ethylene/butylene-styrene) (SEBS), recycled SEBS copolymers, and fatty acids.

In some embodiments, the coating is in the form of a pourable coating. In some embodiments, the coating is configured to be a coating for a roofing material, such as, for example and without limitation, a roofing shingle.

In some embodiments, a softening point of the coating or the coating material is at least 190° F. In some embodiments, the softening point of the coating or the coating material is at least 195° F. In some embodiments, the softening point of the coating or the coating material is at least 200° F. In some embodiments, the softening point of the coating or the coating material is at least 205° F. In some embodiments, the softening point of the coating or the coating material is at least 210° F. In some embodiments, the softening point of the coating or the coating material is at least 215° F. In some embodiments, the softening point of the coating or the coating material is at least 220° F. In some embodiments, the softening point of the coating or the coating material is at least 225° F. In some embodiments, the softening point of the coating or the coating material is at least 230° F. In some embodiments, the softening point of the coating or the coating material is at least 235° F. In some embodiments, the softening point of the coating or the coating material is at least 240° F. In some embodiments, the softening point of the coating or the coating material is at least 245° F. In some embodiments, the softening point of the coating or the coating material is at least 250° F. In some embodiments, the softening point of the coating or the coating material is at least 255° F. In some embodiments, the softening point of the coating or the coating material is at least 260° F. In some embodiments, the softening point of the coating or the coating material is at least 265° F. In some embodiments, the softening point of the coating or the coating material is at least 270° F. In some embodiments, the softening point of the coating or the coating material is at least 275° F. In some embodiments, the softening point of the coating or the coating material is at least 280° F. In some embodiments, the softening point may be measured according to ASTM D3461.

In some embodiments, the softening point of the coating or the coating material may be 200° F. to 300° F. In some embodiments, the softening point of the coating or the coating material may be 200° F. to 290° F. In some embodiments, the softening point of the coating or the coating material may be 200° F. to 280° F. In some embodiments, the softening point of the coating or the coating material may be 200° F. to 275° F. In some embodiments, the softening point of the coating or the coating material may be 200° F. to 270° F. In some embodiments, the softening point of the coating or the coating material may be 210° F. to 270° F. In some embodiments, the softening point of the coating or the coating material may be 200° F. to 265° F. In some embodiments, the softening point of the coating or the coating material may be 200° F. to 260° F. In some embodiments, the softening point of the coating or the coating material may be 200° F. to 255° F. In some embodiments, the softening point of the coating or the coating material may be 200° F. to 250° F. In some embodiments, the softening point of the coating or the coating material may be 200° F. to 245° F. In some embodiments, the softening point of the coating or the coating material may be 200° F. to 240° F. In some embodiments, the softening point of the coating or the coating material may be 200° F. to 235° F. In some embodiments, the softening point of the coating or the coating material may be 200° F. to 230° F. In some embodiments, the softening point of the coating or the coating material may be 200° F. to 225° F. In some embodiments, the softening point of the coating or the coating material may be 200° F. to 220° F. In some embodiments, the softening point of the coating or the coating material may be 205° F. to 300° F. In some embodiments, the softening point of the coating or the coating material may be 210° F. to 300° F. In some embodiments, the softening point of the coating or the coating material may be 210° F. to 270° F. In some embodiments, the softening point of the coating or the coating material may be 215° F. to 300° F. In some embodiments, the softening point of the coating or the coating material may be 220° F. to 300° F. In some embodiments, the softening point of the coating or the coating material may be 225° F. to 300° F. In some embodiments, the softening point of the coating or the coating material may be 230° F. to 300° F. In some embodiments, the softening point of the coating or the coating material may be 235° F. to 300° F. In some embodiments, the softening point of the coating or the coating material may be 240° F. to 300° F. In some embodiments, the softening point of the coating or the coating material may be 245° F. to 300° F. In some embodiments, the softening point of the coating or the coating material may be 250° F. to 300° F. In some embodiments, the softening point of the coating or the coating material may be 255° F. to 300° F. In some embodiments, the softening point of the coating or the coating material may be 260° F. to 300° F. In some embodiments, the softening point of the coating or the coating material may be 265° F. to 300° F. In some embodiments, the softening point of the coating or the coating material may be 270° F. to 300° F. In some embodiments, the softening point of the coating or the coating material may be 275° F. to 300° F. In some embodiments, the softening point may be measured according to ASTM D3461.

In some embodiments, the viscosity of the coating or the coating material is 30000 cP or less. In some embodiments, the viscosity of the coating or the coating material is 25000 cP or less. In some embodiments, the viscosity of the coating or the coating material is 20000 cP or less. In some embodiments, the viscosity of the coating or the coating material is 15000 cP or less. In some embodiments, the viscosity of the coating or the coating material is 10000 cP or less. In some embodiments, the viscosity of the coating or the coating material is 9500 cP or less. In some embodiments, the viscosity of the coating or the coating material is 9000 cP or less. In some embodiments, the viscosity of the coating or the coating material is 8500 cP or less. In some embodiments, the viscosity of the coating or the coating material is 8000 cP or less. In some embodiments, the viscosity of the coating or the coating material is 7500 cP or less. In some embodiments, the viscosity of the coating or the coating material is 7000 cP or less. In some embodiments, the viscosity of the coating or the coating material is 6500 cP or less. In some embodiments, the viscosity of the coating or the coating material is 6000 cP or less. In some embodiments, the viscosity of the coating or the coating material is 5500 cP or less. In some embodiments, the viscosity of the coating or the coating material is 5000 cP or less. In some embodiments, the viscosity of the coating or the coating material is 4500 cP or less. In some embodiments, the viscosity of the coating or the coating material is 4000 cP or less. In some embodiments, the viscosity of the coating or the coating material is 3500 cP or less. In some embodiments, the viscosity of the coating or the coating material is 3000 cP or less. In some embodiments, the viscosity of the coating or the coating material is 2500 cP or less. In some embodiments, the viscosity of the coating or the coating material is 2000 cP or less. In some embodiments, the viscosity may be measured according to ASTM D4402 using a #31 spindle at 400° F.

In some embodiments, a viscosity of the coating or the coating material is at least 200 cP. In some embodiments, a viscosity of the coating or the coating material is at least 500 cP. In some embodiments, a viscosity of the coating or the coating material is at least 750 cP. In some embodiments, a viscosity of the coating or the coating material is at least 1000 cP. In some embodiments, a viscosity of the coating or the coating material is at least 1500 cP. In some embodiments, a viscosity of the coating or the coating material is at least 2000 cP. In some embodiments, a viscosity of the coating or the coating material is at least 2500 cP. In some embodiments, a viscosity of the coating or the coating material is at least 3000 cP. In some embodiments, a viscosity of the coating or the coating material is at least 3500 cP. In some embodiments, a viscosity of the coating or the coating material is at least 4000 cP. In some embodiments, a viscosity of the coating or the coating material is at least 4500 cP. In some embodiments, a viscosity of the coating or the coating material is at least 5000 cP. In some embodiments, a viscosity of the coating or the coating material is at least 5500 cP. In some embodiments, a viscosity of the coating or the coating material is at least 6000 cP. In some embodiments, a viscosity of the coating or the coating material is at least 6500 cP. In some embodiments, a viscosity of the coating or the coating material is at least 7000 cP. In some embodiments, a viscosity of the coating or the coating material is at least 7500 cP. In some embodiments, a viscosity of the coating or the coating material is at least 8000 cP. In some embodiments, a viscosity of the coating or the coating material is at least 8500 cP. In some embodiments, a viscosity of the coating or the coating material is at least 9000 cP. In some embodiments, a viscosity of the coating or the coating material is at least 9500 cP. In some embodiments, a viscosity of the coating or the coating material is at least 10000 cP. In some embodiments, a viscosity of the coating or the coating material is at least 15000 cP. In some embodiments, a viscosity of the coating or the coating material is at least 20000 cP. In some embodiments, a viscosity of the coating or the coating material is at least 25000 cP. In some embodiments, the viscosity may be measured according to ASTM D4402 using a #31 spindle at 400° F.

In some embodiments, the viscosity of the coating or the coating material may be from 100 cP to 30,000 cP. In some embodiments, the viscosity of the coating or the coating material may be from 100 cP to 25000 cP. In some embodiments, the viscosity of the coating or the coating material may be from 100 cP to 20000 cP. In some embodiments, the viscosity of the coating or the coating material may be from 100 cP to 15000 cP. In some embodiments, the viscosity of the coating or the coating material may be from 100 cP to 10000 cP. In some embodiments, the viscosity of the coating or the coating material may be from 100 cP to 9500 cP. In some embodiments, the viscosity of the coating or the coating material may be from 100 cP to 9000 cP. In some embodiments, the viscosity of the coating or the coating material may be from 100 cP to 8500 cP. In some embodiments, the viscosity of the coating or the coating material may be from 100 cP to 8000 cP. In some embodiments, the viscosity of the coating or the coating material may be from 100 cP to 7500 cP. In some embodiments, the viscosity of the coating or the coating material may be from 100 cP to 7000 cP. In some embodiments, the viscosity of the coating or the coating material may be from 100 cP to 6500 cP. In some embodiments, the viscosity of the coating or the coating material may be from 100 cP to 6000 cP. In some embodiments, the viscosity of the coating or the coating material may be from 100 cP to 5500 cP. In some embodiments, the viscosity of the coating or the coating material may be from 100 cP to 5000 cP. In some embodiments, the viscosity of the coating or the coating material may be from 100 cP to 4500 cP. In some embodiments, the viscosity of the coating or the coating material may be from 100 cP to 4000 cP. In some embodiments, the viscosity of the coating or the coating material may be from 100 cP to 3500 cP. In some embodiments, the viscosity of the coating or the coating material may be from 100 cP to 3000 cP. In some embodiments, the viscosity of the coating or the coating material may be from 100 cP to 2500 cP. In some embodiments, the viscosity of the coating or the coating material may be from 100 cP to 2000 cP. In some embodiments, the viscosity of the coating or the coating material may be from 200 cP to 2000 cP. In some embodiments, the viscosity of the coating or the coating material may be from 100 cP to 1500 cP. In some embodiments, the viscosity of the coating or the coating material may be from 100 cP to 1000 cP. In some embodiments, the viscosity may be measured according to ASTM D4402 using a #31 spindle at 400° F.

In some embodiments, the viscosity of the coating or the coating material may be from 150 cP to 10000 cP. In some embodiments, the viscosity of the coating or the coating material may be from 200 cP to 10000 cP. In some embodiments, the viscosity of the coating or the coating material may be from 250 cP to 10000 cP. In some embodiments, the viscosity of the coating or the coating material may be from 300 cP to 10000 cP. In some embodiments, the viscosity of the coating or the coating material may be from 350 cP to 10000 cP. In some embodiments, the viscosity of the coating or the coating material may be from 400 cP to 10000 cP. In some embodiments, the viscosity of the coating or the coating material may be from 450 cP to 10000 cP. In some embodiments, the viscosity of the coating or the coating material may be from 500 cP to 10000 cP. In some embodiments, the viscosity of the coating or the coating material may be from 550 cP to 10000 cP. In some embodiments, the viscosity of the coating or the coating material may be from 600 cP to 10000 cP. In some embodiments, the viscosity of the coating or the coating material may be from 650 cP to 10000 cP. In some embodiments, the viscosity of the coating or the coating material may be from 700 cP to 10000 cP. In some embodiments, the viscosity of the coating or the coating material may be from 750 cP to 10000 cP. In some embodiments, the viscosity of the coating or the coating material may be from 800 cP to 10000 cP. In some embodiments, the viscosity of the coating or the coating material may be from 850 cP to 10000 cP. In some embodiments, the viscosity of the coating or the coating material may be from 900 cP to 10000 cP. In some embodiments, the viscosity of the coating or the coating material may be from 950 cP to 10000 cP. In some embodiments, the viscosity of the coating or the coating material may be from 1000 cP to 10000 cP. In some embodiments, the viscosity of the coating or the coating material may be from 1000 cP to 6500 cP. In some embodiments, the viscosity of the coating or the coating material may be from 1500 cP to 10000 cP. In some embodiments, the viscosity of the coating or the coating material may be from 2000 cP to 10000 cP. In some embodiments, the viscosity of the coating or the coating material may be from 2500 cP to 10000 cP. In some embodiments, the viscosity of the coating or the coating material may be from 3000 cP to 10000 cP. In some embodiments, the viscosity of the coating or the coating material may be from 3500 cP to 10000 cP. In some embodiments, the viscosity of the coating or the coating material may be from 4000 cP to 10000 cP. In some embodiments, the viscosity of the coating or the coating material may be from 4500 cP to 10000 cP. In some embodiments, the viscosity of the coating or the coating material may be from 5000 cP to 10000 cP. In some embodiments, the viscosity of the coating or the coating material may be from 5500 cP to 10000 cP. In some embodiments, the viscosity of the coating or the coating material may be from 6000 cP to 10000 cP. In some embodiments, the viscosity of the coating or the coating material may be from 6500 cP to 10000 cP. In some embodiments, the viscosity of the coating or the coating material may be from 7000 cP to 10000 cP. In some embodiments, the viscosity of the coating or the coating material may be from 7500 cP to 10000 cP. In some embodiments, the viscosity of the coating or the coating material may be from 8000 cP to 10000 cP. In some embodiments, the viscosity of the coating may be 1000 cP to 7000 cP. In some embodiments, the viscosity of the coating may be 1000 cP to 6500 cP. In some embodiments, the viscosity may be measured according to ASTM D4402 using a #31 spindle at 400° F.

In some embodiments, a thickness of the coating on the substrate is 10 mils to 250 mils. In some embodiments, the thickness of the coating on the substrate is 20 mils to 200 mils. In some embodiments, the thickness of the coating on the substrate is 20 mils to 175 mils. In some embodiments, the thickness of the coating on the substrate is 20 mils to 150 mils. In some embodiments, the thickness of the coating on the substrate is 20 mils to 125 mils. In some embodiments, the thickness of the coating on the substrate is 20 mils to 100 mils. In some embodiments, the thickness of the coating on the substrate is 20 mils to 75 mils. In some embodiments, the thickness of the coating on the substrate is 20 mils to 60 mils. In some embodiments, the thickness of the coating on the substrate is 20 mils to 50 mils. In some embodiments, the thickness of the coating on the substrate is 20 mils to 40 mils. In some embodiments, the thickness of the coating on the substrate is 20 mils to 30 mils. In some embodiments, the thickness of the coating on the substrate is 30 mils to 250 mils. In some embodiments, the thickness of the coating on the substrate is 30 mils to 200 mils. In some embodiments, the thickness of the coating on the substrate is 30 mils to 150 mils. In some embodiments, the thickness of the coating on the substrate is 30 mils to 100 mils. In some embodiments, the thickness of the coating on the substrate is 30 mils to 75 mils. In some embodiments, the thickness of the coating on the substrate is 30 mils to 60 mils. In some embodiments, the thickness of the coating on the substrate is 30 mils to 50 mils. In some embodiments, the thickness of the coating on the substrate is 30 mils to 40 mils. In some embodiments, the thickness of the coating on the substrate is 40 mils to 250 mils. In some embodiments, the thickness of the coating on the substrate is 40 mils to 200 mils. In some embodiments, the thickness of the coating on the substrate is 40 mils to 150 mils. In some embodiments, the thickness of the coating on the substrate is 40 mils to 100 mils. In some embodiments, the thickness of the coating on the substrate is 40 mils to 75 mils. In some embodiments, the thickness of the coating on the substrate is 40 mils to 60 mils. In some embodiments, the thickness of the coating on the substrate is 40 mils to 50 mils. In some embodiments, the thickness of the coating on the substrate is 50 mils to 250 mils. In some embodiments, the thickness of the coating on the substrate is 50 mils to 200 mils. In some embodiments, the thickness of the coating on the substrate is 50 mils to 150 mils. In some embodiments, the thickness of the coating on the substrate is 50 mils to 100 mils. In some embodiments, the thickness of the coating on the substrate is 50 mils to 75 mils. In some embodiments, the thickness of the coating on the substrate is 50 mils to 60 mils. In some embodiments, the thickness of the coating on the substrate is 60 mils to 250 mils. In some embodiments, the thickness of the coating on the substrate is 60 mils to 200 mils. In some embodiments, the thickness of the coating on the substrate is 60 mils to 150 mils. In some embodiments, the thickness of the coating on the substrate is 60 mils to 100 mils. In some embodiments, the thickness of the coating on the substrate is 60 mils to 75 mils. In some embodiments, the thickness of the coating on the substrate is 75 mils to 200 mils. In some embodiments, the thickness of the coating on the substrate is 75 mils to 150 mils. In some embodiments, the thickness of the coating on the substrate is 75 mils to 100 mils. In some embodiments, the thickness of the coating on the substrate is 100 mils to 200 mils. In some embodiments, the thickness of the coating on the substrate is 100 mils to 150 mils. In some embodiments, the thickness of the coating on the substrate is 150 mils to 200 mils. In some embodiments, the thickness of the coating on the substrate is 60 mils. In some embodiments, the thickness of the coating on the substrate is measured according to ASTM D5147.

In some embodiments, the roofing material may comprise, consist of, or consist essentially of, or may further comprise, further consist of, or further consist essentially of a surface coating. In some embodiments, the surface coating may be disposed on the substrate or a surface of the substrate. In some embodiments, the surface coating may be disposed on the coating or a surface of the coating. For example, in some embodiments, the coating may be disposed between the substrate and the surface coating.

In some embodiments, the surface coating may comprise, consist of, or consist essentially of a granule coating, a curable film coating, a polymeric coating, or any combination thereof. In some embodiments, the granule coating may comprise, consist of, or consist essentially of at least one of granules, fines, sand, metal flakes, or reflective granules. In some embodiments, the granule coating may be disposed on a surface of at least one of the roofing material, the coating, or the coating material. In some embodiments, the surface coating may comprise, consist of, or consist essentially of an ultraviolet (UV) film, an UV paint, a weather-resistant film, a weather-resistant paint, or any combination hereof. In some embodiments, the surface coating may protect the coating from environmental elements, such as, for example and without limitation, ultraviolet (UV) exposure, conditions relating to weather (e.g., moisture, temperature, etc.), and the like. In some embodiments, the surface coating may comprise, consist of, or consist essentially of a woven fabric, a non-woven fabric, a decorative element (e.g., without limitation, printing, embossing, etc.). In some embodiments, the surface coating may be omitted.

In some embodiments, a thickness of the roofing material is at least 20 mils. In some embodiments, a thickness of the roofing material is at least 30 mils. In some embodiments, a thickness of the roofing material is at least 40 mils. In some embodiments, a thickness of the roofing material is at least 50 mils. In some embodiments, a thickness of the roofing material is at least 60 mils. In some embodiments, a thickness of the roofing material is at least 70 mils. In some embodiments, a thickness of the roofing material is at least 80 mils. In some embodiments, a thickness of the roofing material is at least 90 mils. In some embodiments, a thickness of the roofing material is at least 100 mils. In some embodiments, a thickness of the roofing material is at least 110 mils. In some embodiments, a thickness of the roofing material is at least 120 mils. In some embodiments, a thickness of the roofing material is at least 130 mils. In some embodiments, a thickness of the roofing material is at least 140 mils. In some embodiments, a thickness of the roofing material is at least 150 mils. In some embodiments, a thickness of the roofing material is at least 160 mils. In some embodiments, a thickness of the roofing material is at least 170 mils. In some embodiments, a thickness of the roofing material is at least 180 mils. In some embodiments, a thickness of the roofing material is at least 190 mils. In some embodiments, a thickness of the roofing material is at least 200 mils. In some embodiments, a thickness of the roofing material is at least 250 mils. In some embodiments, a thickness of the roofing material is at least 300 mils. In some embodiments, a thickness of the roofing material is at least 350 mils. In some embodiments, a thickness of the roofing material is at least 400 mils. In some embodiments, a thickness of the roofing material is at least 450 mils. In some embodiments, the thickness of the roofing material is less than 500 mils. In some embodiments, the thickness of the roofing material is less than 450 mils. In some embodiments, the thickness of the roofing material is less than 400 mils. In some embodiments, the thickness of the roofing material is less than 350 mils. In some embodiments, the thickness of the roofing material is less than 300 mils. In some embodiments, the thickness of the roofing material is less than 250 mils. In some embodiments, the thickness of the roofing material is less than 200 mils. In some embodiments, the thickness of the roofing material is less than 150 mils. In some embodiments, the thickness of the coating on the substrate is measured according to ASTM D5147.

In some embodiments, the thickness of the roofing material is 20 mils to 500 mils. In some embodiments, the thickness of the roofing material is 30 mils to 500 mils. In some embodiments, the thickness of the roofing material is 40 mils to 500 mils. In some embodiments, the thickness of the roofing material is 50 mils to 500 mils. In some embodiments, the thickness of the roofing material is 50 mils to 475 mils. In some embodiments, the thickness of the roofing material is 50 mils to 450 mils. In some embodiments, the thickness of the roofing material is 50 mils to 425 mils. In some embodiments, the thickness of the roofing material is 50 mils to 400 mils. In some embodiments, the thickness of the roofing material is 50 mils to 375 mils. In some embodiments, the thickness of the roofing material is 50 mils to 350 mils. In some embodiments, the thickness of the roofing material is 50 mils to 325 mils. In some embodiments, the thickness of the roofing material is 50 mils to 300 mils. In some embodiments, the thickness of the roofing material is 50 mils to 275 mils. In some embodiments, the thickness of the roofing material is 50 mils to 250 mils. In some embodiments, the thickness of the roofing material is 50 mils to 200 mils. In some embodiments, the thickness of the coating on the substrate is measured according to ASTM D5147.

In some embodiments, the roofing material comprises one or more layers of the coating. In some embodiments, the roofing material comprises one (1) to two (2) layers of the coating. In some embodiments, the roofing material comprises one (1) to three (3) layers of the coating. In some embodiments, the roofing material comprises one (1) to four (4) layers of the coating. In some embodiments, the roofing material comprises one (1) to five (5) layers of the coating. In some embodiments, the roofing material comprises one (1) to six (6) layers of the coating. In some embodiments, the roofing material comprises one (1) to seven (7) layers of the coating. In some embodiments, the roofing material comprises one (1) to eight (8) layers of the coating. In some embodiments, the roofing material comprises one (1) to nine (9) layers of the coating. In some embodiments, the roofing material comprises one (1) to ten (10) layers of the coating. In some embodiments, the roofing material comprises two (2) to ten (10) layers of the coating. In some embodiments, the roofing material comprises three (3) to ten (10) layers of the coating. In some embodiments, the roofing material comprises five (5) to ten (10) layers of the coating. In some embodiments, the roofing material comprises seven (7) to ten (10) layers of the coating.

In some embodiments, the coating comprises at least one layer disposed on a top surface and a bottom surface of the substrate. In some embodiments, the coating comprises at least one layer disposed on a top surface and a bottom surface of the substrate, and another coating that comprises at least one asphalt-based coating layer disposed on at least one of the coated top surface or the coated bottom surface of the substrate. In some embodiments, the coating comprises at least one layer disposed on the top surface of the substrate and another coating that comprises at least one asphalt-based coating layer disposed on the bottom surface of the substrate. In some embodiments, the coating comprises at least one layer disposed on the bottom surface of the substrate and another coating that comprises an asphalt-based coating layer disposed on the top surface of the substrate.

Some embodiments relate to compositions derived from re-refined engine oil bottoms (REOB) sources which are modified with additives and which are used in manufacture of roofing shingles and other roofing materials, roofing coatings including such compositions, and roofing shingles and other roofing materials made from such roofing coatings.

Some embodiments relate to coatings comprising at least one of a composition, at least one filler, or any combination thereof. In some embodiments, the composition comprises at least one of at least one hydrocarbon oil, at least one hardening agent, at least one rosin ester, at least one polymer, at least one recycled material, or any combination thereof. In some embodiments, at least one of the at least one hydrocarbon oil, at least one hardening agent, the at least one rosin ester, the at least one polymer, or any combination thereof, constitute a polymer blend. In some embodiments, the coatings are useful in the preparation of roofing materials (e.g., roofing shingles). In some embodiments, the at least one hydrocarbon oil is modified by at least one of at least one hardening agent, the at least one rosin ester, the at least one polymer, or any combination thereof sufficient to result in a coating that meets certain properties for building applications, such as, for example, roofing applications. In some embodiments, the at least one filler provides at least one of the following properties: toughness, fire retardance, a rheological characteristic, or any combination thereof. In some embodiments, the coating is applied to one or both sides of a substrate (e.g., a fiberglass mat, a polymeric scrim, etc.). In some embodiments, a surface protective layer is applied to one or both of the coatings. In some embodiments, the surface protective layer comprises at least one of granules, a curable film, a polymer, or any combination thereof. In some embodiments, the surface protective layer protects the coating from ultraviolet (UV) exposure. In some embodiments, the protective coating is omitted.

In some embodiments, the at least one hydrocarbon oil comprises a re-refined engine oil bottoms (REOB). In some embodiments, REOB is a residue produced while refining used engine oil. In some embodiments, companies collect used engine oil from garages, railroads, and similar sources. In some embodiments, companies recover the lubricating oil by a process including (a) dehydration, (b) atmospheric distillation, and (c) vacuum distillation, in that order. In some embodiments, in the vacuum distillation, the distillates (i.e., lube cuts) are separated from the non-distillable residue. In some embodiments, the non-distillable residue, which is left at the bottom of the vacuum tower, is at least one of a re-refined engine oil bottoms, recycled engine oil bottoms, re-recycled engine oil bottoms, vacuum tower asphalt extender (VTAE), or any combination thereof. In some embodiments, the REOB is a residual distillation product (or non-distillable residuum) from a vacuum tower in a re-refinery of used engine oil.

In some embodiments, the REOB comprises at least one of Vertex Energy REOB, Universal Avista REOB, Safety Kleen REOB, or any combination thereof. The table below shows the saturates, aromatics, resins, and asphaltenes (SARA) analysis of these REOBs (where ELSD refers to evaporative light scattering detection or detector):

| Sample | ELSD Saturates, % | Total ELSD Aromatics, % | ELSD Resins, % | Total ELSD Asphaltenes, % |
|---|---|---|---|---|
| Vertex Energy REOB | 72.2 | 5.9 | 14.9 | 7 |
| Universal Avista REOB | 79.8 | 4.5 | 10 | 5.7 |
| Safety Kleen REOB | 76.8 | 10.6 | 10.6 | 2.1 |

The percentage (%) above refers to the percent by weight based on a total weight of the REOB. In some embodiments, the REOB comprises at least 50% by weight of saturates based on the total weight of the REOB as measured by ELSD (where ELSD refers to evaporative light scattering detection or detector). In some embodiments, the REOB comprises at least 70% by weight of saturates based on the total weight of the REOB as measured by ELSD. In some embodiments, the REOB comprises 72% to 77% by weight of saturates based on the total weight of the REOB as measured by ELSD. In some embodiments, the REOB comprises 70% to 80% by weight of saturates based on the total weight of the REOB as measured by ELSD. In some embodiments, the REOB comprises 70% to 77% by weight of saturates based on the total weight of the REOB as measured by ELSD.

In some embodiments, the REOB 1% to 20% by weight of aromatics based on the total weight of the REOB as measured by ELSD. In some embodiments, the REOB 4% to 20% by weight of aromatics based on the total weight of the REOB as measured by ELSD. In some embodiments, the REOB 4% to 11% by weight of aromatics based on the total weight of the REOB as measured by ELSD. In some embodiments, the REOB 5% to 20% by weight of aromatics based on the total weight of the REOB as measured by ELSD. In some embodiments, the REOB 10% to 20% by weight of aromatics based on the total weight of the REOB as measured by ELSD. In some embodiments, the REOB 15% to 20% by weight of aromatics based on the total weight of the REOB as measured by ELSD. In some embodiments, the REOB 1% to 15% by weight of aromatics based on the total weight of the REOB as measured by ELSD. In some embodiments, the REOB 1% to 10% by weight of aromatics based on the total weight of the REOB as measured by ELSD. In some embodiments, the REOB 1% to 5% by weight of aromatics based on the total weight of the REOB as measured by ELSD.

In some embodiments, the REOB 10% to 15% by weight of resins based on the total weight of the REOB as measured by ELSD. In some embodiments, the REOB 11% to 15% by weight of resins based on the total weight of the REOB as measured by ELSD. In some embodiments, the REOB 10% to 11% by weight of resins based on the total weight of the REOB as measured by ELSD. In some embodiments, the REOB 12% to 15% by weight of resins based on the total weight of the REOB as measured by ELSD. In some embodiments, the REOB 13% to 15% by weight of resins based on the total weight of the REOB as measured by ELSD. In some embodiments, the REOB 14% to 15% by weight of resins based on the total weight of the REOB as measured by ELSD. In some embodiments, the REOB 10% to 13% by weight of resins based on the total weight of the REOB as measured by ELSD. In some embodiments, the REOB 10% to 12% by weight of resins based on the total weight of the REOB as measured by ELSD. In some embodiments, the REOB 1% to 25% by weight of resins based on the total weight of the REOB as measured by ELSD. In some embodiments, the REOB 5% to 20% by weight of resins based on the total weight of the REOB as measured by ELSD.

In some embodiments, the REOB 1% to 10% by weight of asphaltenes based on the total weight of the REOB as measured by ELSD. In some embodiments, the REOB 2% to 10% by weight of asphaltenes based on the total weight of the REOB as measured by ELSD. In some embodiments, the REOB 4% to 10% by weight of asphaltenes based on the total weight of the REOB as measured by ELSD. In some embodiments, the REOB 6% to 10% by weight of asphaltenes based on the total weight of the REOB as measured by ELSD. In some embodiments, the REOB 8% to 10% by weight of asphaltenes based on the total weight of the REOB as measured by ELSD. In some embodiments, the REOB 1% to 8% by weight of asphaltenes based on the total weight of the REOB as measured by ELSD. In some embodiments, the REOB 1% to 6% by weight of asphaltenes based on the total weight of the REOB as measured by ELSD. In some embodiments, the REOB 1% to 4% by weight of asphaltenes based on the total weight of the REOB as measured by ELSD. In some embodiments, the REOB 1% to 2% by weight of asphaltenes based on the total weight of the REOB as measured by ELSD. In some embodiments, the REOB 2% to 7% by weight of asphaltenes based on the total weight of the REOB as measured by ELSD. In some embodiments, the REOB 6% to 7% by weight of asphaltenes based on the total weight of the REOB as measured by ELSD. In some embodiments, the REOB 2% to 6% by weight of asphaltenes based on the total weight of the REOB as measured by ELSD.

In some embodiments, each of the aforementioned REOBs includes hydrocarbons derived from re-refining used engine oil. In some embodiments, the hydrocarbons derived from re-refining used engine oil are viscous liquids at room temperature (i.e., their softening points are below room temperature). In some embodiments, the hydrocarbons derived from re-refining used engine oil comprise primarily saturated hydrocarbon fractions. In some embodiments, the high saturated hydrocarbon content may make them relatively incompatible with polymers used in asphalt modification, such as styrenic block copolymers (SBCs) or poly (ethylene vinyl acetate) (EVAs). In some embodiments, the liquid nature of these REOBs require an increase in softening point sufficient for the coatings to withstand temperatures normally seen by roofing materials without flowing.

In some embodiments, the composition comprises 40% to 60% by weight of the REOB based on a total weight of the composition. In some embodiments, the composition comprises 40% to 50% by weight of the REOB based on the total weight of the composition. In some embodiments, the composition comprises 40% to 45% by weight of the REOB based on the total weight of the composition. In some embodiments, the composition comprises 45% to 60% by weight of the REOB based on the total weight of the composition.

In some embodiments, the hardening agent comprises a resinous hardening agent. In some embodiments, the hardening agent comprises at least one rosin ester. In some embodiments, the at least one rosin ester is added to increase the softening point of the coating. In some embodiments, the at least one rosin ester is a bio-based resin. In some embodiments, the bio-based resin improves the compatibility of the resulting coating with polymeric modifiers such as SBCs and EVA because the bio-based resins introduce ring structures, unsaturated linkages, and a degree of polarity from alcohol groups, carbonyl groups, and ester linkages, depending on the bio-base resins utilized. In some embodiments, the hardening agent comprises at least one of abietic acid, pimaric acid, or any combination thereof. In some embodiments, at least one of the abietic acid, pimaric acid, or any combination thereof is esterified to modify the acid number:

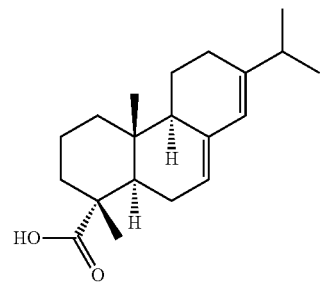

Abietic acid

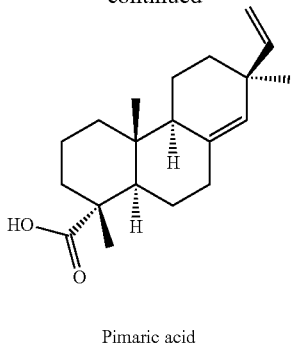

Pimaric acid

In some embodiments, for these two acids, the corresponding esterified products are esterified abietic acid and esterified pimaric acid. In some embodiments, the at least one rosin ester comprises at least one of esterified abietic acid, esterified pimaric acid, or any combination thereof. In some embodiments, the hardening agent comprises coumarone indene resin.

In some embodiments, the hardening agent (e.g., the at least one rosin ester) is present in the composition in an amount equal to that of the REOB. In some embodiments, for example, the composition comprises 40% to 60% by weight of the hardening agent based on the total weight of the composition. In some embodiments, the composition comprises 40% to 50% by weight of the hardening agent based on the total weight of the composition. In some embodiments, the composition comprises 40% to 45% by weight of the hardening agent based on the total weight of the composition. In some embodiments, the composition comprises 45% to 60% by weight of the hardening agent based on the total weight of the composition. In some embodiments, the composition comprises 10% more of the hardening agent than the amount of the REOB. In some embodiments, the composition comprises 10% less of the hardening agent than the amount of the REOB.

In some embodiments, for obtaining a more acceptable softening point, as well as having a sufficiently flexible material, as well as meeting other property requirements, an additional modifier or additional modifiers may be added to the composition. In some embodiments, a polymeric component (also referred to as a polymeric material; e.g., styrenic block copolymers (SBCs)), along with a variety of recycled materials, may be used in various compositions in order to afford the desired physical and performance characteristics into the coatings.

In some embodiments, the composition comprises a polymeric component, which may comprise at least one polymer.

In some embodiments, the at least one polymer may comprise, for example, a SBC. Examples of SBC include at least one of styrene-butadiene-styrene (SBS), styrene-ethylene-butadiene-styrene (SEBS), styrene-isoprene-styrene (SIS), or any combination thereof. In some embodiments, the at least one polymer may comprise at least one of SBS, SEBS, SIS, or any combination thereof.

In some embodiments, the polymeric component or the at least one polymer comprises a reactive terpolymer.

In some embodiments, the polymeric component or the at least one polymer is present in the composition in an amount of 0.1% to 20% by weight based on the total weight of the composition.

In some embodiments, it was observed that the inclusion of one or more recycled materials into the composition (e.g., in place of a portion of virgin SBS in some embodiments) provided properties that are useful for roofing materials. In some embodiments, the recycled material comprises at least one of such as ground tire rubber (GTR), recycled low density polyethylene (rLDPE), recycled polyvinylbutyral (rPVB), recycled polyethylene terephthalate (rPET), or any combination thereof. It will be appreciated that other hydrocarbon streams of a similar nature (such as virgin engine oil) can be formulated in a similar fashion to provide coatings that have properties useful for roofing applications. In some embodiments, some or all of the REOB is replaced with at least one of virgin engine oil, processed oil, Hydrolene® H600T, Kendex® 0897, Hyprene process oil, wax, or any combination thereof, among others. In some embodiments, such ingredients are present in an amount of 0.1-20 wt % based on a total weight of the composition.

In some embodiments, the composition comprises recycled material. In some embodiments, the recycled material comprises at least one of GTR, rLDPE, rPVB, rPET, or any combination thereof.

In some embodiments, the recycled material is present in the composition in an amount of 0.1% to 10% by weight based on the total weight of the composition.

In some embodiments, the composition does not comprise asphalt (i.e., the composition is "non-asphaltic").

In some embodiments, the composition has a softening point in a range of 190-275° F. In some embodiments, the composition has a softening point in a range of 200-265° F. In some embodiments, the composition has a softening point in a range of 210-255° F. In some embodiments, the composition has a softening point in a range of 220-245° F. In some embodiments, the composition has a softening point in a range of 230-240° F. In some embodiments, the composition has a softening point in a range of 200-265° F. In some embodiments, the composition has a softening point in a range of 202-232° F. In some embodiments, the composition has a softening point in a range of 205-218° F. In some embodiments, the composition has a softening point in a range of 216-218° F. Combinations of the above-referenced ranges are also possible (i.e., any of the lower and upper limits mentioned may constitute a range). For example, in some embodiments, the composition has a softening point in a range of 202-265° F. In some embodiments, the composition has a softening point in a range of 218-232° F. In some embodiments, the composition has a softening point in a range of 202-218° F.

In some embodiments, the composition has a viscosity measured at 400° F. in a range of 100-1000 cP (cps). In some embodiments, the composition has a viscosity measured at 400° F. in a range of 150-800 cP (cps). In some embodiments, the composition has a viscosity measured at 400° F. in a range of 200-700 cP (cps). In some embodiments, the composition has a viscosity measured at 400° F. in a range of 300-600 cP (cps). In some embodiments, the composition has a viscosity measured at 400° F. in a range of 400-500 cP (cps). In some embodiments, the composition has a viscosity measured at 400° F. in a range of 129-777 cP (cps). In some embodiments, the composition has a viscosity measured at 400° F. in a range of 427-675 cP (cps). In some embodiments, the composition has a viscosity measured at 400° F. in a range of 430-467 cP (cps). Combinations of the above-referenced ranges are also possible (i.e., any of the lower and upper limits mentioned may constitute a range). In some embodiments, for example, the composition has a viscosity measured at 400° F. in a range of 427-777 cP (cps). In some embodiments, the composition has a viscosity measured at 400° F. in a range of 467-777 cP (cps).

In some embodiments, the composition has a penetration measured at 77° F. in a range of 20-80 dmm. In some embodiments, the composition has a penetration measured at 77° F. in a range of 25-75 dmm. In some embodiments, the composition has a penetration measured at 77° F. in a range of 30-70 dmm. In some embodiments, the composition has a penetration measured at 77° F. in a range of 35-65 dmm. In some embodiments, the composition has a penetration measured at 77° F. in a range of 40-60 dmm. In some embodiments, the composition has a penetration measured at 77° F. in a range of 45-55 dmm. In some embodiments, the composition has a penetration measured at 77° F. in a range of 24-76 dmm. In some embodiments, the composition has a penetration measured at 77° F. in a range of 31-62 dmm. In some embodiments, the composition has a penetration measured at 77° F. in a range of 37-62 dmm. Combinations of the above-referenced ranges are also possible (i.e., any of the lower and upper limits mentioned may constitute a range). For example, in some embodiments, the composition has a penetration measured at 77° F. in a range of 31-37 dmm. In some embodiments, the composition has a penetration measured at 77° F. in a range of 31-76 dmm.

Some embodiments relate to a manufacturing procedure for making the composition. In some embodiments, the composition may be manufactured by mixing together the composition's ingredients using a mixer. In some embodiments, the mixer comprises at least one of a vertically or horizontally agitated tank, a high or low shear tubular mixer, a horizontal paddle mixer, a screw transport mixer, a continuous high shear mixer, a progressive cavity mixing pump, or any combination thereof.

Some embodiments relate to a coating made using the composition. Coatings for conventional roofing shingles comprise blown asphalt or polymer modified asphalt (PMA) that incorporates a mineral filler, usually limestone (i.e., calcium carbonate). In some embodiments, analogous coatings from the compositions described herein can also be prepared by the addition of a mineral filler such as limestone to the compositions or formulations described herein. In some embodiments, other fillers of an inorganic nature such as titanium dioxide, hydrated lime, magnesium hydroxide, aluminum hydroxide, etc. can also be used. In some embodiments, organic materials, such as cellulosic materials or lignin, may also be used as fillers. Similar to asphalt based shingle coatings, in some embodiments, the resulting filled coating would be a liquid at the application temperature range used for shingle manufacture (usually 390-450° F.) to facilitate the application of the coating to the supporting glass (i.e., fiberglass) mat or other substrate.

In some embodiments, the coating comprises (a) the composition described above and (b) the filler.

In some embodiments, the composition is present in the coating in an amount of 0.1-35 wt % based on a total weight of the coating. In some embodiments, the composition is present in the coating in an amount of 0.1-30 wt % based on the total weight of the coating. In some embodiments, the filler is present in the coating in an amount of 0.1-65 wt % based on the total weight of the coating. In some embodiments, the filler is present in the coating in an amount of 0.1-70 wt % based on the total weight of the coating. In some embodiments, the filler is present in the coating in an amount of 10-95 wt % based on the total weight of the coating. In some embodiments, the filler is present in the coating in an amount of 20-85 wt % based on the total weight of the coating. In some embodiments, the filler is present in the coating in an amount of 30-75 wt % based on the total weight of the coating. In some embodiments, the filler is present in the coating in an amount of 40-65 wt % based on the total weight of the coating. In some embodiments, the filler is present in the coating in an amount of 50-55 wt % based on the total weight of the coating. In some embodiments, the filler is present in the coating in an amount of 50-70 wt % based on the total weight of the coating. In some embodiments, the filler is present in the coating in an amount of 55-70 wt % based on the total weight of the coating. In some embodiments, the filler is present in the coating in an amount of 60-65 wt % based on the total weight of the coating. Combinations of the above referenced ranges are also possible (i.e., any of the lower and upper limits mentioned may constitute a range). For example, in some embodiments, the filler is present in the coating in an amount of 60-70 wt % based on the total weight of the coating. In some embodiments, the filler is present in the coating in an amount of 10-75 wt % based on the total weight of the coating. In some embodiments, the composition makes up the remaining wt % of the coating other than the filler. So, for example, in a case where the filler is present in the coating in an amount of 50 wt % based on the total weight of the coating, the composition may be present in the coating in an amount of 50 wt % based on the total weight of the coating.

In some embodiments, the filler comprises at least one of limestone, titanium dioxide, hydrated lime, magnesium hydroxide, aluminum hydroxide, cellulosic material, lignin, or any combination thereof.

In some embodiments, it is possible to employ a hydrocarbon stream such as, for example, oil distillation residue, used oil distillation residue, used engine oil distillation residue, REOB, etc., to prepare a composition, a coating comprising the composition, and a roofing material such as a shingle comprising the coating. In some embodiments, the composition may also include, for example, (a) resin such as rosin ester and (b) recycled material such as GTR, rLDPE, rPVB, or rPET. In some embodiments, by using recycled materials such as REOB and recycled plastics or rubber streams such as GTR, rLDPE, rPVB, or rPET, along with sustainable and biologically-derived resins such as rosin ester, it may be possible to prepare coatings where a significant amount of materials used is comprised of recycled and/or biologically-derived materials, and thereby to improve the environmental impact of the manufactured roofing materials. In some embodiments, a non- or low-asphaltic composition, and a highly flexible shingle with high bio-material content and high content of recycled materials, which is manufacturable on existing conventional shingle manufacturing equipment, are provided.

To manufacture the coating, in some embodiments, the composition and filler are mixed together (e.g., using a mixer as described above with respect to the manufacture of the composition).

In some embodiments, the coating has a softening point in a range of 190-275° F. In some embodiments, the coating has a softening point in a range of 200-265° F. In some embodiments, the coating has a softening point in a range of 210-255° F. In some embodiments, the coating has a softening point in a range of 220-245° F. In some embodiments, the coating has a softening point in a range of 230-240° F. In some embodiments, the coating has a softening point in a range of 212-269° F. In some embodiments, the coating has a softening point in a range of 220-269° F. In some embodiments, the coating has a softening point in a range of 228-250° F. In some embodiments, the coating has a softening point in a range of 235-241° F. Combinations of the above referenced ranges are also possible (i.e., any of the lower and upper limits mentioned may constitute a range). For example, in some embodiments, the coating has a softening point in a range of 235-269° F.

In some embodiments, the coating has a viscosity measured at 400° F. in a range of 900-16500 cP (cps). In some embodiments, the coating has a viscosity measured at 400° F. in a range of 2000-14000 cP (cps). In some embodiments, the coating has a viscosity measured at 400° F. in a range of 4000-12000 cP (cps). In some embodiments, the coating has a viscosity measured at 400° F. in a range of 6000-10000 cP (cps). In some embodiments, the coating has a viscosity measured at 400° F. in a range of 8000-9000 cP (cps). In some embodiments, the coating has a viscosity measured at 400° F. in a range of 943-16300 cP (cps). In some embodiments, the coating has a viscosity measured at 400° F. in a range of 2600-9216 cP (cps). In some embodiments, the coating has a viscosity measured at 400° F. in a range of 4608-5472 cP (cps). In some embodiments, the coating has a viscosity measured at 400° F. in a range of 4609-9216 cP (cps). Combinations of the above referenced ranges are also possible (i.e., any of the lower and upper limits mentioned may constitute a range). For example, in some embodiments, the coating has a viscosity measured at 400° F. in a range of 2600-9216 cP (cps). In some embodiments, the coating has a viscosity measured at 400° F. in a range of 5472-9216 cP (cps).

In some embodiments, the coating has a penetration measured at 77° F. in a range of 5-50 dmm. In some embodiments, the coating has a penetration measured at 77° F. in a range of 10-45 dmm. In some embodiments, the coating has a penetration measured at 77° F. in a range of 15-40 dmm. In some embodiments, the coating has a penetration measured at 77° F. in a range of 20-35 dmm. In some embodiments, the coating has a penetration measured at 77° F. in a range of 25-30 dm. In some embodiments, the coating has a penetration measured at 77° F. in a range of 8-46 dmm. In some embodiments, the coating has a penetration measured at 77° F. in a range of 13-39 dmm. In some embodiments, the coating has a penetration measured at 77° F. in a range of 14-17 dmm. Combinations of the above referenced ranges are also possible (i.e., any of the lower and upper limits mentioned may constitute a range). For example, in some embodiments, the coating has a penetration measured at 77° F. in a range of 8-39 dmm. In some embodiments, the coating has a penetration measured at 77° F. in a range of 17-46 dmm.

In some embodiments, the coating is non-asphaltic and does not comprise asphalt. In other embodiments, asphalt is present in the coating in an amount of 0.1-49 wt % based on the total weight of the coating, or 1-35 wt % based on the total weight of the coating, or 10-25 wt % based on the total weight of the coating. Combinations of the above referenced ranges are also possible (i.e., any of the lower and upper limits mentioned may constitute a range). For example, in some embodiments, asphalt is present in the coating in an amount of 1-10 wt % based on the total weight of the coating.

Some embodiments relate to roofing material made using the coating.

In some embodiments, a roofing material may be manufactured by, for example, performing a procedure comprising applying the coating to a substrate. In some embodiments, the coating is applied to both sides of the substrate. In some embodiments, the substrate may comprise a mat. In some embodiments, the mat comprises or is made of fiberglass.

In some embodiments, the roofing material may be a shingle.

In some embodiments, a surfacing material may be applied to a surface of the coated substrate. In some embodiments, where the substrate is coated on both sides, the surfacing material may be applied on one or both coated surfaces. In some embodiments, applying the surfacing material to both coated surfaces may be able to prevent the roofing materials from sticking to one another. In some embodiments, the surfacing material comprises at least one of sand, fines, or any combination thereof. In some embodiments, the surfacing material is in the form of granules (e.g., sand and/or fines, in granular form). In some embodiments, other protective coatings may be used to protect the REOB based coating. In some embodiments, the other protective coatings may include a UV and/or weather resistant film or paint.

In some embodiments, a UV blocker or absorber may be incorporated in the REOB based coating. In some embodiments, the UV blocker or absorber may, for example, protect SBS from photodegradation. In some of these embodiments in which the UV blocker or absorber is incorporated into the coating, a surfacing material such as granules or other protective coatings (such as, for example, a UV-resistant film or paint) may be omitted. In some embodiments, the coating or composition comprises a UV resistant polymer. Examples of such polymers include at least one of EVA, SEBS, or any combination thereof. In some of these embodiments, it may be possible to dispense with the UV resistant film or paint.

In some embodiments, the roofing material described herein may, with the coating described herein in hand, be prepared using conventional equipment presently used for the preparation of roofing material (e.g., asphaltic shingles) with no or few process changes. As a result, in some embodiments, it may be possible to produce a shingle without performing one or more of: coextrusion, compression molding, forming, molding, co-injection, shot injection molding, multiple step injection molding, lamination, pultrusion, etc. Note that extrusion and compression molding are both relatively slow processes relative to conventional shingle production methods, which may lead to reduced productivity.

Some embodiments relate to a roofing material comprising: a substrate and a coating on the substrate, wherein the coating comprises a composition and a filler, wherein the composition comprises: (1) 40-60 wt % re refined engine oil bottoms (REOB), (2) 40-60 wt % at least one rosin ester, (3) 0.1-20 wt % at least one polymer, and (4) 0.1-10 wt % recycled material comprising at least one of ground tire rubber (GTR), recycled low density polyethylene (rLDPE), recycled polyvinylbutyral (rPVB), recycled polyethylene terephthalate (rPET), or any combination thereof, wherein the filler comprises at least one of limestone, titanium dioxide, hydrated lime, magnesium hydroxide, aluminum hydroxide, cellulosic material, lignin, or any combination thereof, and wherein the filler is present in the coating in an amount of 0.1-95 wt % with respect to a total weight of the coating.

Some embodiments relate to a roofing shingle. In some embodiments, the roofing shingle comprises a substrate. In some embodiments, the substrate comprises a mat. In some embodiments, the roofing shingle comprises a filled coating. In some embodiments, the filled coating is on the substrate. In some embodiments, the filled coating comprises 10% to 90% by weight of a polymer blend based on a total weight of the filled coating; and 10% to 90% by weight of at least one filler based on the total weight of the filled coating. In some embodiments, the polymer blend comprises at least 30% by weight of at least one hydrocarbon oil based on a total weight of the polymer blend; at least 30% by weight of at least one resin based on the total weight of the polymer blend; at least 5% by weight of at least one thermoplastic polymer based on the total weight of the polymer blend. In some embodiments, the filled coating having at least one of a) a softening point of at least 200° F. as measured according to ASTM D3461, or b) a viscosity of 7000 cP or less as measured according to ASTM D4402 using a #31 spindle at 400° F.

Some embodiments relate to a roofing shingle. In some embodiments, the roofing shingle comprises a substrate. In some embodiments, the substrate comprises a mat. In some embodiments, the roofing shingle comprises a filled coating. In some embodiments, the filled coating is on the substrate. In some embodiments, the filled coating consists of 10% to 90% by weight of a polymer blend based on a total weight of the filled coating; and 10% to 90% by weight of at least one filler based on the total weight of the filled coating. In some embodiments, the polymer blend comprises at least 30% by weight of at least one hydrocarbon oil based on a total weight of the polymer blend; at least 30% by weight of at least one resin based on the total weight of the polymer blend; at least 5% by weight of at least one thermoplastic polymer based on the total weight of the polymer blend. In some embodiments, the filled coating having at least one of a) a softening point of at least 200° F. as measured according to ASTM D3461, or b) a viscosity of 7000 cP or less as measured according to ASTM D4402 using a #31 spindle at 400° F.

Some embodiments relate to a roofing system. In some embodiments, the roofing system comprises a roofing substrate. In some embodiments, the roofing system comprises a plurality of roofing shingles. In some embodiments, the plurality of roofing shingles is secured to the roofing substrate. In some embodiments, each roofing shingle of the plurality of roofing shingles comprises a substrate, and a filled coating on the substrate. In some embodiments, the substrate comprises a mat. In some embodiments, the filled coating comprises 10% to 90% by weight of a polymer blend based on a total weight of the filled coating; and 10% to 90% by weight of at least one filler based on the total weight of the filled coating. In some embodiments, the polymer blend comprises at least 30% by weight of at least one hydrocarbon oil based on a total weight of the polymer blend; at least 30% by weight of at least one resin based on the total weight of the polymer blend; at least 5% by weight of at least one thermoplastic polymer based on the total weight of the polymer blend. In some embodiments, the filled coating having at least one of a) a softening point of at least 200° F. as measured according to ASTM D3461, or b) a viscosity of 7000 cP or less as measured according to ASTM D4402 using a #31 spindle at 400° F.

Some embodiments relate to a roofing system. In some embodiments, the roofing system comprises a roofing substrate. In some embodiments, the roofing system comprises a plurality of roofing shingles. In some embodiments, the plurality of roofing shingles is secured to the roofing substrate. In some embodiments, each roofing shingle of the plurality of roofing shingles comprises a substrate, and a filled coating on the substrate. In some embodiments, the substrate comprises a mat. In some embodiments, the filled coating consists of 10% to 90% by weight of a polymer blend based on a total weight of the filled coating; and 10% to 90% by weight of at least one filler based on the total weight of the filled coating. In some embodiments, the polymer blend comprises at least 30% by weight of at least one hydrocarbon oil based on a total weight of the polymer blend; at least 30% by weight of at least one resin based on the total weight of the polymer blend; at least 5% by weight of at least one thermoplastic polymer based on the total weight of the polymer blend. In some embodiments, the filled coating having at least one of a) a softening point of at least 200° F. as measured according to ASTM D3461, or b) a viscosity of 7000 cP or less as measured according to ASTM D4402 using a #31 spindle at 400° F.

Some embodiments relate to a method of making a roofing shingle. In some embodiments, the method comprises obtaining a substrate. In some embodiments, the method comprises obtaining a polymer blend. In some embodiments, the polymer blend comprises at least 30% by weight of at least one hydrocarbon oil based on a total weight of the polymer blend; at least 30% by weight of at least one resin based on the total weight of the polymer blend; at least 5% by weight of at least one thermoplastic polymer based on the total weight of the polymer blend. In some embodiments, the method comprises obtaining at least one filler. In some embodiments, the method comprises mixing the polymer blend and the at least one filler in an amount sufficient to obtain a filled coating material comprising 10% to 90% by weight of the polymer blend based on a total weight of the filled coating material; and 10% to 90% by weight of the at least one filler based on the total weight of the filled coating material. In some embodiments, the method comprises applying the filled coating material to the substrate, so as to form a roofing shingle comprising a filled coating on the substrate. In some embodiments, the filled coating having at least one of a) a softening point of at least 200° F. as measured according to ASTM D3461, or b) a viscosity of 7000 cP or less as measured according to ASTM D4402 using a #31 spindle at 400° F.

Some embodiments relate to a method of making a roofing shingle. In some embodiments, the method comprises obtaining a substrate. In some embodiments, the method comprises obtaining a polymer blend. In some embodiments, the polymer blend comprises at least 30% by weight of at least one hydrocarbon oil based on a total weight of the polymer blend; at least 30% by weight of at least one resin based on the total weight of the polymer blend; at least 5% by weight of at least one thermoplastic polymer based on the total weight of the polymer blend. In some embodiments, the method comprises obtaining at least one filler. In some embodiments, the method comprises mixing the polymer blend and the at least one filler in an amount sufficient to obtain a filled coating material consisting of 10% to 90% by weight of the polymer blend based on a total weight of the filled coating material; and 10% to 90% by weight of the at least one filler based on the total weight of the filled coating material. In some embodiments, the method comprises applying the filled coating material to the substrate, so as to form a roofing shingle comprising a filled coating on the substrate. In some embodiments, the filled coating having at least one of a) a softening point of at least 200° F. as measured according to ASTM D3461, or b) a viscosity of 7000 cP or less as measured according to ASTM D4402 using a #31 spindle at 400° F.

Some embodiments relate to a roofing material. In some embodiments, the roofing material comprises a substrate, and a coating on the substrate. In some embodiments, the coating comprises a composition and at least one filler. In some embodiments, the coating comprises 5% to 99.9% by weight of the composition based on a total weight of the coating. In some embodiments, the coating comprises 0.1% to 95% by weight of the at least one filler based on the total weight of the coating. In some embodiments, the composition comprises at least one of re-refined engine oil bottoms (REOB), at least one rosin ester, at least one polymer, a recycled material, or any combination thereof. In some embodiments, the composition comprises 40% to 60% by weight of the REOB based on a total weight of the composition. In some embodiments, the composition comprises 40% to 60% by weight of the at least one rosin ester based on the total weight of the composition. In some embodiments, the composition comprises 0.1% to 20% by weight of the at least one polymer based on the total weight of the composition. In some embodiments, the composition comprises 0.1% to 10% by weight of the recycled material based on the total weight of the composition. In some embodiments, the recycled material comprises at least one of ground tire rubber (GTR), recycled low density polyethylene (rLDPE), recycled polyvinylbutyral (rPVB), recycled polyethylene terephthalate (rPET), or any combination thereof. In some embodiments, the at least one filler comprises at least one of limestone, titanium dioxide, hydrated lime, magnesium hydroxide, aluminum hydroxide, cellulosic material, lignin, or any combination thereof.

In some embodiments, the at least one rosin ester comprises at least one of esterified abietic acid, esterified pimaric acid, or any combination thereof.

In some embodiments, the at least one polymer comprises at least one of styrenic block copolymer (SBC), poly(ethylene vinyl acetate) (EVA), or any combination thereof.

In some embodiments, the at least one polymer comprises styrene-ethylene-butadiene-styrene block copolymer (SEBS).

In some embodiments, a softening point of the composition is 190° F. to 275° F.

In some embodiments, a viscosity of the composition is 100 cP to 1000 cP as measured at 400° F.

In some embodiments, a penetration point of the composition is 20 dmm to 80 dmm as measured at 77° F.

In some embodiments, the substrate comprises a fiberglass mat.

In some embodiments, the roofing material further comprises a surfacing material on the coating, wherein the surfacing material comprises at least one of sand, rock fines, or any combination thereof.

In some embodiments, the roofing material is a roofing shingle.

Some embodiments relate to a roofing material comprising a substrate, and a coating on the substrate. In some embodiments, the coating comprises 5% to 99.9% of a composition based on a total weight of the coating. In some embodiments, the composition comprises 40% to 60% by weight of a distillation residue from refining of used oil based on a total weight of the composition. In some embodiments, the composition comprises 40% to 60% by weight of a resinous hardening agent based on the total weight of the composition. In some embodiments, the composition comprises 0.1% to 20% by weight of a polymeric material based on the total weight of the composition. In some embodiments, the polymer material comprises at least one of styrenic block copolymer (SBC), poly(ethylene vinyl acetate) (EVA), or any combination thereof. In some embodiments, the composition comprises 0.1% to 10% by weight of at least one recycled material. In some embodiments, the at least one recycled material comprises at least one of ground tire rubber (GTR), recycled low density polyethylene (rLDPE), recycled polyvinylbutyral (rPVB), recycled polyethylene terephthalate (rPET), or any combination thereof. In some embodiments, the coating comprises 0.1% to 95% by weight of at least one filler based on a total weight of the coating. In some embodiments, the at least one filler comprises at least one of limestone, titanium dioxide, hydrated lime, magnesium hydroxide, aluminum hydroxide, cellulosic material, lignin, or any combination thereof.

In some embodiments, the distillation residue comprises re-refined engine oil bottoms (REOB).

In some embodiments, the resinous hardening agent comprises at least one of esterified abietic acid, esterified pimaric acid, or any combination thereof.

In some embodiments, the polymeric material comprises styrene-ethylene-butadiene-styrene block copolymer (SEBS).

In some embodiments, within a temperature range of 390-450° F., the coating is liquid.

In some embodiments, the substrate comprises a mat, wherein the mat comprises fiberglass.

In some embodiments, the roofing material is a shingle.

In some embodiments, the roofing material further comprises a surfacing material on the coating.

In some embodiments, the surfacing material comprises at least one of sand, rock fines, or any combination thereof.

In some embodiments, the surfacing material comprises a UV- and weather-resistant film or a UV- and weather-resistant paint.

Some embodiments relate to a method. In some embodiments, the method comprises one or more of the following steps: obtaining distillation residue from refining of used engine oil; obtaining at least one rosin ester; obtaining at least one polymer; obtaining a recycled material comprising at least one of ground tire rubber (GTR), recycled low density polyethylene (rLDPE), recycled polyvinylbutyral (rPVB), recycled polyethylene terephthalate (rPET), or any combination thereof; preparing a mixture comprising the distillation residue, the at least one rosin ester, the at least one polymer, and the recycled material, wherein the mixture comprises, based on a total weight of the mixture: 40% to 60% by weight of the distillation residue, 40% to 60% by weight of the at least one rosin ester, 0.1% to 20% by weight of the at least one polymer, and 0.1% to 10% by weight of the recycled material; preparing a coating comprising the mixture and a filler, wherein the filler comprises at least one of limestone, titanium dioxide, hydrated lime, magnesium hydroxide, aluminum hydroxide, cellulosic material, lignin, or any combination thereof, and wherein the filler is present in the coating in an amount of 0.1% to 95% by weight based on a total weight of the coating; and manufacturing a roofing material, the manufacturing comprising applying the coating to a mat comprising fiberglass.

A non-limiting example of a cross-section of at least a portion of a roofing material 100 is shown in FIG. 1 according to some embodiments. As shown in FIG. 1, in some embodiments, the roofing material 100 may comprise, consist of, or consist essentially of a substrate 102 and a coating 104. In the illustrated embodiment, the coating 104 is disposed on at least a portion of a surface of the substrate 102.

Figure 2:
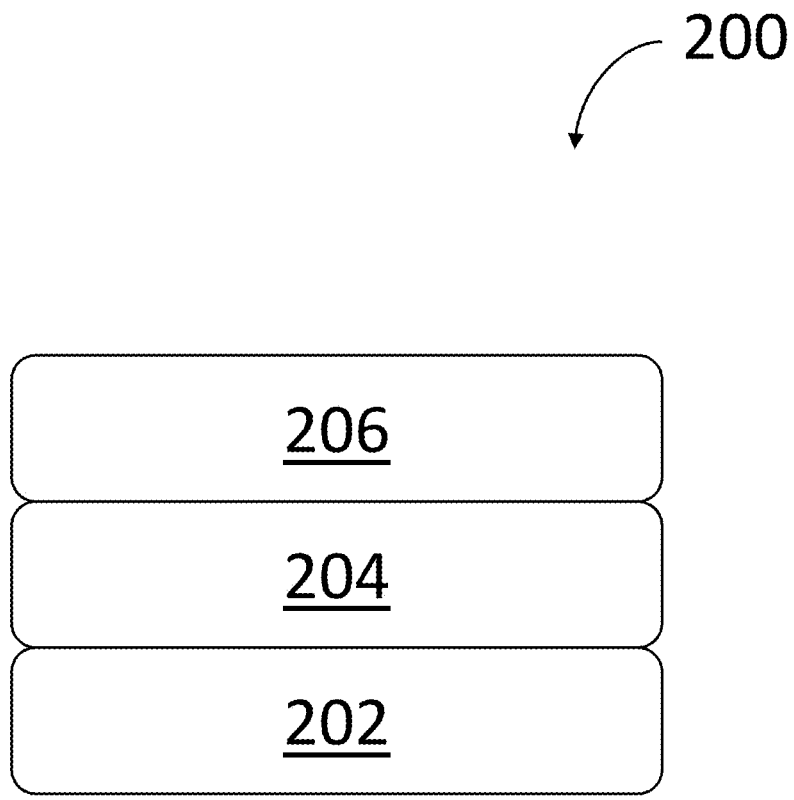
FIG. 2 is a schematic diagram of a roofing material, according to some embodiments of the present disclosure.

A non-limiting example of a cross-section of at least a portion of a roofing material 200 is shown in FIG. 2 according to some embodiments. As shown in FIG. 2, in some embodiments, the roofing material 200 may comprise, consist of, or consist essentially of a substrate 202, a coating 204, and a surface coating 206. In the illustrated embodiment, the coating 204 is disposed on at least a portion of a surface of the substrate 202, and the surface coating 206 is disposed on at least a portion of a surface of the coating 204.

Figure 3:
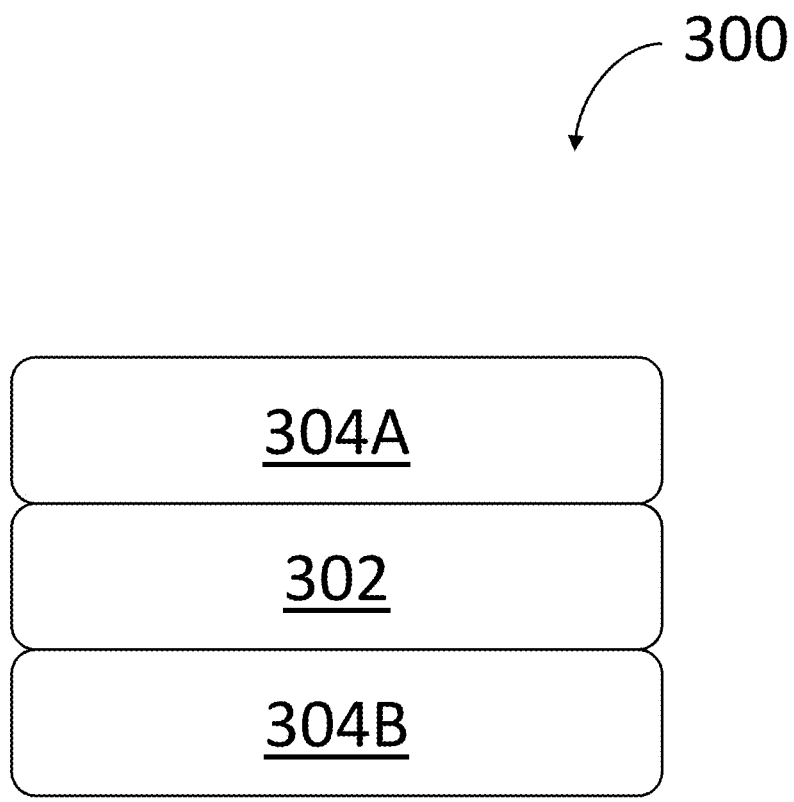
FIG. 3 is a schematic diagram of a roofing material, according to some embodiments of the present disclosure.

A non-limiting example of a cross-section of at least a portion of a roofing material 300 is shown in FIG. 3 according to some embodiments. As shown in FIG. 3, in some embodiments, the roofing material 300 may comprise, consist of, or consist essentially of a substrate 302, a coating 304A, and a coating 304B. In the illustrated embodiment, the substrate 302 has a top surface and a bottom surface, the coating 304A is disposed on the top surface of the substrate 302, and the coating 304B is disposed on the bottom surface of the substrate 302. In some embodiments, each of the coating 304A and the coating 304B may be independently selected from an asphaltic coating or a non-asphaltic coating. In some embodiments, the coating 304A and the coating 304B may be non-asphaltic coatings. In some embodiments, the coating 304A and the coating 304B may be asphaltic coatings. In some embodiments, the roofing material 300 may further comprise, consist of, or consist essentially of at least one additional coating, which may be an asphaltic coating or a non-asphaltic coating.

Figure 4:
FIG. 4 is a schematic diagram of a roofing material, according to some embodiments of the present disclosure.

A non-limiting example of a cross-section of at least a portion of a roofing material 400 is shown in FIG. 4 according to some embodiments. As shown in FIG. 4, in some embodiments, the roofing material 400 may comprise, consist of, or consist essentially of a coated substrate 402 in which a coating is embedded in a substrate to obtain the coated substrate 402.

Some embodiments of the present disclosure provide a method. In some embodiments, the method may relate to the preparation of a coating, a roofing material comprising at least the coating, or any combination thereof.

Figure 5:
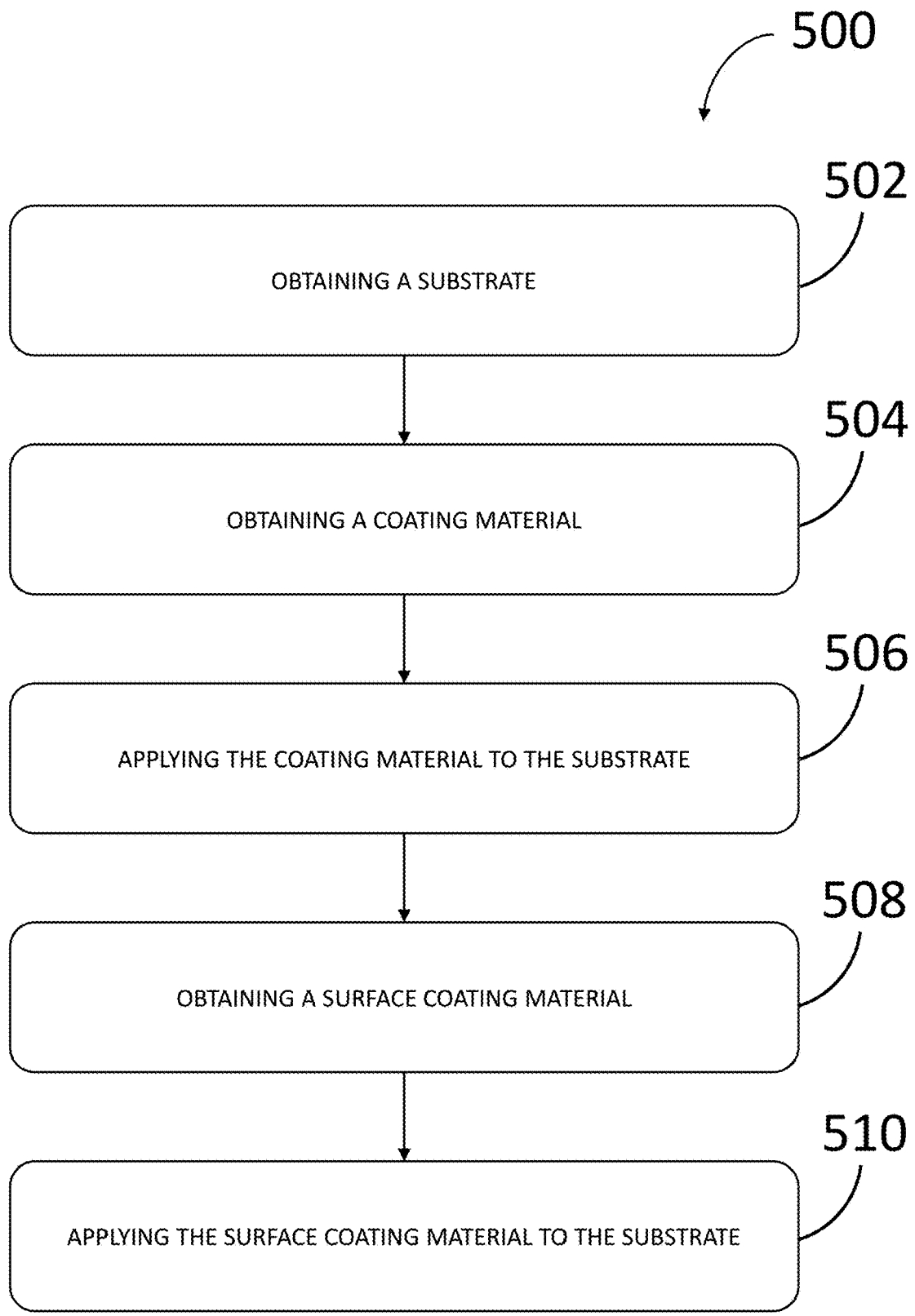
FIG. 5 is a flowchart of a method of preparing a roofing material, according to some embodiments of the present disclosure.

A non-limiting example of a method of preparing a roofing material 500 is shown in FIG. 5 according to some embodiments. As shown in FIG. 5, the method of preparing the roofing material 500 may comprise, consist of, or consist essentially of at least one of the following steps: obtaining 502 a substrate, obtaining 504 a coating material, applying 506 the coating material to the substrate, obtaining 508 a surface coating material, and applying 510 the surface coating material to the substrate.

In some embodiments, the method may further comprise preparing the coating, including, for example and without limitation, the coating material. In some embodiments, the step of preparing the coating may be conducted by mixing the polymer blend with the at least one filler at 300° F. to 425° F. in one of (i) a low shear mixer or (ii) a high shear mixer. In some embodiments, the step of preparing the coating may be conducted by mixing the polymer blend with the at least one filler at 300° F. to 415° F. In some embodiments, the step of preparing the coating may be conducted by mixing the polymer blend with the at least one filler at 300° F. to 410° F. In some embodiments, the step of preparing the coating may be conducted by mixing the polymer blend with the at least one filler at 300° F. to 400° F. In some embodiments, the step of preparing the coating may be conducted by mixing the polymer blend with the at least one filler at 300° F. to 390° F. In some embodiments, the step of preparing the coating may be conducted by mixing the polymer blend with the at least one filler at 300° F. to 380° F. In some embodiments, the step of preparing the coating may be conducted by mixing the polymer blend with the at least one filler at 300° F. to 375° F. In some embodiments, the step of preparing the coating may be conducted by mixing the polymer blend with the at least one filler at 300° F. to 360° F. In some embodiments, the step of preparing the coating may be conducted by mixing the polymer blend with the at least one filler at 300° F. to 350° F. In some embodiments, the step of preparing the coating may be conducted by mixing the polymer blend with the at least one filler at 300° F. to 340° F. In some embodiments, the step of preparing the coating may be conducted by mixing the polymer blend with the at least one filler at 300° F. to 330° F. In some embodiments, the step of preparing the coating may be conducted by mixing the polymer blend with the at least one filler at 300° F. to 325° F. In some embodiments, the step of preparing the coating may be conducted by mixing the polymer blend with the at least one filler at 300° F. to 315° F. In one embodiment, the mixing of the polymer blend with the at least one filler may be conducted without an extruder.

In some embodiments, the coating may be prepared by mixing the various components using static mixing, a low shear mixer, a high shear mixer, or any combination thereof. A non-limiting example of a low shear mixer is EUROSTAR® 60 Digital, IKA Works, Inc., Wilmington, N.C., which mixes batches at about 500 to 1500 RPM, with a paddle-type blade to generate low shear. A non-limiting example of a high shear mixer is SILVERSON® L5M-A Laboratory Mixer, Silverson Machines, Inc., East Longmeadow, Mass., which mixes batches at or above 3200 RPM, with a blade and a head that are configured to generate high shear, as well as heat mixing. In some embodiments, the mixing of the coating may be conducted at an ambient temperature (e.g., about 700 Fahrenheit). In some embodiments, after mixing, the coating may be allowed to dry at an ambient temperature (e.g., about 700 Fahrenheit). In some embodiments, after mixing, the coating may be dried in an oven at about 90° F. to 140° F.

In some embodiments, the coating may be mixed in an extruder and/or a high shear mixer at 330° F. to 425° F., and then the coating may be discharged from the high shear mixer at 330° F. to 410° F. and roll pressed into sheets. In some embodiments, the coating may be discharged from the mixer at 330° F. to 400° F. In some embodiments, the coating may be discharged from the mixer at 330° F. to 390° F. In some embodiments, the coating may be discharged from the mixer at 330° F. to 380° F. In some embodiments, the coating may be discharged from the mixer at 330° F. to 375° F. In some embodiments, the coating may be discharged from the mixer at 330° F. to 360° F. In some embodiments, the coating may be discharged from the mixer at 330° F. to 350° F. In some embodiments, the coating may be discharged from the mixer at 330° F. to 340° F. In some embodiments, the coating may be pressed into a glass mat. According to some embodiments, once the coating is roll pressed, the coating may be capped with granules and cut to the desired shape.

In some embodiments, the coating may be in the form of a pourable coating formulation (e.g., at temperatures of 390° F. to 450° F.) that is mixed at 300° F. to 425° F., or 330° F. to 410° F. in an extruder and/or a low shear mixer. In some embodiments, the pourable coating formulation, which is generally at 380° F. to 420° F. after mixing, may then be poured onto a glass mat on one or both sides and roll pressed to impregnate and saturate the mat. In some embodiments, granules may then be applied and the roofing material (e.g., shingle(s)) may be cut to the desired shape.

In some embodiments, the step 506 of applying the coating material to the surface of the substrate to form the roofing material may be conducted on a substantially standard manufacturing line for asphaltic shingles at a standard speed, ranging from 110 FPM to 1000 FPM. As discussed above, a non-limiting example of a substantially standard manufacturing line for asphaltic shingles is detailed in U.S. Pat. No. 10,195,640, the contents of which are hereby incorporated reference.

In some embodiments, the method may further comprise applying 510 a surface coating, such as granules, to the coating. In some embodiments, granules may be applied to a surface of the roofing material (e.g., shingle). In some embodiments, the method includes applying mineral surfacing to the coating, such as, e.g., fines, granules, sand, metal flakes and/or reflective granules. In some embodiments, the method includes applying polymer films and/or synthetic and/or natural non-woven and/or woven fabrics, with or without decorative elements, including, for example, printing, embossing and/or protective coatings, to the coating. In some embodiments, photo (e.g., UV) and/or thermal stabilizers are added to a surface of the coating and/or roofing material.

Figure 6:
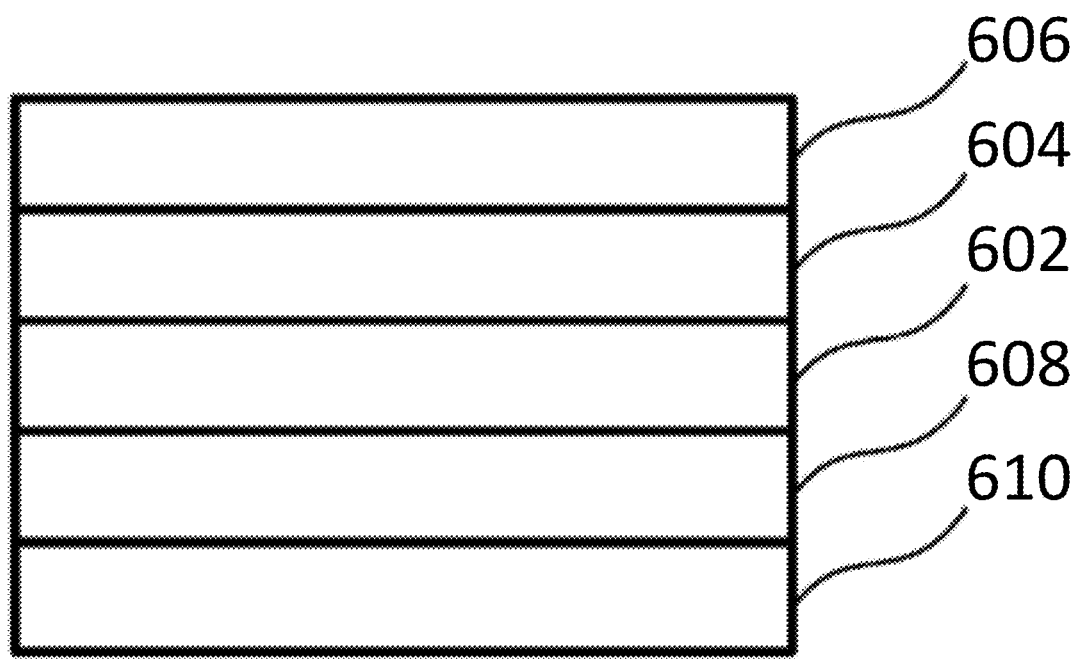
FIG. 6 is a schematic diagram of a roofing material, according to some embodiments of the present disclosure.

A non-limiting example of a cross-section of at least a portion of a roofing material 600 is shown in FIG. 6 according to some embodiments. As shown in FIG. 6, in some embodiments, the roofing material 600 is a roofing shingle in schematic form, with reference numerals referring to structural components as follows: mat 602, front mat surface coating 604, front surfacing material 606, rear mat surface coating 608, and rear surface coating 610, with the coating and surfacing material corresponding to those discussed above.

EXAMPLES

The following Examples 1-17 relate to polymer blends based on petroleum distillation products and re-refined engine oil bottoms (REOBs), according to some embodiments of the present disclosure. The formulations of the prepared polymer blends and the measurements of the physical properties of the prepared polymer blends—including the softening point (° F.) as measured according to ASTM D3461, the viscosity (centipoise or cP) as measured according to ASTM D4402 using a #31 spindle at 400° F., and penetration (PEN) (dmm) at 77° F. as measured according to ASTM D5—are summarized in Table 1 (below).

TABLE 1

| Sample | Hydrocarbon Oil | Resin | Polymer | Softening Point (° F.) | Viscosity (cP) (400° F.) | Penetration (dmm) (77° F.) |
|---|---|---|---|---|---|---|
| A | Kendex 0897, 44% | WestRez 5120, 44% | D1184, 12% | 260 | 870 | 68 |
| B | Kendex 0897, 44% | Dertoline P105, 44% | D1184, 12% | 242 | 790 | 131 |
| C | Hydrolene H600T, 44% | WestRez 5120, 44% | D1184, 12% | 200 | 1117 | 35 |
| D | Hydrolene H600T, 53% | Sylvacote 7097, 35% | D1184, 12% | 221 | 510 | 47 |
| E | UES REOB, 44% | Sylvacote 7097, 44% | D1184, 12% | 202 | 357 | 47 |
| F | Safety-Kleen, 44% | WestRez 5120, 44% | D1184, 12% | 257 | 1065 | 45 |
| G | Safety-Kleen, 44% | Sylvacote 4984, 44% | D1184, 12% | 260 | 622 | 30 |
| H | Hydrolene H600T, 44% | Dertoline P110, 44% | D1184, 12% | 198 | 1137 | 84 |
| I | UES REOB, 44% | WestRez 5120, 44% | D1184, 12% | 150 | 175 | 229 |
| J | Kendex 0897, 44% | Sylvacote 7097, 44% | D1184, 12% | 313 | 7120 | 87 |
| K | Kendex 0897, 44% | Sylvacote 7097, 44% | Elvax 240W, 12% | <170 | 265 | 46 |
| L | Kendex 0897, 44% | WestRez 5120, 44% | Recycled SBS, 12% | 180 | 42 | 90 |
| M | Kendex 0897, 44% | WestRez 5215, 44% | Recycled SBS, 12% | 177 | 40 | 138 |
| N | UES REOB, 44% | Sylvares 115, 44% | D1101, 6%; Recycled PS, 6% | 135 | 60 | 27 |
| O | UES REOB, 44% | Sylvares 115, 44% | Recycled SBS, 6%; Recycled PS, 6% | 141 | 42 | 18 |
| P | Vertex REOB 1748-F, 44% | Sylvacote 4984, 44% | D1184, 12% | 275 | 1928 | 31 |
| Q | Vertex REOB 1748-F, 46% | Sylvacote 4984, 46% | D1184, 8% | 239 | 459 | 30 |

Example 1

In this Example, a polymer blend comprising a hydrocarbon oil, a resin, and a polymer was prepared as Sample A, according to some embodiments of the present disclosure. The Sample A comprising 44% by weight of the hydrocarbon oil (Kendex 0897), 44% by weight of the resin (WestRez 5120), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of the Sample A.

Example 2

In this Example, a polymer blend comprising a hydrocarbon oil, a resin, and a polymer was prepared as Sample B, according to some embodiments of the present disclosure. Sample B comprising 44% by weight of the hydrocarbon oil (Kendex 0897), 44% by weight of the resin (Dertoline P105), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample B.

Example 3

In this Example, a polymer blend comprising a hydrocarbon oil, a resin, and a polymer was prepared as Sample C, according to some embodiments of the present disclosure. Sample C comprising 44% by weight of the hydrocarbon oil (Hydrolene H600T), 44% by weight of the resin (WestRez 5120), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample C.

Example 4

In this Example, a polymer blend comprising a hydrocarbon oil, a resin, and a polymer was prepared as Sample D, according to some embodiments of the present disclosure. Sample D comprising 53% by weight of the hydrocarbon oil (Hydrolene H600T), 35% by weight of the resin (Sylvacote 7097), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample D.

Example 5

In this Example, a polymer blend comprising a hydrocarbon oil, a resin, and a polymer was prepared as Sample E, according to some embodiments of the present disclosure. Sample E comprising 44% by weight of the hydrocarbon oil (UES REOB), 44% by weight of the resin (Sylvacote 7097), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample E.

Example 6

In this Example, a polymer blend comprising a hydrocarbon oil, a resin, and a polymer was prepared as Sample F, according to some embodiments of the present disclosure. Sample F comprising 44% by weight of the hydrocarbon oil (Safety-Kleen), 44% by weight of the resin (WestRez 5120), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample F.

Example 7

In this Example, a polymer blend comprising a hydrocarbon oil, a resin, and a polymer was prepared as Sample G, according to some embodiments of the present disclosure. Sample G comprising 44% by weight of the hydrocarbon oil (Safety-Kleen), 44% by weight of the resin (Sylvacote 4984), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample G.

Example 8

In this Example, a polymer blend comprising a hydrocarbon oil, a resin, and a polymer was prepared as Sample H, according to some embodiments of the present disclosure. Sample H comprising 44% by weight of the hydrocarbon oil (Hydrolene H600T), 44% by weight of the resin (Dertoline P110), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample H.

Example 9

In this Example, a polymer blend comprising a hydrocarbon oil, a resin, and a polymer was prepared as Sample I, according to some embodiments of the present disclosure. Sample I comprising 44% by weight of the hydrocarbon oil (UES REOB), 44% by weight of the resin (WestRez 5120), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample I.

Example 10

In this Example, a polymer blend comprising a hydrocarbon oil, a resin, and a polymer was prepared as Sample J, according to some embodiments of the present disclosure. Sample J comprising 44% by weight of the hydrocarbon oil (Kendex 0897), 44% by weight of the resin (Sylvacote 7097), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample J.

Example 11

In this Example, a polymer blend comprising a hydrocarbon oil, a resin, and a polymer was prepared as Sample K, according to some embodiments of the present disclosure. Sample K comprising 44% by weight of the hydrocarbon oil (Kendex 0897), 44% by weight of the resin (Sylvacote 7097), and 12% by weight of the polymer (Elvax 240W), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample K.

Example 12

In this Example, a polymer blend comprising a hydrocarbon oil, a resin, and a polymer was prepared as Sample L, according to some embodiments of the present disclosure. Sample L comprising 44% by weight of the hydrocarbon oil (Kendex 0897), 44% by weight of the resin (WestRez 5120), and 12% by weight of the polymer (Recycled SBS), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample L.

Example 13

In this Example, a polymer blend comprising a hydrocarbon oil, a resin, and a polymer was prepared as Sample M, according to some embodiments of the present disclosure. Sample M comprising 44% by weight of the hydrocarbon oil (Kendex 0897), 44% by weight of the resin (WestRez 5215), and 12% by weight of the polymer (Recycled SBS), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample M.

Example 14

In this Example, a polymer blend comprising a hydrocarbon oil, a resin, and a polymer was prepared as Sample N, according to some embodiments of the present disclosure. Sample N comprising 44% by weight of the hydrocarbon oil (UES REOB), 44% by weight of the resin (Sylvares 115), and 12% by weight of the polymer (D1101, 6%; Recycled Polystyrene (PS), 6%), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample N.

Example 15

In this Example, a polymer blend comprising a hydrocarbon oil, a resin, and a polymer was prepared as Sample O, according to some embodiments of the present disclosure. Sample O comprising 44% by weight of the hydrocarbon oil (UES REOB), 44% by weight of the resin (Sylvares 115), and 12% by weight of the polymer (Recycled SBS, 6%, Recycled PS, 6%), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample O.

Example 16

In this Example, a polymer blend comprising a hydrocarbon oil, a resin, and a polymer was prepared as Sample P, according to some embodiments of the present disclosure. Sample P comprising 44% by weight of the hydrocarbon oil (Vertex REOB 1748-F), 44% by weight of the resin (Sylvacote 4984), and 12% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample P.

Example 17

In this Example, a polymer blend comprising a hydrocarbon oil, a resin, and a polymer was prepared as Sample Q, according to some embodiments of the present disclosure. Sample Q comprising 46% by weight of the hydrocarbon oil (Vertex REOB 1748-F), 46% by weight of the resin (Sylvacote 4984), and 8% by weight of the polymer (D1184), wherein each weight percentage is based on a total weight of the polymer blend. Physical properties of the resulting polymer blend were measured and included a softening point (SP) (° F.), a viscosity (centipoise or cP at 400° F.), and a penetration (dmm, at 77° F.). Table 1 summarizes the measured physical properties of Sample Q.

The following Examples 18-24 relate to filled coatings comprising the polymer blends and fillers of the present disclosure, in comparison to control filled coatings. The formulations of the control filled coatings, the filled coatings of the present disclosure, and the measurements of the physical properties thereof—including the softening point (° F.) as measured according to ASTM D3461, the viscosity (centipoise or cP) as measured according to ASTM D4402 using a #31 spindle at 400° F., and penetration (PEN) (dmm) at 77° F. as measured according to ASTM D5—are summarized in Table 2 (below). The filled coatings of the present disclosure presented in Table 2 below are liquids at the application temperature range used for shingle manufacturing (e.g., usually 390° F. to 450° F.) to facilitate the application of the filled coating to a substrate, such as a supporting glass mat, among others.

TABLE 2

| Sample | Softening Point (° F.) | Penetration (dmm) (77° F.) | Viscosity (cP) (400° F.) |
|---|---|---|---|
| Control_1 (blown asphalt coating, 65% filler) | 242 | 9 | 2418 |
| Control_2 (PMA, 68% filler) | 249 | 15 | 3648 |
| C (filled) | 214 | 18 | 6368 |
| A (filled) | 266 | 31 | 4424 |
| B (filled) | 254 | 55 | 3648 |
| E (filled) | 235 | 25 | 1584 |
| F (filled) | 270 | 26 | 23330 |

Example 18

In this Example, a control filled coating was prepared as Control_1. Control_1 being a control filled coating comprising 35% by weight of blown asphalt and 65% by weight of a filler (limestone, $CaCO_3$), wherein each weight percentage is based on a total weight of the control filled coating. Physical properties of the control filled coating were measured and included a softening point (SP) (° F.), a viscosity (centipoise or cP at 400° F.), and a penetration (dmm, at 77° F.). Table 2 summarizes the measured physical properties of the control filled coating based on Control_1.

Example 19

In this Example, a control filled coating was prepared as Control_2. Control_2 being a control filled coating comprising 35% by weight of polymer-modified asphalt (PMA) and 65% by weight of a filler (limestone, $CaCO_3$), wherein each weight percentage is based on a total weight of the control filled coating. Physical properties of the control filled coating were measured and included a softening point (SP) (° F.), a viscosity (centipoise or cP at 400° F.), and a penetration (dmm, at 77° F.). Table 2 summarizes the measured physical properties of the control filled coating based on Control_2.

Example 20

In this Example, a filled coating comprising 35% by weight of the polymer blend from Example 1 (Sample A) and 65% by weight of a filler (limestone, $CaCO_3$) was prepared, wherein each weight percentage is based on a total weight of the filled coating. Physical properties of the resulting filled coating were measured and included a softening point (SP) (° F.), a viscosity (centipoise or cP at 400° F.), and a penetration (dmm, at 77° F.). Table 2 summarizes the measured physical properties of the filled coating based on Sample A.

Example 21

In this Example, a filled coating comprising 35% by weight of the polymer blend from Example 2 (Sample B) and 65% by weight of a filler (limestone, $CaCO_3$) was prepared, wherein each weight percentage is based on a total weight of the filled coating. Physical properties of the resulting filled coating were measured and included a softening point (SP) (° F.), a viscosity (centipoise or cP at 400° F.), and a penetration (dmm, at 77° F.). Table 2 summarizes the measured physical properties of the filled coating based on Sample B.

Example 22

In this Example, a filled coating comprising 35% by weight of the polymer blend from Example 3 (Sample C) and 65% by weight of a filler (limestone, $CaCO_3$) was prepared, wherein each weight percentage is based on a total weight of the filled coating. Physical properties of the resulting filled coating were measured and included a softening point (SP) (° F.), a viscosity (centipoise or cP at 400° F.), and a penetration (dmm, at 77° F.). Table 2 summarizes the measured physical properties of the filled coating based on Sample C.

Example 23

In this Example, a filled coating comprising 35% by weight of the polymer blend from Example 5 (Sample E) and 65% by weight of a filler (limestone, $CaCO_3$) was prepared, wherein each weight percentage is based on a total weight of the filled coating. Physical properties of the resulting filled coating were measured and included a softening point (SP) (° F.), a viscosity (centipoise or cP at 400° F.), and a penetration (dmm, at 77° F.). Table 2 summarizes the measured physical properties of the filled coating based on Sample E.

Example 24

In this Example, a filled coating comprising 35% by weight of the polymer blend from Example 6 (Sample F) and 65% by weight of a filler (limestone) was prepared, wherein each weight percentage is based on a total weight of the filled coating. Physical properties of the resulting filled coating were measured and included a softening point (SP) (° F.), a viscosity (centipoise or cP at 400° F.), and a penetration (dmm, at 77° F.). Table 2 summarizes the measured physical properties of the filled coating based on Sample F.

As shown in Table 2, the non-asphaltic filled coatings of the present disclosure (e.g., Sample A (filled), Sample B (filled), Sample C (filled), Sample E (filled), and Sample F (filled)) had softening points comparable to the control asphaltic filled coatings (e.g., Control_1 and Control_2). The softening points of the non-asphaltic filled coatings of the present disclosure were above 210° F., which is sufficient to maintain structure at elevated roof temperatures. The penetration values of the non-asphaltic filled coatings of the present disclosure were generally higher than the control asphaltic filled coatings, meaning the non-asphaltic filled coatings of the present disclosure generally had a property of being softer than the control asphaltic filled coatings. The viscosity measurements of the non-asphaltic filled coatings were generally within the acceptable viscosity range for shingle manufacturing processes, with the exception of Sample F (filled), which would necessitate implementation of a different coating equipment, such as a die coater, due to having higher viscosity.

Laboratory coupons based on the control asphaltic filled coatings from Examples 18-19 (e.g., Control_1 and Control_2, respectively) and the non-asphaltic filled coatings of the present disclosure from Examples 20-24 (e.g., Sample A (filled), Sample B (filled), Sample C (filled), SampleE (filled), and SampleF (filled), respectively) were prepared. The control asphaltic filled coatings and non-asphaltic filled coatings of the present disclosure were applied to substrates (e.g., a glass fiber mat). Surface protective coatings were then applied on the surfaces of the control asphaltic filled coatings and the non-asphaltic filled coatings of the present disclosure. The laboratory coupons were then tested for properties applicable to roofing shingles, including tensile strength, machine direction (MID) (lg-f) as measured according to ASTM D146, ASTM D228, ASTM D828, or any combination thereof, tensile strength, crossmachine direction (CD) (lb-f) as measured according to ASTM D146, ASTM D228, ASTM D828, or any combination thereof, tear strength, iVID (g-f) as measured according to ASTM D1922; tear strength, CD (g-f) as measured according to ASTM D1922; fastener pull (lb-f) as measured according to ASTM D3462; and granule loss (g) as measured according to ASTM D4977. The testing results of the laboratory coupons are summarized in Table 3 below.

TABLE 3

| Sample | Tensile, MD (lb-f) | Tensile, CD (lb-f) | Tear, MD (g-f) | Tear, CD (g-f) | Fastener Pull (lb-f) | Granule loss (g) |
|---|---|---|---|---|---|---|
| Control_1 (blown asphalt coating, 65% filler content) | 285 | 152 | 835 | 1176 | 25 | n/a |
| Control_2 (PMA, 68% filler content) | 229 | 113 | 1363 | 1907 | n/a | n/a |
| C (filled) | 79 | 42 | 1669 | 2190 | n/a | 1.3 |
| A (filled) | 67 | 32 | 1529 | 1678 | n/a | 2.8 |
| B (filled) | 50 | n/a | n/a | 2251 | n/a | 1.8 |
| E (filled) | 65 | 30 | 1237 | 1487 | n/a | 1.7 |
| F (filled) | 64 | 35 | 1110 | 1466 | n/a | 3 0 |

Based on the results presented in Table 3, coupons prepared from the non-asphaltic filled coatings of the present disclosure had lower tensile strengths and comparable or improved tear strengths, than the control asphaltic filled coatings. In addition, given the thermoplastic elastomer polymer content of the filled coatings of the present disclosure, the resulting filled coatings of the present disclosure provide improved impact resistance to roofing shingles prepared therefrom.

The following Examples 25-29 relate to polymer blends comprising hydrocarbon oils modified by resins and recycled polymers. The formulations of the prepared polymer blends and the measurements of the physical properties of the prepared polymer blends—including the softening point (f) as measured according to ASTM D3461, the viscosity (centipoise or cP) as measured according to ASTM D4402 using a #31 spindle at 400° F., and penetration (PEN) (dmm) at 77° F. as measured according to ASTM D5—are summarized in Table 4 (below).

TABLE 4

| Sample | Hydrocarbon Oil | Resin | Polymer(s) | Softening Point (° F.) | Visc., (cP) (400° F.) | Penetration, (dmm) (77° F.) |
|---|---|---|---|---|---|---|
| R | Hydrolene H600T, 45% | Sylvares 115, 45% | Recycled PS, 10% | 210 | 185 | 4 |
| S | Hydrolene H600T, 44% | Sylvares 115, 44% | Recycled PS, 10%; G1650, 2% | 208 | 362 | 3 |
| T | Kendex 0897, 44% | Sylvares 115, 44% | D1101, 6%; Recycled PS, 6% | 214 | 81 | 36 |
| U | Kendex 0897, 44% | Sylvares 115, 44% | D1184, 6%; Recycled PS, 6% | 221 | 1229 | 57 |
| V | Kendex 0897, 44% | WestRez 5120, 44% | D1184, 6%; GTR, 6% | 224 | 263 | 80 |

*PS = polystyrene; GTR = ground tire rubber.

Example 25

In this Example, a polymer blend comprising a hydrocarbon oil, a resin, and a polymer was prepared as Sample R, according to some embodiments of the present disclosure. Sample R comprising 45% by weight of the hydrocarbon oil (Hydrolene H600T), 45% by weight of the resin (Sylvares 115), and 10% by weight of the recycled polymer (Recycled Polystyrene (PS)), wherein each weight percentage is based on a total weight of the polymer blend. Physical properties of the resulting polymer blend were measured and included a softening point (SP) (° F.), a viscosity (Visc.) (centipoise or cP at 400° F.), and a penetration (dmm, at 77° F.). Table 4 summarizes the measured physical properties of Sample R.

Example 26

In this Example, a polymer blend comprising a hydrocarbon oil, a resin, and a polymer was prepared as Sample S, according to some embodiments of the present disclosure. Sample S comprising 44% by weight of the hydrocarbon oil (Hydrolene H600T), 44% by weight of the resin (Sylvares 115), and 12% by weight of the recycled polymers (recycled polystyrene 10% by weight; G1650, 2% by weight), wherein each weight percentage is based on a total weight of the polymer blend. Physical properties of the resulting polymer blend were measured and included a softening point (SP) (° F.), a viscosity (Visc.) (centipoise or cP at 400° F.), and a penetration (dmm, at 77° F.). Table 4 summarizes the measured physical properties of Sample S.

Example 27

In this Example, a polymer blend comprising a hydrocarbon oil, a resin, and a polymer was prepared as Sample T, according to some embodiments of the present disclosure. Sample T comprising 44% by weight of the hydrocarbon oil (Kendex 0897), 44% by weight of the resin (Sylvares 115), and 12% by weight of the recycled polymer (D1101, 6% by weight; recycled polystyrene, 6% by weight), wherein each weight percentage is based on a total weight of the polymer blend. Physical properties of the resulting polymer blend were measured and included a softening point (SP) (° F.), a viscosity (Visc.) (centipoise or cP at 400° F.), and a penetration (dmm, at 77° F.). Table 4 summarizes the measured physical properties of Sample T.

Example 28

In this Example, a polymer blend comprising a hydrocarbon oil, a resin, and a polymer was prepared as Sample U, according to some embodiments of the present disclosure. Sample U comprising 44% by weight of the hydrocarbon oil (Kendex 0897), 44% by weight of the resin (Sylvares 115), and 12% by weight of the recycled polymers (D1184, 6% by weight; Recycled Polystyrene, 6% by weight), wherein each weight percentage is based on a total weight of the polymer blend. Physical properties of the resulting polymer blend were measured and included a softening point (SP) (° F.), a viscosity (Visc.) (centipoise or cP at 400° F.), and a penetration (dmm, at 77° F.). Table 4 summarizes the measured physical properties of Sample U.

Example 29

In this Example, a polymer blend comprising a hydrocarbon oil, a resin, and a polymer was prepared as Sample V, according to some embodiments of the present disclosure. Sample V comprising 44% by weight of the hydrocarbon oil (Kendex 0897), 44% by weight of the resin (WestRez 5120), and 12% by weight of the recycled polymers (D1184, 6% by weight; GTR, 6% by weight), wherein each weight percentage is based on a total weight of the polymer blend. Physical properties of the resulting polymer blend were measured and included a softening point (SP) (° F.), a viscosity (Visc.) (centipoise or cP at 400° F.), and a penetration (dmm, at 77° F.). Table 4 summarizes the measured physical properties of Sample V.

Sample S integrated recycled polystyrene into the polymer blend; however, the polymer blends were hard and inflexible and not particularly suited for applications, such as, for example, roofing shingle manufacture, flexible roofing, and the like. The incorporation of a small amount of poly(styrene-ethylene/butylene-styrene) (SEBS) did not appreciably change the hardness, nor impart flexibility. However, modification of the formulation, such as, for example, by changing the hydrocarbon oil, incorporating a higher content of the polymer, such as recycled styrene butadiene styrene (SBS) copolymers, was observed to improve the physical properties. In addition, controlling the polymer blend allowed the incorporation of a fairly significant amount of GTR, showing the ability of the polymer blend and the coating to be tuned to permit the successful incorporation of various recycled materials, including recycled polymers, recycled polymeric materials, and the like.

Example 30

The following Example relates to compositions comprising a re-refined engine oil bottoms (REOB), a resin, a polymer, and a recycled material. All weight percentages are based on a total weight of the composition. These compositions are presented in Table 5 below as Samples 1-6. Sample 1 does not include a recycled material, such as GTR, rPVB, rLDPE, rPET, etc. Also "UES Avista" is a reference to "Universal Avista."

TABLE 5

| Sample | REOB | Resin | Polymer | Recycled Material |
|---|---|---|---|---|
| 1 (control) | Safety Kleen, 44% | Rosin Ester, 44% | SBS, 12% | none |
| 2 | Safety Kleen, 44% | Rosin Ester, 44% | SBS, 6% | GTR, 6% |
| 3 | Safety Kleen, 44% | Rosin Ester, 44% | SBS, 6% | GTR, 6% |
| 4 | Safety Kleen, 44% | Rosin Ester, 44% | SBS, 7% | rPVB, 5% |
| 5 | UES Avista, 45% | Rosin Ester, 45% | SBS, 5% | rLDPE, 5% |
| 6 | Vertex, 46% | Rosin Ester, 46% | SBS, 4% | rPET, 4% |

The physical properties of the Samples 1-6 presented in Table 5 above are summarized in Table 6 below. The physical property measurements include the softening point (° F.) as measured according to ASTM D3461, the viscosity (centipoise or cP) as measured according to ASTM D4402 using a #31 spindle at 400° F., and penetration (PEN) (dmm) at 77° F. as measured according to ASTM D5.

TABLE 6

| Sample | Softening Point (° F.) | Visc. (cP) (400° F.) | Penetration (77° F.), dmm |
|---|---|---|---|
| 1 (control) | 265 | 675 | 31 |
| 2 | 202 | 427 | 24 |
| 3 | 216 | 430 | 37 |
| 4 | 218 | 467 | 76 |
| 5 | 232 | 777 | 62 |
| 6 | 205 | 129 | 24 |

As shown in Table 6, each of the Samples 1-6 achieved a softening point higher than 200° F., a viscosity similar to that of a composition used in an asphaltic shingle, and a penetration which is greater than the range of 15-22 dmm typically seen with an asphaltic shingle.

Example 31

The following Example relates to coatings prepared using the compositions presented above in Example 30 as Samples 1-6. Each of the compositions were combined with 65% by weight of a limestone filler based on a total weight of the coating to obtain Filled Samples 1-6. Each of the coatings included 35% by weight of the composition based on the total weight of the coating. To prepare the Filled Samples 1-6, the compositions and filler were combined under mixing. The physical properties of the Filled Samples 1-6 are summarized below in Table 7. The physical property measurements include the softening point (° F.) as measured according to ASTM D3461, the viscosity (centipoise or cP) as measured according to ASTM D4402 using a #31 spindle at 400° F., and penetration (PEN) (dmm) at 77° F. as measured according to ASTM D5.

TABLE 7

| Filled Sample | Softening Point (° F.) | Visc. (cP) (400° F.) | Penetration (77° F.), dmm |
|---|---|---|---|
| 1 (65% filled) (control) | 269 | 16300 | 13 |
| 2 (65% filled) | 250 | 5472 | 14 |
| 3 (65% filled) | 235 | 4608 | 17 |
| 4 (65% filled) | 228 | 2600 | 39 |
| 5 (65% filled) | 241 | 9216 | 46 |
| 6 (65% filled) | 212 | 943 | 13 |

This table shows that as compared to the control (Sample 1), the compositions presented in Table 5 as Samples 2-6, which included the recycled material, provided the benefit of reducing the viscosity, which allows for easier processing of the filled coating. The softening points were also reduced to values within acceptable levels for roofing shingle applications and rolled roofing membrane applications. The penetration point increased, indicating a softening of the material and further indicating a more flexible material relative to the control (Sample 1). The control's (Sample 1) viscosity of 16300 cP (cps) was higher than what is typical for roofing shingle manufacturing, where viscosity is typically below 10,000 cP and usually in the range of 4,000-5,000 cP. Sample 6's viscosity of 943 cP permits the inclusion of a higher level of filler, e.g., 70 wt %. Lower viscosity provides ease of processing, and the inclusion of a higher level of filler reduces the costs of producing the coating. The physical properties for Sample 6 with 70% by weight of a filler based on a total weight of the coating were measured and are presented in Table 8.

TABLE 8

| Filled Sample | Softening Point (° F.) | Visc. (400° F.) (cP) | Penetration (77° F.), dmm |
|---|---|---|---|
| 6 (70% filled) | 220 | 4609 | 8 |

Example 32

The following Example relates to roofing shingles prepared using the coatings (65% Filled Samples 1-5; and 70% Filled Sample 6) from Example 31. The roofing shingle samples were prepared as coupons and tested for properties applicable to roofing shingles, including tensile strength, machine direction (MD) (lg-f) as measured according to ASTM D146, ASTM D228, ASTM D828, or any combination thereof, tensile strength, crossmachine direction (CD) (lb-f) as measured according to ASTM D146, ASTM D228, ASTM D828, or any combination thereof, tear strength, MD (g-f) as measured according to ASTM D1922; tear strength, CD (g-f) as measured according to ASTM D1922; nail pull (lb-f) as measured according to ASTM D3462; and rub (granule) loss (g) as measured according to ASTM D4977. The testing results of the laboratory coupons are summarized in Table 9 and Table 10 below.

TABLE 9

| Roofing Shingle Sample | Tensile Strength, lb-f | | Tear Strength, g-f | | Nail Pull, lb-f | Rub loss, g |
|---|---|---|---|---|---|---|
| | MD | CD | MD | CD | | |
| 1 (control) (65% filled) | 66.1 | 40 | 1280 | 1407 | not tested | 4 |
| 2 (65% filled) | 67.6 | 32.5 | 1109 | 1299 | not tested | 2.5 |
| 3 (65% filled) | 66.1 | 40 | 1280 | 1407 | not tested | 4 |
| 4 (65% filled) | 50 | 27.2 | 1300 | 1514 | 20.3 | 3.5 |
| 5 (65% filled) | 53.1 | not tested | not tested | 1378 | not tested | 3.1 |

Table 6 shows that roofing shingle samples or coupons prepared with coatings including the various recycled materials (i.e., Samples 2-5) exhibited comparable performance to coupons prepared without them (i.e., the control Sample 1). The thermoplastic elastomeric polymers present in these compositions may also impart impact resistance to roofing shingles. All coupons had a MD tensile strength (e.g., MD tensile strength of at least 40) sufficient to prevent tearing during manufacture processes (e.g., on an assembly line). All of the coupons but one had CD tear strength above 1350, with some above 1400. The results for the coupon prepared using Sample 6 (70% filled) are presented in the Table 10 below:

TABLE 10

| Sample | Tensile Strength, lb-f | | Tear Strength, g-f | | Nail Pull, lb-f | Rub loss, g |
|---|---|---|---|---|---|---|
| | MD | CD | MD | CD | | |
| 6 (70% filled) | 76.6 | 34.2 | 977 | 1690 | 21.8 | 2.7 |

Figure 7:
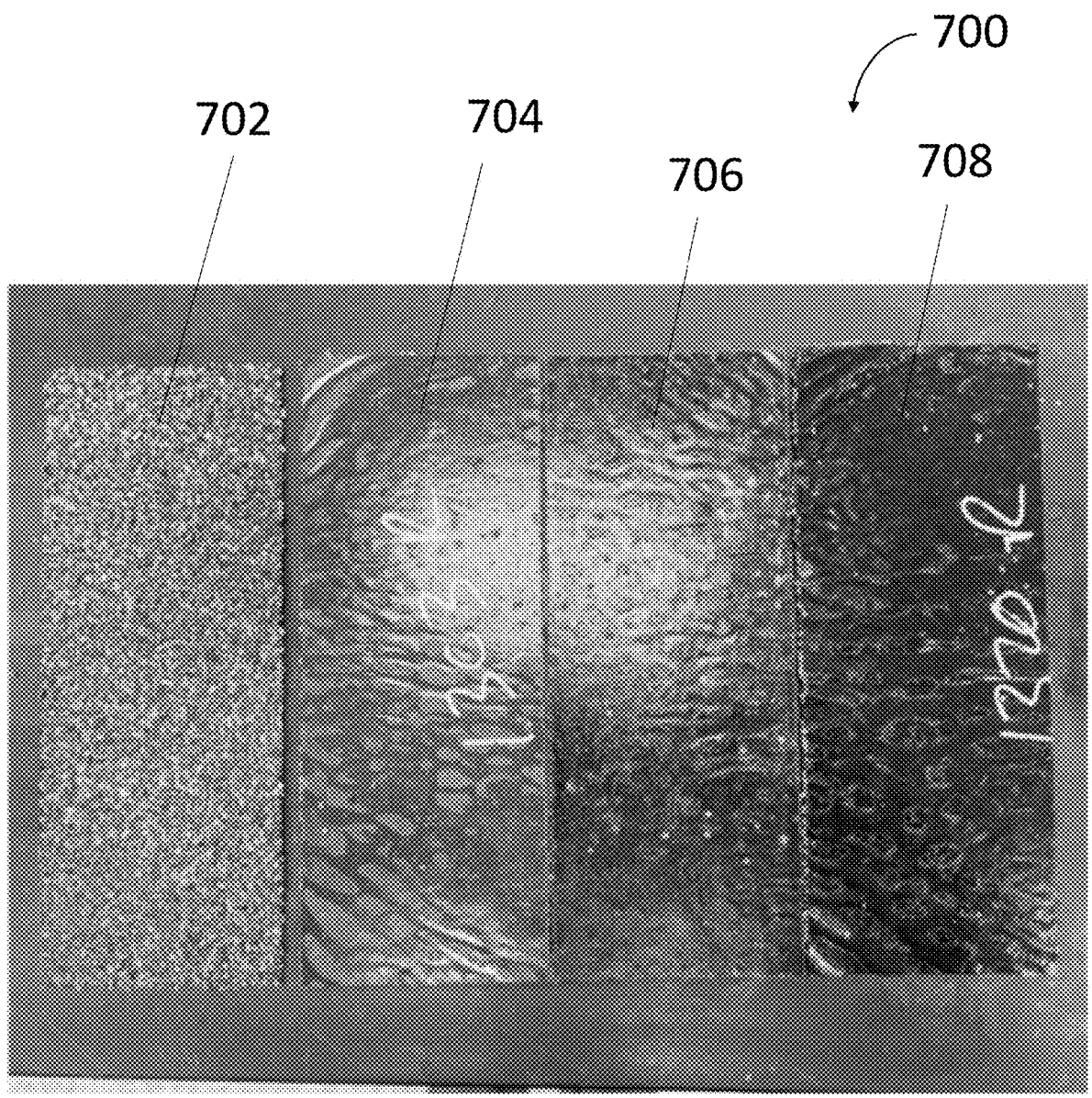
FIG. 7 is a photograph of roofing materials, according to some embodiments of the present disclosure.

FIG. 7 is a photograph depicting four coupons that were prepared using a filled coating comprising REOB, a resin, a polymer, and a recycled material as described herein. The coupon 702 is a photograph of a granulated front side of a coupon. The coupon 704 is a coupon prepared using a filled coating comprising REOB, a resin, a polymer, and recycled low density polyethylene (rLDPE) as the recycled material. The coupon 706 is a coupon prepared using a filled coating comprising REOB, a resin, a polymer, and recycled polyvinylbutyral (rPVB) as the recycled material. The coupon 708 is a coupon prepared using a filled coating comprising REOB, a resin, a polymer, and ground tire rubber (GTR) as the recycled material. In FIG. 7, the unsurfaced back side of the coupon 704, the coupon 706, and the coupon 708 is shown.

What is claimed is:

1. A roofing shingle, comprising:
    a substrate comprising a mat; and
    a filled coating on the substrate,
        wherein the filled coating comprises:
            10% to 90% by weight of a polymer blend based on a total weight of the filled coating, wherein the polymer blend comprises:
                at least 30% by weight of at least one hydrocarbon oil based on a total weight of the polymer blend;
                at least 30% by weight of at least one resin based on the total weight of the polymer blend;
                at least 1% by weight of at least one thermoplastic polymer based on the total weight of the polymer blend;
            10% to 90% by weight of at least one filler based on the total weight of the filled coating;
        wherein the filled coating having at least one of:
            a) a softening point of at least 200° F. as measured according to ASTM D3461, or
            b) a viscosity of 7000 cP or less as measured according to ASTM D4402 using a #31 spindle at 400° F.

2. The roofing shingle of claim 1, wherein the polymer blend is present in an amount of 20% to 50% by weight based on the total weight of the filled coating.

3. The roofing shingle of claim 1, wherein the at least one filler is present in an amount of 50% to 80% by weight based on the total weight of the filled coating.

4. The roofing shingle of claim 1, wherein the at least one hydrocarbon oil is present in an amount of 30% to 60% by weight based on the total weight of the polymer blend.

5. The roofing shingle of claim 1, wherein the at least one resin is present in an amount of 30% to 60% by weight based on the total weight of the polymer blend.

6. The roofing shingle of claim 1, wherein the at least one thermoplastic polymer is present in an amount of 5% to 20% by weight based on the total weight of the polymer blend.

7. The roofing shingle of claim 1, wherein the softening point of the filled coating is 200° F. to 300° F.

8. The roofing shingle of claim 1, wherein the viscosity of the filled coating is 1000 cP to 7000 cP.

9. A roofing system comprising:
    a roofing substrate; and
    a plurality of roofing shingles secured to the roofing substrate, each roofing shingle of the plurality of roofing shingles comprising:
        a substrate comprising a mat; and
        a filled coating on the substrate,
            wherein the filled coating comprises:
                10% to 90% by weight of a polymer blend based on a total weight of the filled coating, wherein the polymer blend comprises:
                    at least 30% by weight of at least one hydrocarbon oil based on a total weight of the polymer blend;
                    at least 30% by weight of at least one resin based on the total weight of the polymer blend;

at least 1% by weight of at least one thermoplastic polymer based on the total weight of the polymer blend;

10% to 90% by weight of at least one filler based on the total weight of the filled coating;

wherein the filled coating having at least one of:
   a) a softening point of at least 200° F. as measured according to ASTM D3461, or
   b) a viscosity of 7000 cP or less as measured according to ASTM D4402 using a #31 spindle at 400° F.

10. The roofing system of claim 9, wherein the polymer blend is present in an amount of 20% to 50% by weight based on the total weight of the filled coating.

11. The roofing system of claim 9, wherein the at least one filler is present in an amount of 50% to 80% by weight based on the total weight of the filled coating.

12. The roofing system of claim 9, wherein the at least one hydrocarbon oil is present in an amount of 30% to 60% by weight based on the total weight of the polymer blend.

13. The roofing system of claim 9, wherein the at least one resin is present in an amount of 30% to 60% by weight based on the total weight of the polymer blend.

14. The roofing system of claim 9, wherein the at least one thermoplastic polymer is present in an amount of 5% to 20% by weight based on the total weight of the polymer blend.

15. The roofing system of claim 9, wherein the softening point of the filled coating is 200° F. to 300° F.

16. The roofing system of claim 9, wherein the viscosity of the filled coating is 1000 cP to 7000 cP.

* * * * *